(12) United States Patent
Dewa

(10) Patent No.: US 8,504,607 B2
(45) Date of Patent: Aug. 6, 2013

(54) INFORMATION PROCESSING DEVICE, INFORMATION PROCESSING METHOD, RECORDING MEDIUM, AND PROGRAM

(75) Inventor: Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 1183 days.

(21) Appl. No.: 12/306,964

(22) PCT Filed: Jun. 29, 2007

(86) PCT No.: PCT/JP2007/063069
§ 371 (c)(1),
(2), (4) Date: Mar. 11, 2009

(87) PCT Pub. No.: WO2008/001876
PCT Pub. Date: Jan. 3, 2008

(65) Prior Publication Data
US 2009/0313621 A1 Dec. 17, 2009

(30) Foreign Application Priority Data

Jun. 30, 2006 (JP) ................................. 2006-180780
Nov. 2, 2006 (JP) ................................. 2006-298816

(51) Int. Cl.
G06F 15/16 (2006.01)

(52) U.S. Cl.
USPC ......................................................... 709/202

(58) Field of Classification Search
USPC .......................................... 709/201, 202, 203
See application file for complete search history.

(56) References Cited

U.S. PATENT DOCUMENTS

| 2006/0140079 | A1 | 6/2006 | Hamada et al. | |
| 2007/0192818 | A1* | 8/2007 | Bourges-Sevenier et al. | 725/132 |
| 2008/0056676 | A1* | 3/2008 | Kim et al. | 386/95 |

FOREIGN PATENT DOCUMENTS

| JP | 2000-57746 | 2/2000 |
| JP | 2002 74852 | 3/2002 |
| JP | 2002-247526 | 8/2002 |
| JP | 2005-117515 | 4/2005 |
| JP | 2005-159589 | 6/2005 |
| JP | 2005 322362 | 11/2005 |
| WO | WO 2004/030356 A1 | 4/2004 |
| WO | 2005 052940 | 6/2005 |

OTHER PUBLICATIONS

Japanese Office Action issued Sep. 20, 2011, in Patent Application No. 2006-298816.
Japanese Office Action issued Feb. 14, 2012, in Patent Application No. 2006-298816 (with English-language translation).

* cited by examiner

Primary Examiner — Larry Donaghue
Assistant Examiner — Marshall McLeod
(74) Attorney, Agent, or Firm — Oblon, Spivak, McClelland, Maier & Neustadt, L.L.P.

(57) ABSTRACT

An information processing apparatus, an information processing method, a recording medium, and a program that can run an application for playing an optical disc and an application that provides a unique function of the apparatus in cooperation with each other. A JVM converts JAVA™ bytecode into native code and executes the native code. An API library is a set of commands and functions that can be used when developing a navigation program and a set of protocols defining procedures. The navigation program is a program that reproduces data recorded on an optical disc and can control hardware of a reproducing apparatus only within the range of the API library. An application program provides a function unique to the reproducing apparatus. The navigation program and the application program execute a process in cooperation with each other using IXC.

24 Claims, 42 Drawing Sheets

FIG. 13

| DATA STRUCTURE | NUMBER OF BITS | BIT STRING REPRESENTATION |
|---|---|---|
| Manifest() | | |
| { | | |
|   manifest_id | 8 | uimsbf |
|   organization_id | 8 | uimsbf |
|   disc_id | 8 | uimsbf |
|   permission | 8 | uimsbf |
|   src_file_name | 8*1024 | bslbf |
|   dst_file_name | 8*1024 | bslbf |
|   credential | 8 | uimsbf |
| } | | |

FIG. 14

| VALUE | MEANING |
|---|---|
| 0x00 | INVISIBLE PROPERTY (TO USER) |
| 0x01 | VISIBLE PROPERTY (TO USER) |
| 0x02 | OVERWRITING-FORBIDDEN PROPERTY |

FIG. 19

| DATA STRUCTURE | NUMBER OF BITS | BIT STRING REPRESENTATION |
|---|---|---|
| File_package() | | |
| { | | |
|   Package_header() | | |
|   { | | |
|     compression_type | 8 | uimsbf |
|     encryption_type | 8 | uimsbf |
|   } | | |
|   Package_Body() | | |
|   { | | |
|     file_count | 16 | uimsbf |
|     for(i=0;i<file_count;i++) | | |
|     { | | |
|       Manifest() | | |
|       { | | |
|         manifest_id | 8 | uimsbf |
|         organization_id | 8 | uimsbf |
|         disc_id | 8 | uimsbf |
|         permission | 8 | uimsbf |
|         src_file_name | 8*1024 | bslbf |
|         dst_file_name | 8*1024 | bslbf |
|         credential | 8 | uimsbf |
|       } | | |
|       File() | | |
|       { | | |
|         file_size | 32 | uimsbf |
|         for(j=0;j<file_size;j++) | | |
|         { | | |
|           file_data | 8 | bslbf |
|         } | | |
|       } | | |
|     } | | |
|   } | | |
| } | | |

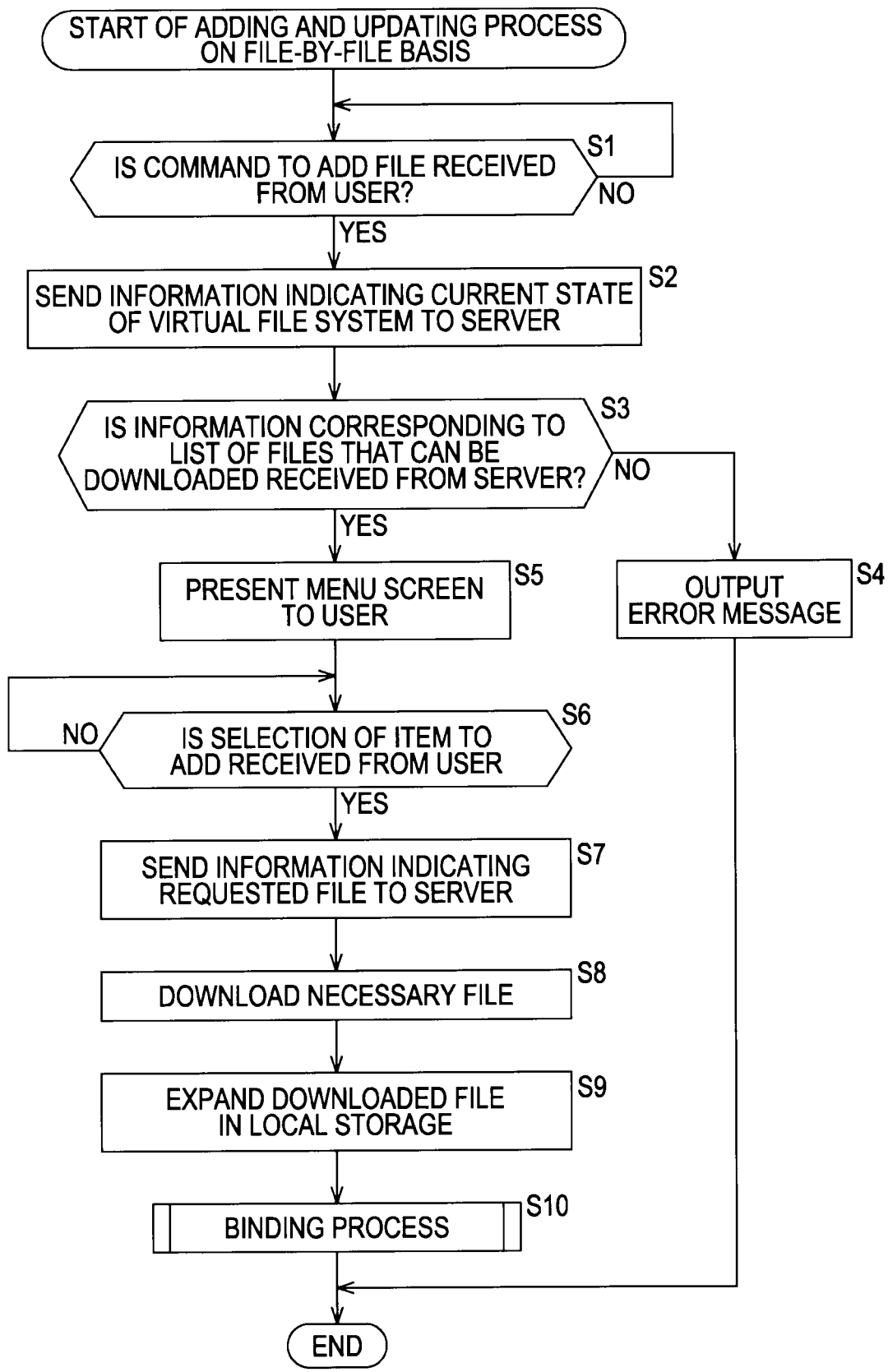

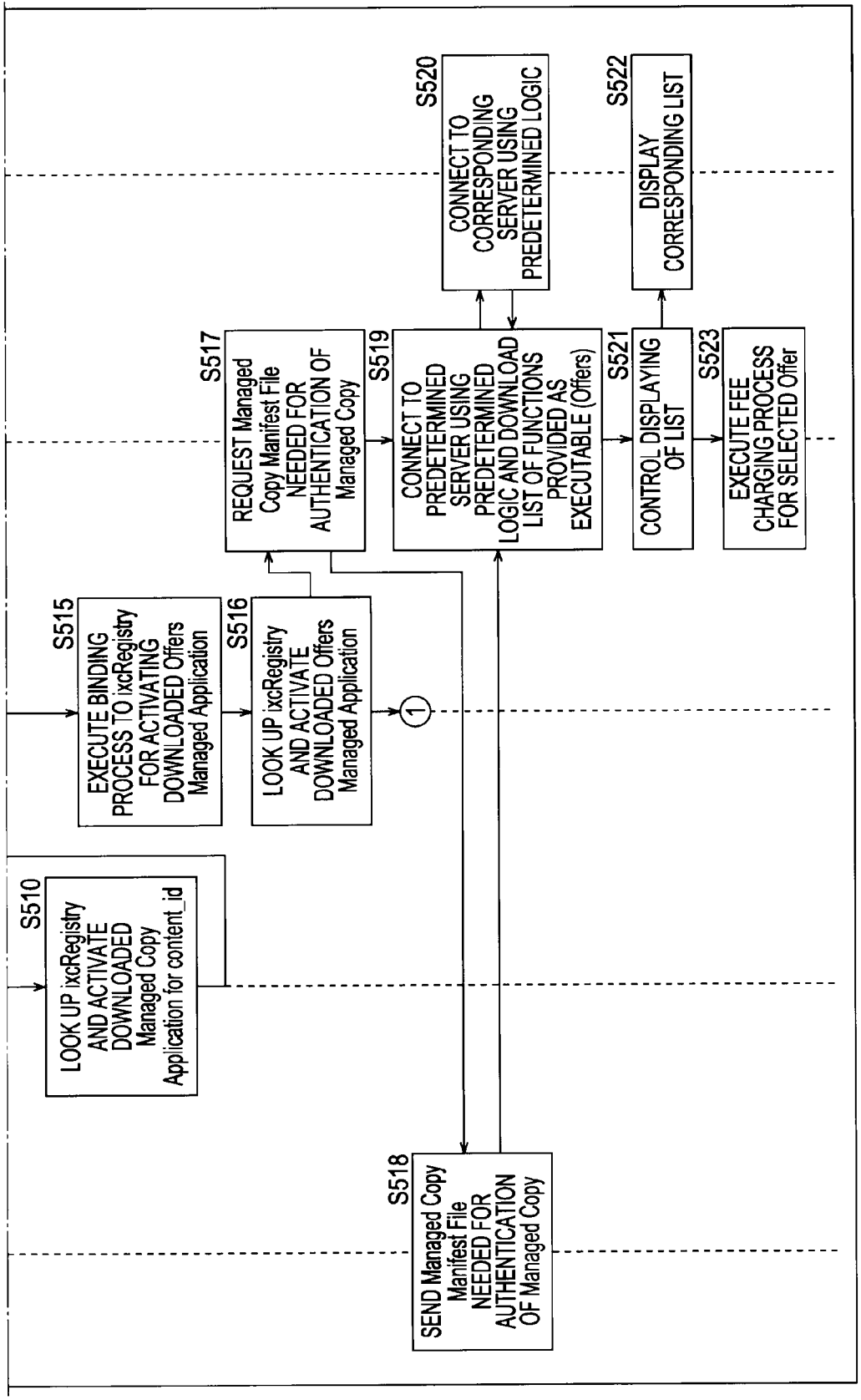

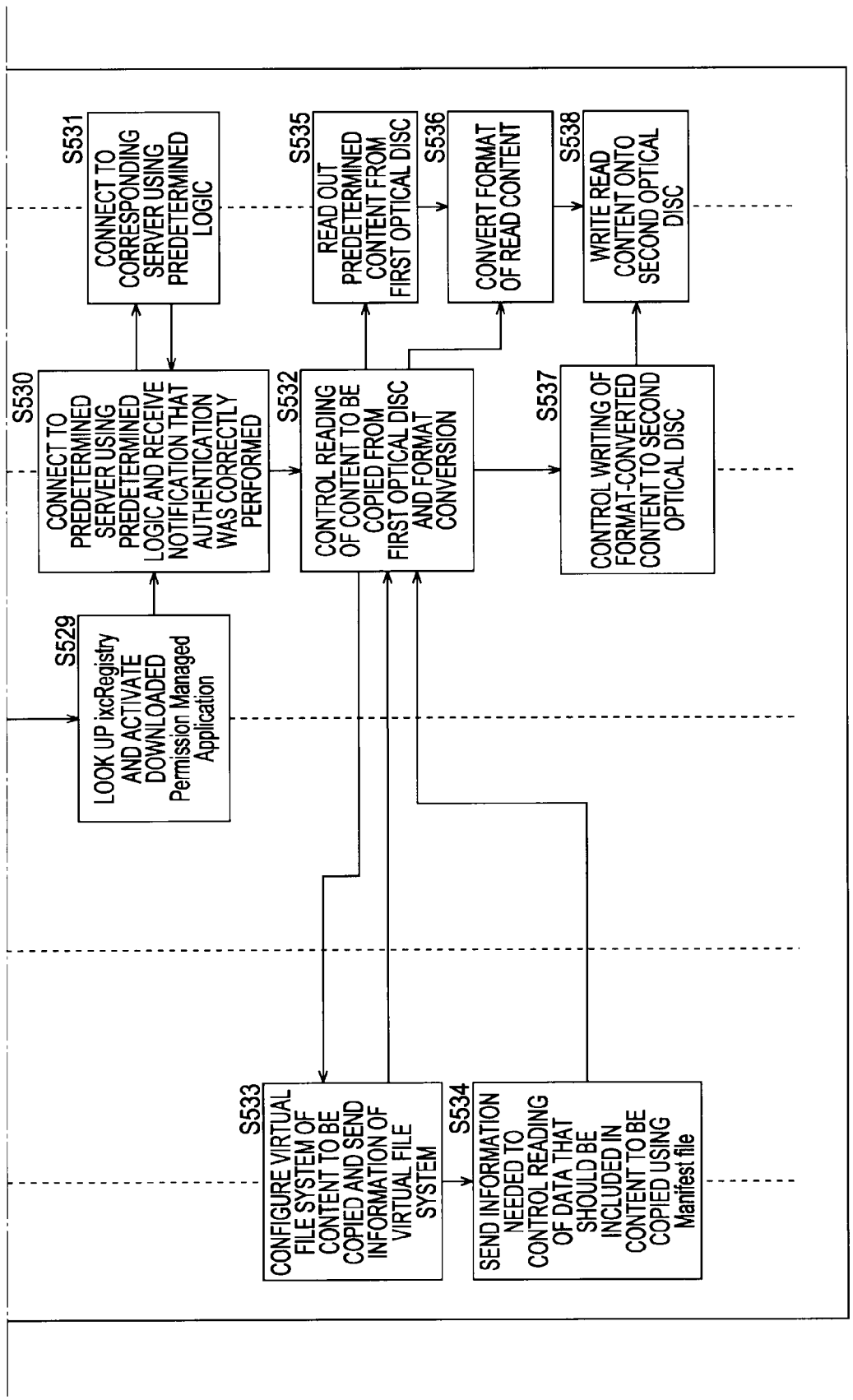

INFORMATION PROCESSING DEVICE, INFORMATION PROCESSING METHOD, RECORDING MEDIUM, AND PROGRAM

TECHNICAL FIELD

The present invention relates to an information processing apparatus, an information processing method, a recording medium, and a program, and particularly relates to an information processing apparatus, an information processing method, a recording medium, and a program suitable for use in the case of playing a recording medium.

BACKGROUND ART

There is a technique of downloading, via a network, update data of content recorded on an optical disc mounted in a reproducing apparatus and a program for reproducing the update data as content recorded on the optical disc.
Patent Document 1: Japanese Unexamined Patent Application Publication No. 2005-159589

DISCLOSURE OF INVENTION

Technical Problem

A program downloaded using the above-described conventional technique is to be executed in the case where a corresponding optical disc is mounted in a reproducing apparatus and data recorded on the optical disc is reproduced.

That is, when applications executable on a reproducing apparatus are provided to users using optical discs, processes executed by the applications provided in association with the individual optical discs are completed on an optical-disc-by-optical-disc basis. For example, although downloading and playing bonus tracks corresponding to the individual optical discs can be performed, it has been difficult to provide a service related to a plurality of optical discs, such as making it possible to download a bonus track only when movies belonging to a series are all played.

In contrast, an application program embedded in a reproducing apparatus has not hitherto been adapted to perform different processes depending on the mounted optical disc.

In addition, operating a function of an apparatus using an application program included in content has hitherto been done. In such a case, the provider of content has provided an application program with which similar operations are executed on all apparatuses that play the content. In particular, since content provided to users via broadcasting is created assuming that basically the same screen is similarly displayed on any receiver, no content has been created to provide to users specific services only on specific apparatuses. Accordingly, a content provider can provide content of the same quality to users without depending on specific apparatuses. In contrast, an apparatus provider has difficulty in differentiating apparatuses.

Further, with regard to program content and a corresponding application that have hitherto been provided using an optical disc or provided via a wired cable such as a cable television or wirelessly using broadcasting waves or the like, and an application included in a reproducing apparatus, one operating the other has been done. However, it has not been assumed that the individual applications cooperatively perform a process.

Note that, in MHP (Multimedia Home Platform) which is the data broadcasting standard defined by the European standardization organization DVB (Digital Video Broadcasting), it has been defined to deliver a JAVA (registered trademark) applet using an empty slot of digital broadcasting. In this case, the life of an application is managed by an application manager, and an AMT (Application Management Table) transmits application information. Therefore, the life of an application does not depend on the frame of a program, and an application can exist over multiple programs. However, even in this case, a delivered application is provided assuming that the delivered application is to be similarly executed on all receiving apparatuses, and it has not been assumed that the delivered application is to be executed in cooperation with an application that is included in a predetermined apparatus and is not necessarily executed similarly on all receiving apparatuses (in other words, not essential).

The present invention has been made in view of such circumstances and makes it possible to execute an application that is executable when a predetermined recording medium is mounted in an apparatus, that is, an application that is provided in association with a recording medium and is essential to play the recording medium, and an application that is included in the predetermined apparatus and is not necessarily executed similarly on all apparatuses (in other words, not essential) in cooperation with each other.

Technical Solution

An information processing apparatus of one aspect of the present invention is an information processing apparatus that reproduces data recorded on a mounted recording medium, including: one or a plurality of storage means for storing information; and execution means for executing a first application that is an essential application for reproducing data recorded on the recording medium, the first application being an application stored on the mounted recording medium or any of the storage means in association with the mounted recording medium and realizing a first function of processing the data recorded on the recording medium, and a second application that is stored in any of the storage means and realizes a second function different from the first function. The execution means executes the first application and the second application in cooperation with each other by mutually exchanging information using inter-first-application communication.

The second application may be adapted to be associated with the at least one predetermined recording medium. The execution means may be configured to detect, when executing the first application, the second application associated with the recording medium having recorded thereon the first application or being associated with the first application and activate the detected second application.

The second application may be adapted to be associated with identification information for identifying the at least one predetermined recording medium.

The execution means may be configured to treat, when the recording medium is mounted, a region that is included in a storage region of the storage means and stores information associated with the mounted recording medium and a recording region of the mounted recording medium as one data storage region, and activate the first application stored in any portion of the data storage region.

The second application may be adapted to be associated with the at least one predetermined recording medium. The execution means may be configured to detect, using the first application activated by mounting the recording medium, the second application associated with the recording medium and activate the detected second application.

The second application may be adapted to be associated with identification information for identifying the at least one predetermined recording medium.

A storage region including a first region storing information associated with the at least one recording medium and a second region storing the second application, the second region being different from the first region, may be adapted to be set in any of the plurality of storage means.

The execution means may be configured to treat, by executing the first application, the first region storing the information associated with the mounted recording medium and a recording region of the mounted recording medium as one data storage region.

Obtaining means for obtaining program content data may be further provided. The storage means may be configured to store the second application included in the program content data obtained by the obtaining means.

The execution means may be configured to include a virtual machine environment, execute the first application and the second application on the virtual machine, and further execute a third application that is not executed on the virtual machine. The second application may be adapted to exchange information with the third application using inter-second-application communication.

The third application may be adapted to be an application that can be executed independently of the first application.

The execution means may be configured to execute the first application and the second application on a JAVA (registered trademark) Virtual Machine which is the virtual machine.

The first application and the second application may be adapted to be executed in cooperation with each other by mutually exchanging information using Inter-Xlet communication as the inter-first-application communication.

The second application may be adapted to exchange information with the third application using JAVA (registered trademark) Native Interface.

The second application may be adapted to be only executable with the first application.

The execution means may be configured to further execute a third application that can be executed independently of the first application. The second application may be adapted to exchange information with the third application using inter-second-application communication.

The execution means can execute a plurality of the second applications, and, by executing the predetermined second application, may be configured to control obtaining of the different second application based on information recorded on the mounted first recording medium.

The execution means may be configured to control, by executing the predetermined second application, obtaining of the different second application from another apparatus via a network. The information recorded on the mounted first recording medium may be adapted to include address information of the other apparatus in the network.

The execution means which executes the second application obtained via the network may be configured to execute a predetermined authentication process by exchanging information with the other apparatus.

The execution means which executes the second application obtained via the network may be configured to execute a process of copying at least a portion of the data recorded on the first recording medium to the second recording medium which is different from the first recording medium based on a predetermined copyright protection framework.

An information processing method of one aspect of the present invention is an information processing method for an information processing apparatus that reproduces data recorded on a mounted recording medium. The information processing apparatus can execute a plurality of applications. A first application that is an essential application for reproducing data recorded on the recording medium, the first application being an application stored on the mounted recording medium or any of one or a plurality of storage units in association with the mounted recording medium and realizing a first function of processing the data recorded on the recording medium, and a second application that is stored in any of the storage units and realizes a second function different from the first function are executed in cooperation with each other by mutually exchanging information using predetermined inter-application communication on the virtual machine.

According to the information processing apparatus and method of one aspect of the present invention, a first application that is an essential application for reproducing data recorded on the recording medium, the first application being an application stored on the mounted recording medium or any of one or a plurality of storage units in association with the mounted recording medium and realizing a first function of processing the data recorded on the recording medium, and a second application that is stored in any of the storage units and realizes a second function different from the first function are executed in cooperation with each other by mutually exchanging information using predetermined inter-application communication.

A program of one aspect of the present invention is a program for causing a computer to execute a process of reproducing information recorded on a recording medium, the process including the steps of: realizing a first function of processing data recorded on the recording medium; detecting, among other programs that are stored in any of one or a plurality of predetermined storage units and that realize a second function different from the first function, the other program associated with itself; activating the detected other program; and exchanging information with the other program using predetermined inter-application communication and executing a predetermined operation.

The first function may be adapted to include a function of treating, when the recording medium is mounted, a region that is included in storage regions of the storage units and stores information associated with the mounted recording medium and a recording region of the mounted recording medium as one data storage region.

The computer may be configured to include a virtual machine environment, and the program may be adapted to be executed together with the other program on the virtual machine.

According to the program of one aspect of the present invention, a first function of processing data recorded on a recording medium is realized. Among other programs that are stored in one or a plurality of predetermined storage units and realize a second function different from the first function, another program associated with itself is detected. The detected other program is activated. Information is exchanged with the other program using predetermined inter-application communication, and a predetermined operation is executed.

The network refers to a scheme that connects at least two apparatuses and enables one apparatus to transmit information to another apparatus. Apparatuses that communicate with each other via the network may be independent apparatuses or may be internal blocks constituting one apparatus.

In addition, communication may be, not only wireless communication and wired communication, but also communication in which wireless communication and wired communication are mixed, that is, one such that wireless communication is performed in one section and wired communication is performed in another section. Further, communication may be such that communication from one apparatus to another apparatus is performed using wired communication, and communication from the other apparatus to the apparatus is performed using wireless communication.

A reproducing apparatus may be an independent apparatus or may be a block that performs reproduction in a recording/reproducing apparatus or a picture recording/reproducing apparatus. A recording apparatus or a picture recording apparatus may be an independent apparatus or may be a block that performs a recording process or a picture recording process in a recording/reproducing apparatus or a picture recording/reproducing apparatus. Also, a recording/reproducing apparatus or a picture recording/recording/reproducing apparatus may be an independent apparatus or may be a block that performs a predetermined process in an information processing apparatus including many functions, Advantageous Effects According to the present invention, a plurality of applications can be executed. In particular, two applications are cooperatively executed using predetermined inter-application communication. Therefore, a first application that is essential to play the recording medium and a second application that controls a process not directly related to playback of the recording medium can be cooperatively executed, and the degree of freedom of functions that can be provided on an apparatus-by-apparatus basis is increased.

BRIEF DESCRIPTION OF DRAWINGS

FIG. 13 is a diagram showing the syntax of a Manifest file.

FIG. 14 is a diagram for describing values that can be designated to permission included in Manifest ( ).

FIG. 19 is a diagram for describing the definition of a content distribution file format at the time a content author distributes content.

FIG. 20 is a flowchart for describing an adding and updating process on a file-by-file basis.

Figure 1:
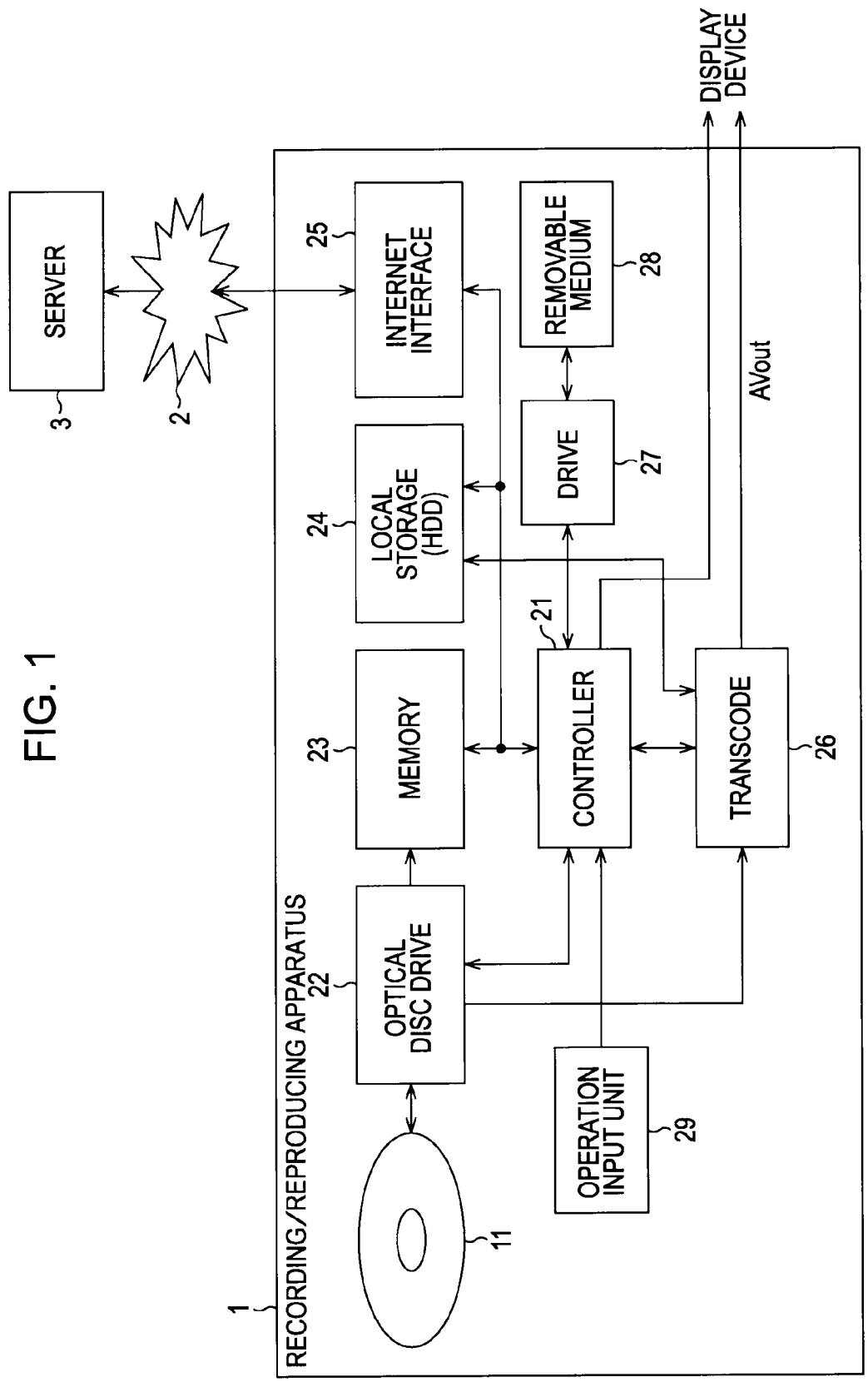
FIG. 1 is a block diagram showing an exemplary structure of a reproducing apparatus.

EXPLANATION OF REFERENCE NUMERALS 1 recording/reproducing apparatus, 11 optical disc, 21 controller, 22 optical disc drive, 23 memory, 24 local storage, 26 transcoder, 41 driver, 42OS, 43 application manager, 44 JVM, 45 navigation program, 46 API library, 47 application program, 61 operation input obtaining unit, 62 menu screen display control unit, 63 data obtaining unit, 64 local storage directory management unit, 65 optical disc directory management unit, 66 file system merge processing unit, 67 reproducing control unit, 71 application program cooperation processing control unit, 72 IXC control unit, 74 JNI control unit, 101 picture recording/recording/reproducing apparatus, 111 content obtaining unit, 112 broadcast signal obtaining unit, 113 picture recording processing unit

BEST MODES FOR CARRYING OUT THE INVENTION

Hereinafter, embodiments of the present invention will be described with reference to the drawings.

FIG. 1 is a block diagram showing an exemplary structure of a recording/reproducing apparatus 1.

A controller 21 expands, in a memory 23, a navigation program (described later) stored in a local storage 24 and executes the navigation program, or the controller 21 controls an optical disc drive 22 to read out a navigation program recorded on an optical disc 11, expands the navigation program in the memory 23, and executes the navigation program, thereby controlling an operation of playing the optical disc 11 mounted in the recording/reproducing apparatus 1. In addition, the controller 21 can control obtaining of an application program or a navigation program via an Internet interface 25 or a removable medium 28 to store the obtained application program or navigation program in the local storage 24. Additionally, the controller 21 can expand the application program or the navigation program in the memory 23 and execute the application program or the navigation program.

Further, the controller 21 can execute a navigation program for reproducing information recorded on the mounted optical disc 1, an application program that is executable in cooperation with the navigation program, and an embedded application that is solely executable regardless of whether or not the optical disc 11 having recorded thereon the navigation program is mounted in the recording/reproducing apparatus 1. At least a portion of each of the navigation program and the application program is adapted to be capable of running on a multi-platform due to the mounting of a virtual machine, such as JAVA (registered trademark). Also, the embedded application may be adapted to be capable of running only in an execution environment of the controller 21 or to be capable of running on a multi-platform due to the mounting of a virtual machine.

In addition, when both the application program stored in the local storage 24 or the memory 23 and the navigation program recorded on the optical disc 11 or in the local storage 24 can run on similar virtual machines and when an inter-application communication function is provided, the controller 21 expands each of them in the memory 23 and runs them in cooperation with each other, whereby the controller 21 can control the operation of the recording/reproducing apparatus 1.

Under control of the controller 21, the optical disc drive 22 reads out data from the optical disc 11, outputs the read data to the controller 21, the memory 23, or a transcoder 26, and records a signal supplied from the memory 23, the local storage 24, or the transcoder 26 onto the mounted optical disc 11. When information read out from the optical disc 11 is a navigation program, a PlayList, or the like, the information read out by the optical disc drive 22 is output to the controller 21 or the memory 23. When information read out from the optical disc 11 is an AV stream or text data, the information read out by the optical disc drive 22 is output to the transcoder 26.

Figure 2:
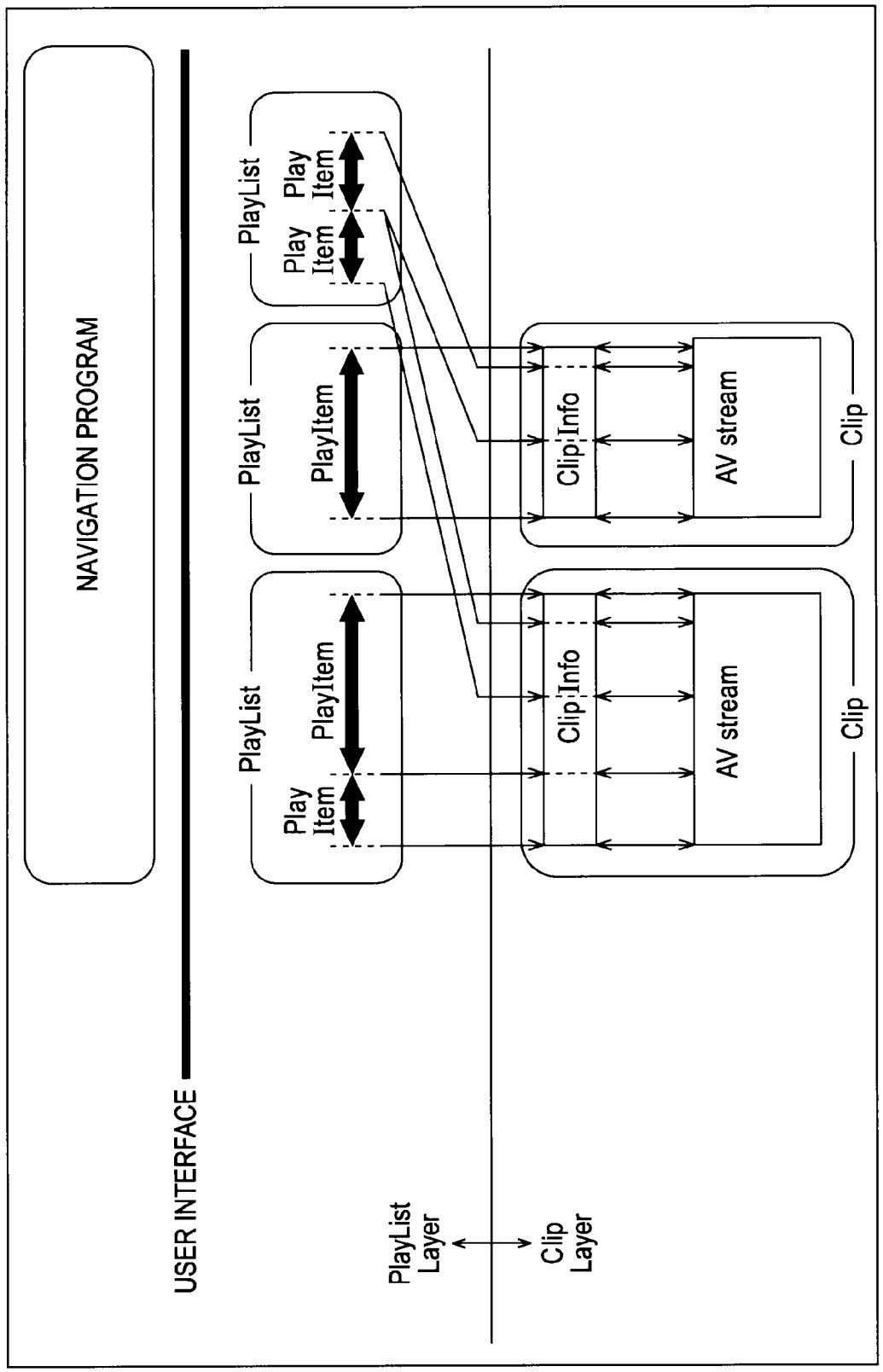
FIG. 2 is a diagram showing an example of an application format on a recording medium mounted in the reproducing apparatus.

FIG. 2 is a diagram showing an example of an application format of the optical disc 11 mounted in the recording/reproducing apparatus 1. The recording medium may be, besides the optical disc 11, for example, a magnetic disc or a semiconductor memory.

The application format has two layers, a PlayList and a Clip, for managing an AV (Audio Visual) stream. Here, a pair of one AV stream or item of text data and Clip Information that is information accompanying the AV stream or text data is regarded as one object, and these are collectively referred to as a Clip. Hereinafter, a data file of an AV stream is referred to as an AV stream file. In addition, a data file of Clip Information is referred to as a Clip Information file.

In general, a file used in a computer or the like is handled as a byte sequence. Content in an AV stream file is expanded on a time axis, and an access point in a Clip is mainly designated by a PlayList using a timestamp.

When an access point in a Clip is indicated by a PlayList using a timestamp, the Clip Information file is used to find, based on the timestamp, address information at which decoding should begin in the AV stream file.

A PlayList is a set of items of information indicating playback sections of an AV stream. Information indicating one playback section in an AV stream is called a PlayItem. A PlayItem is represented by a pair of an IN point (playback start point) and an OUT point (playback end point) of a playback section on the time axis. Therefore, a PlayList is constituted of, as shown in FIG. 2, one or a plurality of PlayItems.

In FIG. 2, a first PlayList which is shown first from the left is constituted of two PlayItems. With these two PlayItems, reference is made to a first half portion and a second half portion of an AV stream included in a first Clip shown on the left side. In addition, a second PlayList which is shown second from the left is constituted of one PlayItem. With this, reference is made to the whole AV stream included in a second Clip shown on the right side. Further, a third PlayList which is shown third from the left is constituted of two PlayItems. With these two PlayItems, reference is respectively made to a predetermined portion of the AV stream included in the first Clip which is shown on the left side and to a predetermined portion of the AV stream included in the second Clip which is shown on the right side.

A navigation program is a program for causing the controller 21 to execute a function of controlling the order of playing PlayLists and interactive playback of the PlayLists. In addition, the navigation program has a function of displaying a menu screen for a user to designate execution of various types of playback. In addition, all or at least some of the functions of the navigation program are written using a programming language executable on a multi-platform due to the mounting of a virtual machine, such as JAVA (registered trademark). In addition, among functions of the navigation program, some other functions other than portions written in a programming language executable on a multi-platform may be written in a programming language executable not on a multi-platform, but in an execution environment unique to the apparatus.

For example, when the navigation program is executed by the controller 21 and a first PlayItem included in the first PlayList shown first from the left in FIG. 2 is designated as information indicating a playback position at that time, the first half portion of the AV stream included in the first Clip shown on the left side, to which the PlayItem refers, is played.

Figure 3:
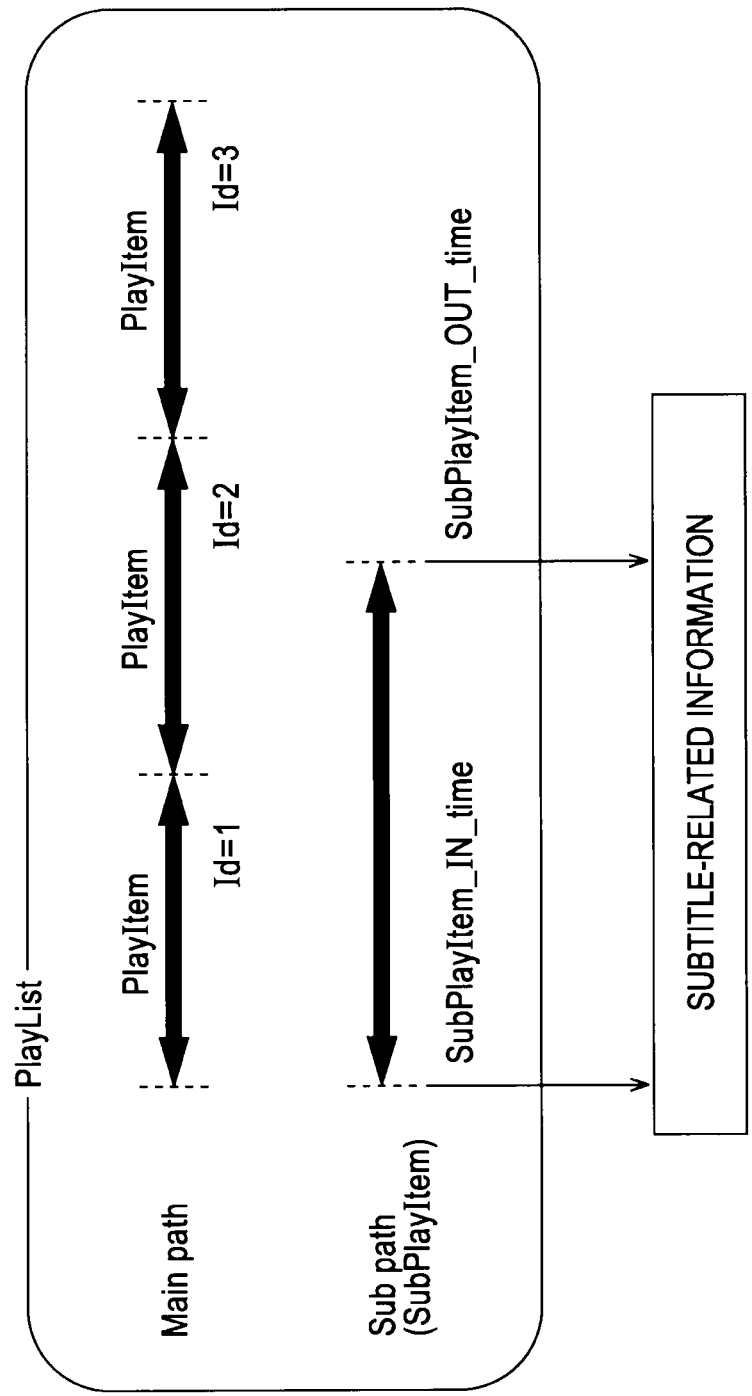
FIG. 3 is a diagram for describing a different example of the example of the application format on the recording medium mounted in the reproducing apparatus.

Also, the PlayLists described using FIG. 2 may be adapted to include information of a Sub path designated using a Sub Play Item as shown in FIG. 3, in addition to a Main Path designated by a PlayItem. SubPlayItem is defined as follows. For example, an independent data stream that is not multiplexed with a Clip (e.g., an MPEG2 transport stream) designated by a PlayItem can be played in synchronization with playback of the AV stream.

For example, by preparing subtitle-related information constituted of a text subtitle file and a font file needed for rendering and a SubPlayItem designating a playback section of the subtitle-related information in association with a Clip AV stream at a Main Path designated by a PlayItem, subtitles corresponding to data written in the text subtitle file can be displayed using a display font based on font data written in the font file on a display device, simultaneously with playback of the Clip AV stream. Alternatively, for example, by preparing audio data for dubbing in a different language and a SubPlayItem corresponding to the audio data for dubbing in association with a Clip AV stream at a Main Path designated by a PlayItem, the audio data for dubbing in the different language can be reproduced and output simultaneously with playback of the Clip AV stream.

In this manner, a SubPlayItem and corresponding data (clip) may be recorded in advance on the optical disc 11, downloaded as additional data (update data) via a network 2 from a server 3, or obtained using a removable medium 28. Details of the case where such additional data is downloaded from the server 3 will be described later using FIG. 4.

Now let us go back to the description of FIG. 1 again.

The memory 23 appropriately stores data and programs needed for the controller 21 to execute various processes. The local storage 24 is constituted of, for example, an HDD (Hard Disk Drive) or the like.

The Internet interface 25 is connected via cable or wirelessly to the network 2. Under control of the controller 21, the Internet interface 25 communicates with the server 3 via the network 2 and supplies data, a navigation program, an application program, or the like downloaded from the server 3 to the local storage 24. From the server 3, for example, data for updating data that is recorded on the optical disc 11 mounted in the recording/reproducing apparatus 1 at that time and has been described using FIG. 2 is downloaded as content. The local storage 24 can record the content downloaded from the server 3 via the network 2.

The transcoder 26 decodes an AV stream or text data supplied from the optical disc drive 22 or the local storage 24 and outputs the obtained video signal and audio signal to an external display device. In the display device, on the basis of the signals decoded by the transcoder 26, for example, an output of the content recorded on the optical disc 11 (displaying of video and outputting of audio) is performed. In addition, the transcoder 26 can perform format conversion of an AV stream or text data supplied from the optical disc drive 22 or the local storage 24 into a predetermined format, that is, execute a decoding process, and then encode the format-converted AV stream or text data in a predetermined format. The transcoder 26 can again supply the encoded AV stream or text data to the optical disc drive 22 and record the encoded AV stream or text data on the mounted optical disc 11 (needless to say, this may be a disc different from the optical disc 11 from which the format-converted data was read out).

An operation input unit 29 is constituted of input devices such as buttons, keys, a touch panel, a jog dial, and a mouse, and a receiver that receives signals such as infrared ray signals sent from a predetermined remote commander. The operation input unit 29 obtains a user operation input and supplies the user operation input to the controller 21.

In addition, the controller 21 is also connected to a drive 27 according to need. The removable medium 28 constituted of, for example, a magnetic disk (including a flexible disk), an optical disc (including a CD-ROM (Compact Disk-Read Only Memory) and a DVD), a magneto-optical disk (including an MD (registered trademark) (Mini-Disk)), a semiconductor memory, or the like is mounted onto the drive 27.

Note that the recording/reproducing apparatus 1 may be provided with a module that is not described here or may be connected to another apparatus and be configured to be capable of cooperatively performing a process. For example, a function of receiving broadcast waves, a function of connecting to a cable television network, and the like may be added to the recording/reproducing apparatus 1 shown in FIG. 1, whereby the recording/reproducing apparatus 1 is configured to be capable of obtaining so-called program content or the like. A function of recording the obtained program content or the like on a predetermined recording medium (an example of which is described later using FIG. 29) may be added to the recording/reproducing apparatus 1, or another apparatus having such a function may be connected to the recording/reproducing apparatus 1, thereby making it possible to control, with the controller 21, processes of obtaining program content or the like, recording it, and the like. On this occasion, an application program that controls the function of receiving broadcast waves and the function of connecting to a cable television network, that is, an application program that executes a process different from a process of reproducing content data recorded on the mounted optical disc 11 or downloaded data stored in the local storage 24 in association with the optical disc 11, is stored in the memory 23 or the local storage 24 and executed by the controller 21.

Also, when the function of receiving broadcast waves, the function of connecting to the cable television network, and the like are added to the recording/reproducing apparatus 1 shown in FIG. 1 and the recording/reproducing apparatus 1 is thus configured to be capable of obtaining so-called program content or the like, various applications executable by the controller 21 may be downloaded, together with broadcast waves, and installed in the memory 23 or the local storage 24.

Next, a method of reproducing data recorded on the optical disc 11 mounted in the recording/reproducing apparatus 1 and data stored in the local storage 24 will be described.

The recording/reproducing apparatus 1 contains the local storage 24 constituted of an HDD (Hard Disk Drive) or the like. The recording/reproducing apparatus 1 is connected via cable or wirelessly to the network 2 and can record content downloaded from the server 3 via the network 2 in the local storage 24. From the server 3, for example, data for updating content such as a movie recorded on the optical disc 11 mounted in the recording/reproducing apparatus 1 at that time can be downloaded.

In a state in which downloaded content is recorded in the local storage 24, when an instruction to play content recorded on the optical disc 11 is given from the operation input unit 29, the controller 21 executes a process of associating the content recorded on the optical disc 11 with the content recorded in the local storage 24 and playing these items of content.

Here, a method of playing content recorded on the optical disc 11 and content recorded in the local storage 24 in association with each other will be described using FIG. 4.

For example, it is assumed that the optical disc 11 is a packaged medium on sale, and an item of movie content is recorded on the optical disc 11. It is also assumed that only an English text subtitle file is recorded on the optical disc 11 as a subtitle data file that can be superimposed and displayed on video of the movie content.

Figure 4:
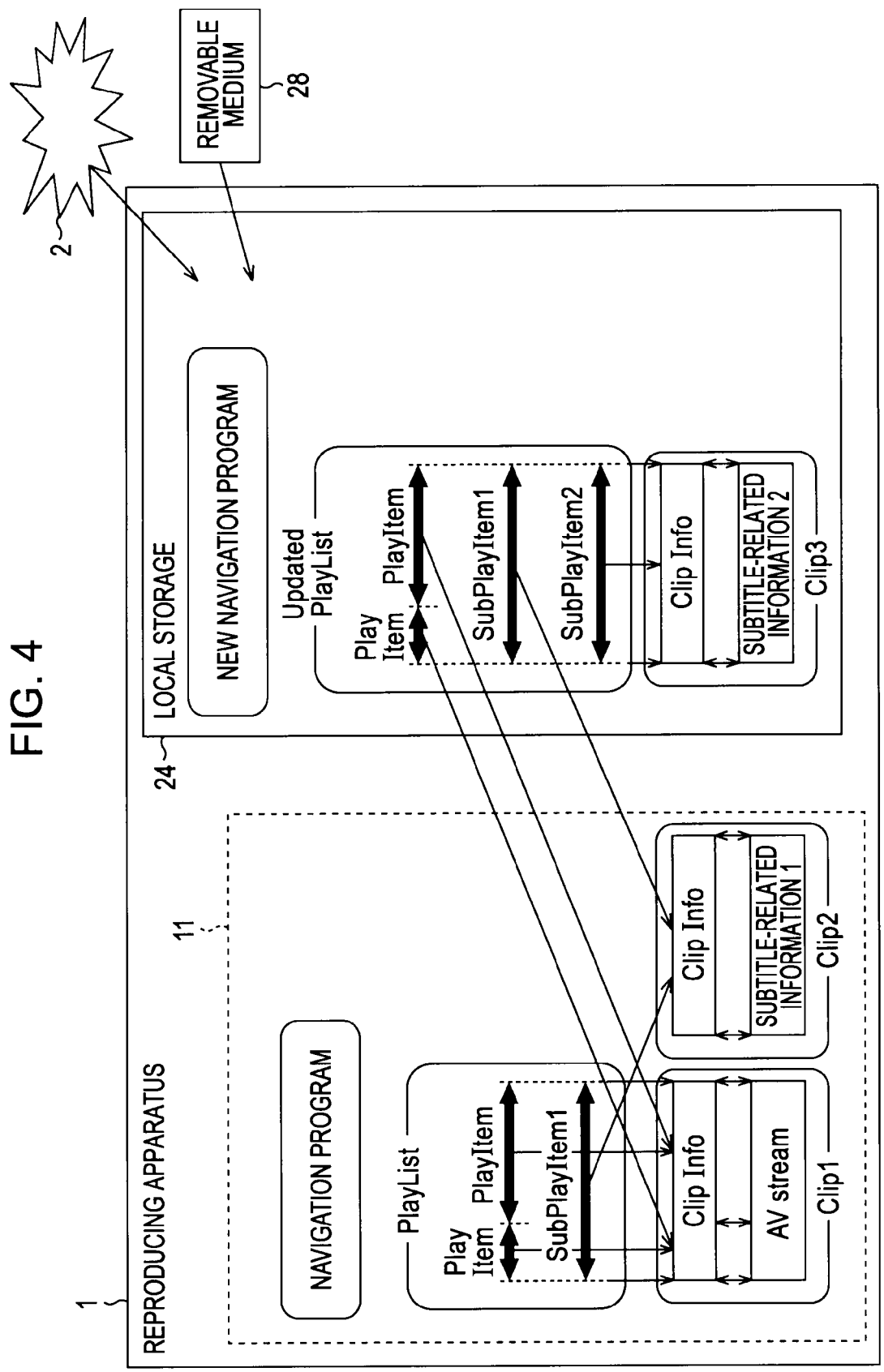
FIG. 4 is a diagram for describing a state in which a file has been downloaded.

For example, in FIG. 4, an AV stream of a Clip1 referred to by PlayItems in a PlayList, which is recorded on the optical disc 11, is a stream for displaying video of the movie content and playing corresponding audio. Subtitle-related information 1 of a Clip2 referred to by a SubPlayItem in the PlayList is a text subtitle file for displaying English subtitles together with displaying of the video.

In this case, when a user wishes to view the movie content recorded on the optical disc 11 while displaying subtitles in a language different from English, since no subtitle data in a language different from English has been recorded on the optical disc 11, if nothing is done, the user cannot view the movie while displaying subtitle data in a language different from English.

Therefore, the user causes the recording/reproducing apparatus 1 to download (or obtain using the removable medium 28) a text subtitle file in a desired language of the movie recorded on the optical disc 11 from the server 3 via the network 2. A state in which a text subtitle file in Arabic, for example, which has not been recorded in advance on the optical disc 11, is downloaded (or copied from the removable medium 28 to the local storage 24) will be described.

That is, when the user gives an instruction to download a text subtitle file in Arabic, which corresponds to the PlayList recorded in advance on the optical disc 11, it is assumed in the recording/reproducing apparatus 1 that access is to be gained to the server 3 and updating of the content recorded on the optical disc 11 is to be performed, and a file prepared in the server 3 is downloaded.

In the example in FIG. 4, a Clip3 constituted of a text subtitle file in Arabic (subtitle-related information 2) and a Clip Information file accompanying the text subtitle file, a PlayList file (Updated PlayList file) that can control reproducing and displaying of subtitle data of the corresponding Clip3, in addition to, for example, a video Clip and an audio Clip (AV stream data) of the movie content and the English text subtitle file which are recorded in advance on the optical disc 11, and a new navigation program file that has been updated compared with that recorded on the optical disc 11 are downloaded, and these are recorded in the local storage 24.

Note that, besides the PlayItems indicating main paths, a SubPlayItem1 and a SubPlayItem 2 indicating sub paths are added to the Updated PlayList. The PlayItems in the Updated PlayList are adapted to refer to the Clip1 including the AV stream recorded on the optical disc 11. The SubPlayItem1 is adapted to refer to the Clip2 including the subtitle-related information 1 recorded on the optical disc 11. The SubPlayItem2 is adapted to refer to the Clip3 including the subtitle-related information 2 which is the text subtitle file in Arabic, which has been downloaded, together with the Updated PlayList, from the server 3.

The new navigation program in FIG. 4 is adapted to be capable of designating, together with the PlayItems in the Updated PlayList, the SubPlayItem1 or SubPlayItem2 as a playback section. Accordingly, for example, of English subtitles defined by the text subtitle file in English, which has been recorded in advance on the optical disc 11, or Arabic subtitles defined by the text subtitle file in Arabic, which has not been recorded in advance on the optical disc 11, subtitles in a language desired by the user can be displayed in association with desired video and audio data.

In this manner, with the downloading from the server 3 (or the copying from the removable medium 28), the recording/reproducing apparatus 1 is enabled to reproduce and display either the Clip2 which is the English text subtitle file or the Clip3 which is the Arabic text subtitle file and has not been prepared in advance in the optical disc 11 as subtitles of the movie. That is, the user can view the movie with subtitles in a desired language, English or Arabic, by selecting a desired language from displayable subtitle languages described on a menu screen displayed on the display device.

Figure 5:
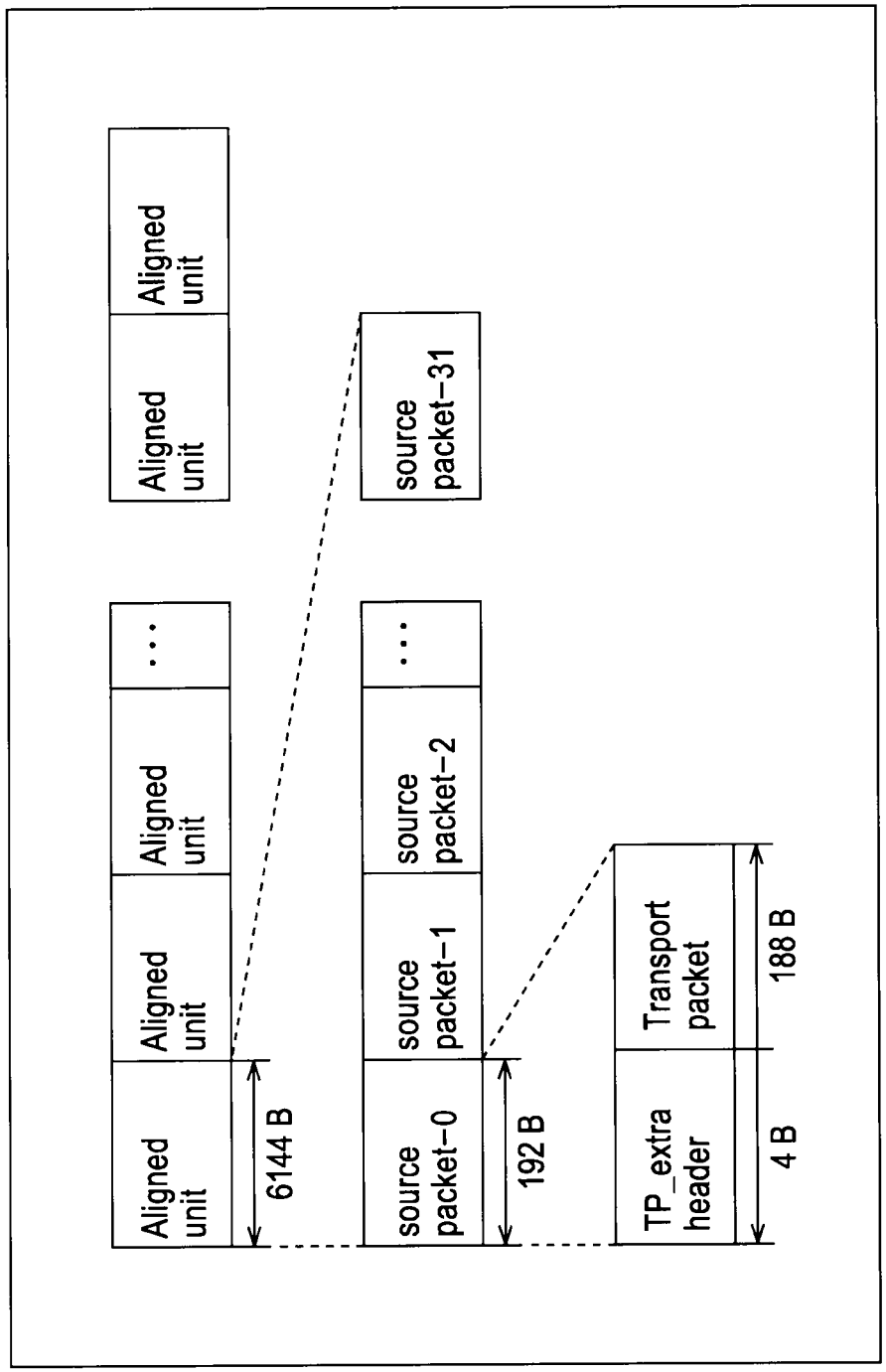
FIG. 5 is a diagram for describing the structure of an AV stream.

Note that the AV stream recorded on the optical disc 11 has the structure of an MPEG2 (Moving Picture Experts Group 2) transport stream, such as that shown in FIG. 5. The MPEG2 transport stream is constituted of an integer number of Aligned units. An Aligned unit has a size of 6144 bytes bytes) and starts with the first byte of a source packet. A source packet has a 192-byte length. One source packet consists of a TP_extra_header and a transport packet. A TP_extra_header has a 4-byte length, and a transport packet has a 188-byte length. One Aligned unit consists of 32 source packets. Data in a video stream and an audio stream is packetized into an MPEG2 PES (Packetized Elementary Stream) packet. The PES packet is packetized into a transport packet.

Figure 6:
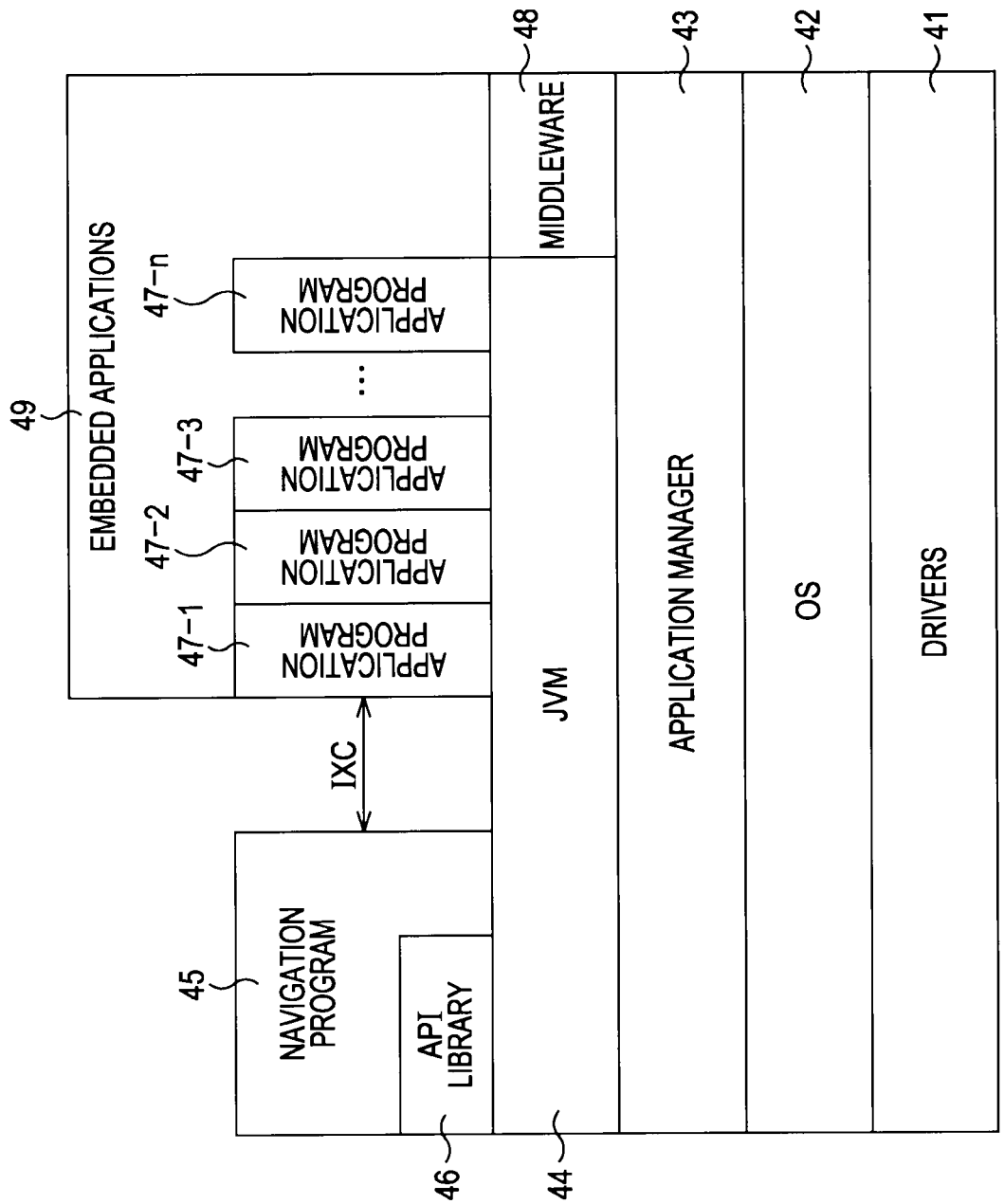
FIG. 6 is a software stack diagram for describing functions of a controller in FIG. 1.

FIG. 6 is a diagram for describing a first example of a so-called software stack, which is a module structure indicating, among functions included in the controller 21 in FIG. 1, functions provided by a JAVA (registered trademark) environment and functions embedded in advance in the recording/reproducing apparatus 1.

Also, it is described here that the whole navigation program executed by the controller 21 and application programs executable in cooperation with the navigation program are written using the JAVA (registered trademark) language. However, these programs are similarly executable even in the case where they are written using any programming language, such as C# or Visual Basic, as long as the programming language can run on a virtual machine, that is, the programming language can run on a multi-platform. Also, embedded applications 49 which are programs that control functions embedded in advance in the recording/reproducing apparatus 1 are not necessarily written using a programming language that can run on a multi-platform, but are preferably written using a language that makes it possible to perform inter-application communication with a JAVA (registered trademark) Xlet, such as C or C++.

Drivers 41 are items of dedicated software for activating hardware of the recording/reproducing apparatus 1. The drivers 41 include drivers for controlling hardware such as various motors and an optical pickup included in the optical disc drive 22 and the drive 27, drivers for displaying images on an externally connected display device and outputting audio from an externally connected loudspeaker, a driver for controlling operations of buttons and keys provided in the operation input unit 29 or a receiver or the like of commands from a remote commander which is not shown in the drawings, a driver for controlling information exchange via the Internet interface 25, and the like.

The OS (Operation System) 42 serves as a basic operation base of the controller 21 and is software that provides basic functions commonly used by many application programs (here, a navigation program 45 and application programs 47-1 through 47-$n$), such as managing the drivers 41 which are items of software for activating the hardware and managing the memory 23 and the local storage 24 recording various items of information, and that manages the entire system of the recording/reproducing apparatus 1.

An application manager 43 is adapted to manage processes executed by a plurality of applications (here, the navigation program 45 and the application programs 47-1 through 47-$n$) adapted to be executable in this software stack.

A JVM (JAVA (registered trademark) Virtual Machine) 44 is software that converts JAVA (registered trademark) bytecode into native code of the platform and executes the native code. The navigation program 45 and application programs 47-1 through 47-$n$ which are items of software developed using JAVA (registered trademark) are in a unique format (JAVA (registered trademark) bytecode) independent of the platform and cannot be executed as they are. Therefore, the JVM 44 executes the navigation program 45 and application programs 47-1 through 47-n by converting JAVA (registered trademark) bytecode into native code of the recording/reproducing apparatus 1.

The navigation program 45 is, for example, as has been described using FIG. 2 through FIG. 5, a program provided to reproduce data recorded on the optical disc 11 and in the local storage 24, and is a program for controlling processes relating to data stored on the mounted optical disc 11 and in a region in the local storage 24 which is associated with the mounted optical disc 11.

An API library 46 is a set of commands and functions that can be used when developing the navigation program 45 which is software running on the JVM 44 or a set of protocols defining program-related procedures for using these commands and functions. The developer of the navigation program 45 can create software using a function thereof simply by calling the function in accordance with the protocols, without programming the software by himself/herself. As a specific example of API, an API relating to file access will be described later.

That is, the navigation program 45 can control the hardware of the recording/reproducing apparatus 1 only within the range of the commands and functions prepared as the API library 46.

The application programs 47-1 through 47-n are written in a programming language such as JAVA (registered trademark) and run on the JVM 44. Whereas the navigation program 45 is basically adapted to provide a predetermined function associated with the optical disc 11, the application programs 47-1 through 47-n are application programs for providing unique functions of the recording/reproducing apparatus 1. The application programs 47-1 through 47-n may be saved in advance in the local storage 24 in the recording/reproducing apparatus 1, may be installed using the optical disc 11 or the removable medium 28, or may be downloaded via the network 2 and installed.

In the following description, when it is unnecessary to distinguish the individual application programs 47-1 through 47-n, the application programs 47-1 through 47-n are simply referred to as the application programs 47.

Middleware 48 is adapted to operate on the OS 42 and to provide specific functions that are more advanced than the OS 42 to the embedded applications 49, which may be adapted to be executed in the unique environment of the recording/reproducing apparatus 1 (controller 21) in contrast to the multi-platform. Note that the embedded applications 49 may be written in a language that can run in a virtual machine environment, such as JAVA (registered trademark). In that case, the middleware 48 becomes substantially the JVM 44.

The embedded applications 49 are adapted to be executable on the middleware 48 regardless of whether or not the optical disc 11 having recorded thereon the navigation program is mounted in the recording/reproducing apparatus 1. The embedded applications 49 are applications higher than the application programs 47 (the embedded applications 49 are shown in the drawing so that the embedded applications 49 are applications higher than the application programs 47; this does not mean that a portion thereof is executable on the JVM, but the embedded applications 49 are only executable on the middleware 48).

Alternatively, the embedded applications 49 may be adapted to realize functions that are not directly related to a process of reproducing information recorded on the optical disc 11. That is, the embedded applications 49 are not programs needed for a process of reproducing content data recorded on the mounted optical disc 11 or downloaded data stored in the local storage 24 in association with the optical disc 11, such as a program that controls recording of program content provided to the user via broadcast waves, a cable network, or the like, a program that executes web browser and database processes, a program that controls displaying of a display screen (so-called GUI) serving as an assistant to the user operation input, an interface in the case where information is exchanged with a predetermined server via the network 2, or a process of recording data onto a mounted recording medium such as an optical disc.

In this manner, when the embedded applications 49 which are not essential for a process of reproducing content data recorded on the mounted optical disc 11 or downloaded data stored in the local storage 24 in association with the optical disc 11 are adapted to be executable in environments other than a virtual machine environment such as JAVA (registered trademark), hardware and software resources that have hitherto been used or that are used in other apparatuses or the like, although not corresponding to the multi-platform, can be diverted for use or commonly used. Therefore, the development cost can be significantly suppressed.

Figure 7:
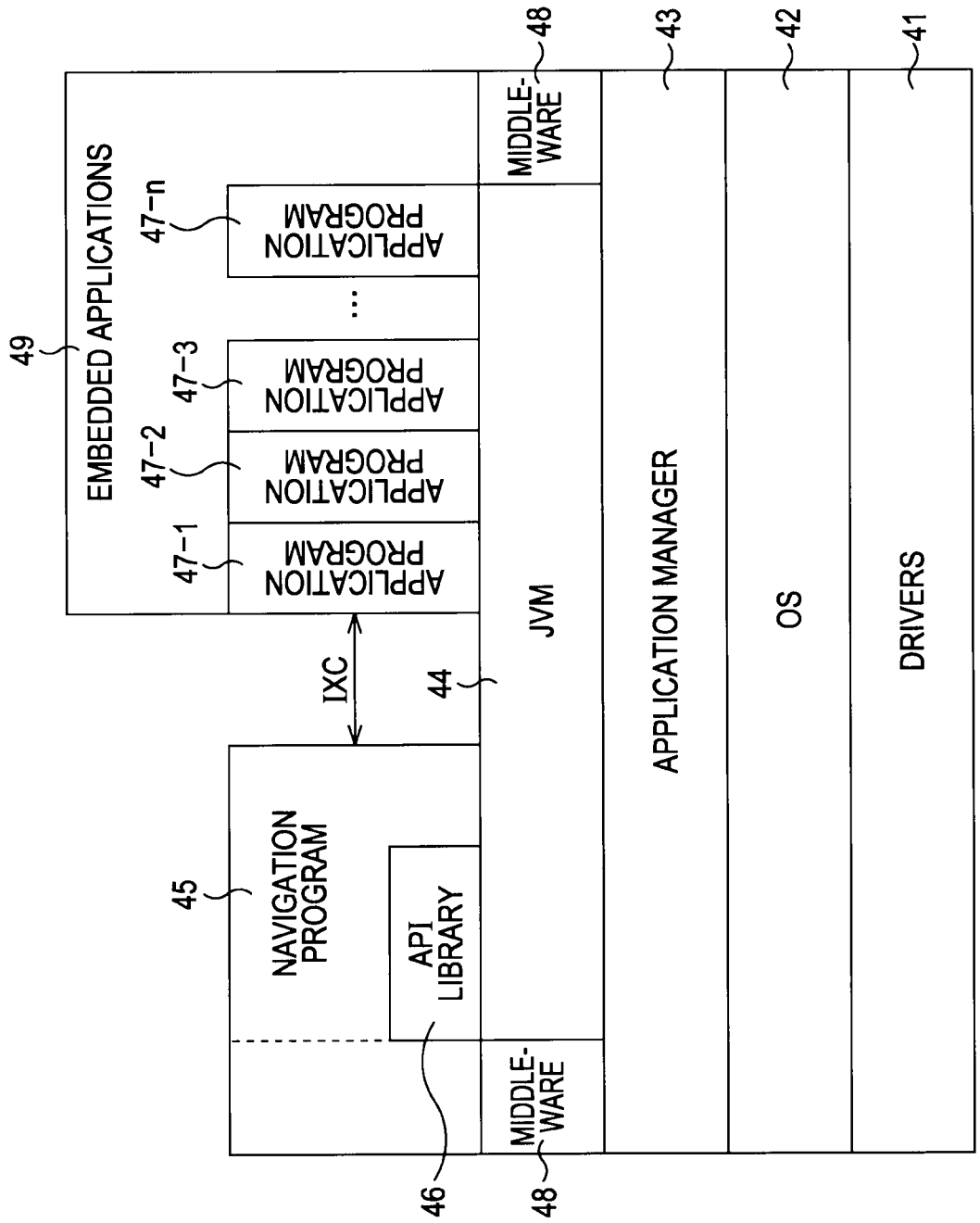
FIG. 7 is a software stack diagram for describing functions of the controller in FIG. 1 with a software structure different from the case described using FIG. 6.

Next, FIG. 7 shows a second example of the software stack in the controller 21.

This case here is basically similar to the case described using FIG. 6 except that a portion of the navigation program 45 executed by the controller 21 and the application programs 47 executable in cooperation with the navigation program 45 are written using the JAVA (registered trademark) language, and that a portion of the navigation program 45 and the embedded applications 49 need not necessarily be written using the JAVA (registered trademark) language (executed on the middleware 48).

Even in the case with such a structure, since the portion of the navigation program 45 and the application programs 47 which are executable in cooperation with the navigation program 45 are written using a programming language that can run on a virtual machine, that is, that can run on the multi-platform, such as the JAVA (registered trademark) language, inter-application communication is executed using IXC, and a cooperative process is executed.

Also similarly in this case, when the embedded applications 49 which are not essential for a process of reproducing content data recorded on the mounted optical disc 11 or downloaded data stored in the local storage 24 in association with the optical disc 11 are adapted to be executable in environments other than a virtual machine environment such as JAVA (registered trademark), hardware and software resources that have hitherto been used or that are used in other apparatuses or the like, although not corresponding to the multi-platform, can be diverted for use or commonly used. Therefore, the development cost can be significantly suppressed.

In this manner, the application programs 47 can control the hardware of the recording/reproducing apparatus 1 using unique APIs different from the API library 46 prepared for the navigation program 45 (that is, an API 51 and an API 52 described later using FIG. 8). In other words, the application programs 47 can operate various parameters in the recording/reproducing apparatus 1. Also, the application programs 47 can perform control of a system that is included in advance in the recording/reproducing apparatus 1 for realizing a specific function that is not written in JAVA (registered trademark).

For example, when the recording/reproducing apparatus 1 has a function of receiving broadcast programs, a function of changing the channel of a broadcast program to receive, a function of recording the received broadcast program, a function of connecting to a wide area network such as the Internet and performing web browsing, an interface function in the case of exchanging information with a predetermined server via the network 2, or a function of recording data on a mounted recording medium such as an optical disc, the embedded applications 49 which provide these functions and the application programs 47 capable of controlling these functions in cooperation with the navigation program 45 can be prepared. Note that, when commands and the like that control these functions are not included in the commands and functions prepared as the API library 46, the navigation program 45 cannot directly control these functions.

The optical disc 11 is configured to be playable by apparatuses other than the recording/reproducing apparatus 1 as long as the apparatuses have a certain function needed to execute the navigation program 45 and the navigation program 45 is installed in these apparatuses. That is, the navigation program 45 and the API library 46 for reproducing data recorded on the optical disc 11, together with data recorded in the local storage 24 according to need, are essential applications that should be included in all apparatuses that play the optical disc 11. It is difficult to prepare, in the API library 46, all functions that are respectively unique to various apparatuses that play the optical disc 11, i.e., all functions other than the certain function needed to execute the navigation program 45. Therefore, it is highly likely that APIs relating to functions that are not essential for a process of playing the optical disc 11 (functions unique to the recording/reproducing apparatus 1) are not prepared in the API library 46. The navigation program 45 cannot directly control the functions unique to the recording/reproducing apparatus 1.

In other words, even when the application programs 47 and the embedded applications 49 do not exist, the recording/reproducing apparatus 1 can execute a process of playing the optical disc 11. Specifically, for example, even an apparatus not provided with, as the functions unique to the recording/reproducing apparatus 1, the function of receiving broadcast programs, the function of recording obtained program content, the database function, the web browsing function, and the like, or an apparatus that has no function of recording data to the mounted recording medium, i.e., that has only a playback function, can play the optical disc 11 as long as an environment in which the navigation program 45 is executable is provided.

Also, the embedded applications 49 are applications that are solely executable independent of the navigation program 45. Alternatively, the application programs 47 may conversely be adapted to run only when in cooperation with the navigation program 45. The navigation program 45 and the embedded applications 49 can be executed completely independent of each other. In order that the navigation program 45 and the embedded applications 49 be executed in cooperation (association) with each other, the application programs 47 must be provided therebetween.

The navigation program 45 in the case where the application programs 47 and the navigation program 45 are adapted to run in cooperation with each other is adapted to be capable of detecting and activating the application programs 47 which are saved in the local storage 24 or the memory 23 and which run in cooperation with itself. That is, for example, at least one item of identification information for identifying the optical disc 11 (e.g., disc_id or content_id described later), at least one item of identification information for identifying the provider of the content (e.g., org_id described later), or the like (that is, when the application programs 47 are adapted to run in cooperation with a plurality of navigation programs 45, a plurality of items of identification information) are associated with the application programs 47. The navigation program 45 is adapted to detect and activate the application programs 47 associated with the predetermined identification information and to execute an operation in cooperation with the application programs 47.

Alternatively, for example, the application programs 47 may be adapted to be activated by a user operation input. Even in such a case, the application programs 47 are adapted to run in cooperation with the navigation program 45. Also, for example, one or a plurality of items of identification information for identifying the optical disc 11 (e.g., disc_id or content_id described later), one or a plurality of items of identification information for identifying the provider of the content (e.g., org_id described later), or the like can be associated with the application programs 47.

Also, the application programs 47 and the navigation program 45 (or a portion of the navigation program 45) running on the JVM 44 can be configured as JAVA (registered trademark) Xlets, and communication between these applications is executed using IXC (Inter-Xlet Communication).

Further, mutual inter-application communication between the multiple application programs 47 running on the JVM 44 is also executed using IXC.

An Xlet is an application execution model whose specification has been defined using profiles of a PBP (Personal basis Profile) and a PP (Personal Profile). An Xlet is originally defined in JAVA (registered trademark) TV, which is a JAVA (registered trademark) execution environment specification for television set-top boxes. Inter-Xlet communication, that is, IXC specification, has been added to the specification, and the specification defines an Xlet as an application model on a CDC (Connected Device configuration).

An Xlet execution environment supports simultaneous execution of multiple Xlets. Since the individual Xlets use independent class loaders, the individual Xlets cannot directly refer to the other Xlets. IXC is defined for exchanging information between the multiple Xlets. A specific example in the case where information is exchanged using IXC between Xlets, that is, between the application programs 47 and the navigation program 45, and a cooperative process is executed will be described later using FIG. 24 through FIG. 39.

Figure 8:
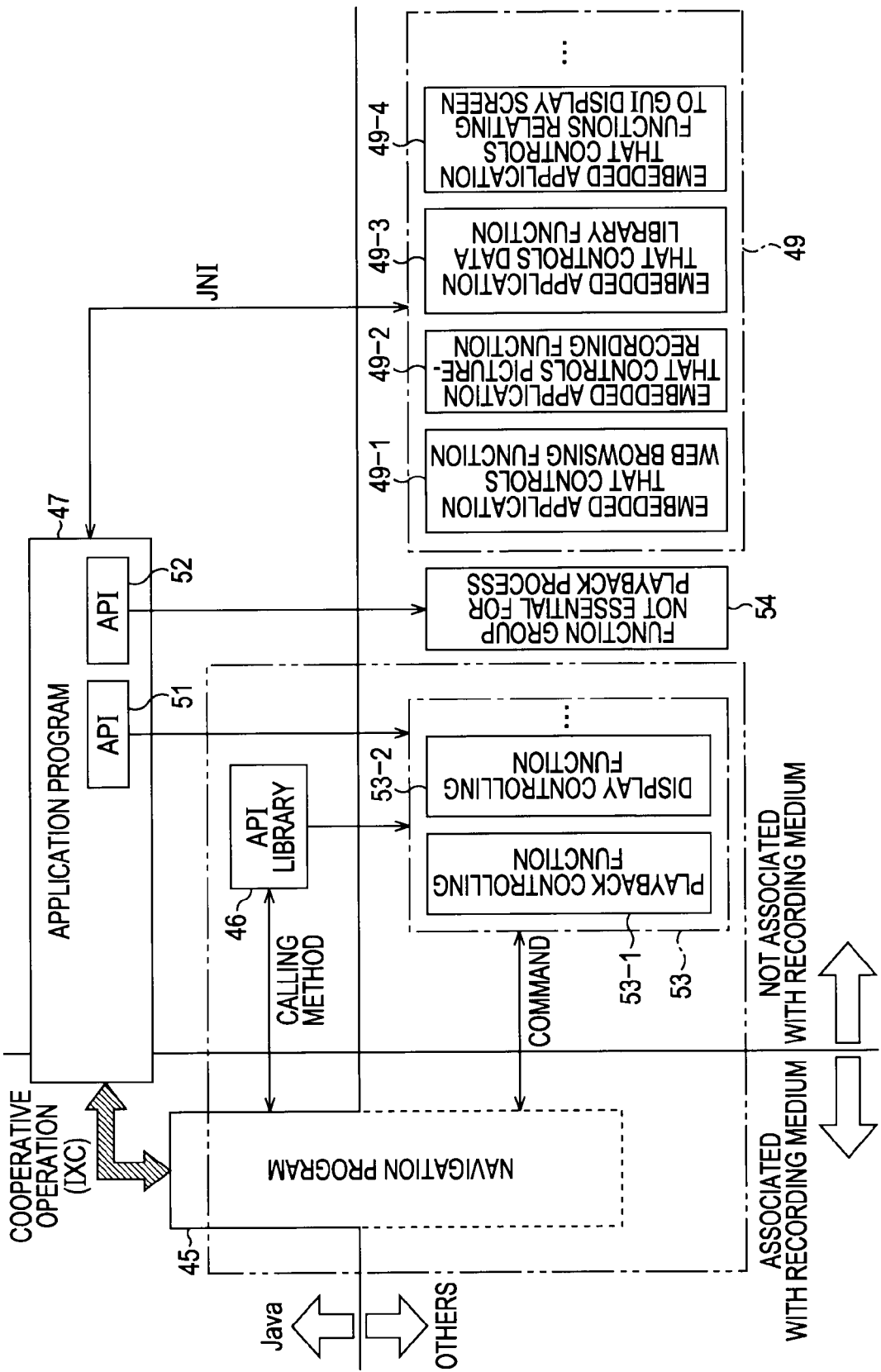
FIG. 8 is a diagram for describing relations between description languages and applications in the functions of the controller in FIG. 1.

Next, FIG. 8 is a diagram for describing relations between description languages and applications in the individual items of application software represented in the software stack described using FIG. 6 and FIG. 7.

That is, at least a portion of the navigation program 45 is written in JAVA (registered trademark), and another portion of the navigation program 45 may be written in another language. The navigation program 45 controls a function group 53 that is essential for a process of reproducing content data recorded on the mounted optical disc 11 or downloaded data stored in the local storage 24 in association with the optical disc 11 (e.g., including various functions realized by the drivers 41), such as a playback controlling function group 53-1 and a display controlling function block 53-2, basically by calling a method from the API library 46. Also, in the navigation program 45, a portion written in another language may be adapted to directly control the function group 53 using a predetermined command.

In the recording/reproducing apparatus 1, in order to play optical discs 11 of a plurality of types provided by various content authors, or in order to make the individual optical discs 11 to be playable not only by the recording/reproducing apparatus 1 but also by recording/reproducing apparatuses, reproducing apparatuses, or the like provided by various manufacturers, there is a need for a standard (or protocols pursuant to the standard) to which the content authors providing the optical discs 11 and the manufacturers providing the reproducing apparatuses (including the recording/reproducing apparatus 1) conform.

That is, in order to execute a process of reproducing content data recorded on the optical disc 11 mounted in the recording/reproducing apparatus 1 or downloaded data stored in the local storage 24 in association with the optical disc 11 using the navigation program 45 associated with the optical disc 11, i.e., in order to control the function group 53 which is essential for a playback process, an API library method in the case of calling a method in the API library 46 or a command in the case of directly issuing a command needs to be defined by the standard (or protocols pursuant to the standard).

In contrast, since the application program 47 which is activated by the navigation program 45, runs in cooperation with the navigation program by performing inter-application communication using IXC, and is written in JAVA (registered trademark) is not essential for a playback process, the application program 47 need not conform to the standard (or protocols pursuant to the protocol).

Therefore, the application program 47 prepares the unique API libraries 51 and 52 different from the API library 46, and accordingly, the application program 47 can access the function group 53 whish is essential for a playback process and can access a function group 54 that is included in the recording/reproducing apparatus 1 and is not essential for a playback process. Further, the application program 47 can access the embedded applications 49 which are local functions of the recording/reproducing apparatus 1 using JNI (JAVA (registered trademark) Native Interface).

The embedded applications 49 which are local functions of the recording/reproducing apparatus 1 include, for example, an embedded application 49-1 that controls a web browsing function (so-called web browser), an embedded application 49-2 that controls a picture recording function, an embedded application 49-3 that controls a data library function (e.g., so-called database software or a part of the function thereof), an embedded application 49-4 that controls functions relating to a GUI display screen and obtaining of a user operation entered by a user who refers to the GUI display screen, and the like.

Note that the embedded applications 49 have been described here as being written in another language different from JAVA (registered trademark). Needless to say, however, the embedded applications 49 may be written in JAVA (registered trademark). In that case, the application program 47 and the embedded applications 49 execute inter-application communication using IXC. In other words, the application program 47 which is not required to conform to the standard (or protocols pursuant to the standard) for playing the optical disc 11 on a reproducing apparatus or the like is adapted to be capable of performing inter-application communication regardless of whether the embedded applications 49 are written in another language different from JAVA (registered trademark) or are written in JAVA (registered trademark). In contrast, the navigation program 45 which is required to conform to the standard (or protocols pursuant to the standard) cannot perform inter-application communication with the embedded applications 49.

In some cases, the versions of these embedded applications 49 are updated. Since it is normally the case that these embedded applications 49 are commonly used in a plurality of information processing apparatuses or the like and that the embedded applications 49 are designed assuming in advance that the versions thereof are to be updated, it is often the case that the versions of the embedded applications 49 are updated without changing interfaces with the OS and other applications. Therefore, even when the versions of the embedded applications 49 are updated, if the interface with the application program 47 is not changed, the inter-application communication function with the application program 47 is maintained. Therefore, even when the versions of the embedded applications 49 which are used in the case where the navigation program 45 and the application program 47 run in cooperation with each other are updated, similar processing can be executed without changing the navigation program 45 and the application program 47.

Specifically, for example, in the embedded application 49-4 which controls the functions relating to the GUI display screen, for example, by determining in advance a class library regarding scrolling of the screen, a method of selecting and determining an icon or the like, obtaining of a user operation entered by a user who refers to the GUI display screen, or the like, even when the versions of the embedded applications 49 are updated, similar processing can be executed without changing the navigation program 45 and the application program 47.

With such a structure, when a predetermined apparatus is configured to be controllable from a remote place by supplying a control program that directly controls functions included in the predetermined apparatus, supplying a command for a control program that has already been installed in the predetermined apparatus, or the like using various recording media or wired or wireless communication, that is, unlike the case where a single application is merely executed in the predetermined apparatus, since a program supplied from the outside (here, the navigation program 45) and an application that has already been installed in the apparatus (here, the application program 47; in some cases, substantially including the embedded applications 49) run in cooperation with each other, it is possible to provide the recording/reproducing apparatus 1 which can provide a service unique to the apparatus in association not solely with the apparatus, but with the optical disc 11, while conforming to the standard (or protocols pursuant to the standard) defined so that content associated with the optical disc 11 can be played by various reproducing apparatuses or the like.

Figure 9:
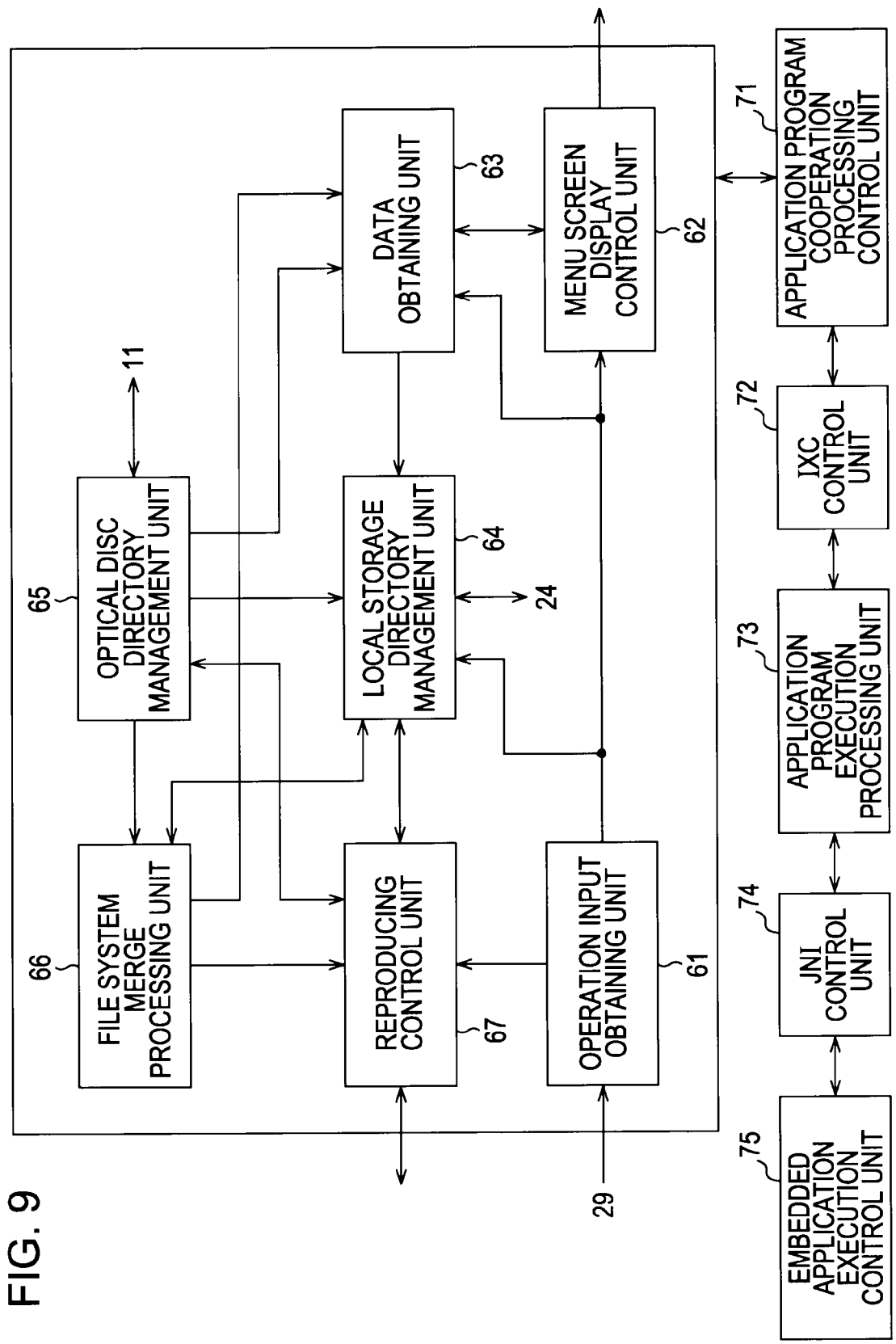
FIG. 9 is a functional block diagram for describing the functions of the controller in FIG. 1.

FIG. 9 is a functional block diagram showing an exemplary functional structure realized in the case where, among the functions of the controller 21 described using FIG. 6, the navigation program is being executed.

Each structure in FIG. 9 is realized by executing, using the controller 21, the navigation program 45 prepared in advance or recorded on the optical disc 11.

An operation input obtaining unit 61 obtains a signal indicating an operation input from the user, which has been input from the operation input unit 29, and outputs the signal indicating the operation input from the user to a corresponding unit(s) among a menu screen display control unit 62, a data obtaining unit 63, a local storage directory management unit 64, or a reproducing control unit 67.

The menu screen display control unit 62 displays, on an external display device, a menu screen including buttons operated by the user when selecting audio, the language of subtitles, and the angle of video of content recorded on the optical disc 11, buttons operated by the user when selecting an update file to download and a file to delete, and the like.

The data obtaining unit 63 controls communication performed using the Internet interface 25 in FIG. 1 or information exchange with the removable medium 28 using the drive 27. For example, the data obtaining unit 63 downloads and obtains, from the server 3, an update file designated by the user, and outputs the obtained file to the local storage directory management unit 64. In addition, the data obtaining unit 63 receives supply of information indicating a necessary file from a file system merge processing unit 66 described later, downloads and obtains the necessary file from the server 3, and outputs the obtained file to the local storage directory management unit 64.

The local storage directory management unit 64 manages a directory of the local storage 24 and controls writing of data into the local storage 24, reading of data from the local storage 24, and deletion of data from the local storage 24. For example, a PlayList that has been read out from the local storage 24 under control of the local storage directory management unit 64 is output to the memory 23, and audio data and video data in an AV stream and text data in a text subtitle file which are read out from the local storage 24 are output to the transcoder 26. In addition, when merging of the file system of the optical disc 11 and the file system of the local storage 24 is to be performed by the file system merge processing unit 66, the local storage directory management unit 64 outputs information regarding the file system of the local storage 24 to the file system merge processing unit 66.

An optical disc directory management unit 65 detects and manages the directory of the optical disc 11 and controls reading of each item of data from the optical disc 11. On the optical disc 11, organization_id which is identification information (hereinafter may also be referred to as org_id), disc_id, and, according to need, content_id are set. Under control of the optical disc directory management unit 65, org_id and disc_id (content_id according to need) read out from the optical disc 11 are output to the data obtaining unit 63 and the local storage directory management unit 64. In addition, a PlayList that has been read out from the local storage 11 under control of the optical disc directory management unit 65 is output to the memory 23, and audio data and video data in an AV stream and text data in a text subtitle file which are read out from the optical disc are output to the transcoder 26. In addition, when merging of the file system of the optical disc 11 and the file system of the local storage 24 is to be performed by the file system merge processing unit 66, the optical disc directory management unit 65 outputs information regarding the file system of the optical disc 11 to the file system merge processing unit 66. A description of org_id, disc_id, and content_id will be given later.

The file system merge processing unit 66 merges the file system of the optical disc 11, which is supplied from the optical disc directory management unit 65, and the file system of the local storage 24, which is supplied from the local storage directory management unit 64, to generate one virtual file system. The file system merge processing unit outputs the virtual file system generated by the merging to the reproducing control unit 67.

In addition, when several files recorded in the local storage 24 are deleted (erased, that is, data is deleted), the file system merge processing unit 66 determines whether or not a failure occurs in a link structure of files in the virtual file system (that is, link of data for playing a Clip using a PlayList on the basis of the application format of the optical disc 11, such as that described using FIG. 2 through FIG. 4) due to the deletion of the several files. When it is determined that a failure occurs in the link structure of the files in the virtual file system, the file system merge processing unit 66 extracts a file necessary to remedy the failure and supplies information indicating the necessary file to the data obtaining unit 63 so as to enable the data obtaining unit 63 to download the necessary file.

Further, for example, when files that are not played by any PlayList occur (not designated by all PlayLists) in the virtual file system due to the deletion of the several files recorded in the local storage 24, the file system merge processing unit 66 can instruct the local storage directory management unit 64 to delete such unnecessary files.

Note that whether or not to delete unnecessary files that occur due to deletion of several files may be set by the user.

The reproducing control unit 67 executes the navigation program 45 designated by the virtual file system supplied from the file system merge processing unit 66 and controls playback of content. Specifically, the reproducing control unit 67 refers to a PlayList supplied to and stored in the memory 23, controls the local storage directory management unit 64 or the optical disc directory management unit 65 to read out audio data and video data in an AV stream and, according to need, text data in a text subtitle file, which are recorded on the optical disc 11 or in the local storage 24, on the basis of the virtual file system, and controls the transcoder 26 in FIG. 1 to perform decoding (playback) of the audio data and video data in the AV stream and, according to need, the text data in the text subtitle file, which are recorded on the optical disc 11 or in the local storage 24.

An application program cooperation processing control unit 71 detects whether or not, at the time of executing the navigation program 45, the application program 47 to be executed in cooperation with itself exists. When the application program 47 to be executed in cooperation with itself exists, the application program cooperation processing control unit 71 exchanges information with the application program 47 using an IXC control unit 72 and executes a predetermined operation. A specific example of a process executed by the application program cooperation processing control unit 71 will be described later using FIG. 24 through FIG. 39.

The IXC control unit 72 is configured to control the above-described IXC and has an interface function between the navigation program 45 and the application program 47. That is, the IXC control unit 72 controls sending of data or parameters obtained by the process executed with the functions of the operation input obtaining unit 61 through the reproducing control unit 67 to the application program 47 (specifically, binding to IxcRegistry) and controls reception of information from the application program 47 (specifically, looking up IxcRegistry). Further, the IXC control unit 72 also has an interface function between the plurality of application programs 47.

An application program execution processing unit 73 controls execution of the application program 47. A JNI control unit 74 has a JNI-based interface function between the application program 47 and the embedded applications 49. An embedded application execution control unit 75 controls execution of the embedded applications 49. In addition, when the embedded applications 49 are not executed inside the recording/reproducing apparatus 1 and are executed by another apparatus connected to the recording/reproducing apparatus 1, the embedded application execution control unit may be adapted to control processes executed by the other external apparatus.

Next, using FIG. 10 through FIG. 19, merging performed by the file system merge processing unit 66 in the navigation program 45 of a file system of the optical disc and a file system that manages a data group recorded in the local storage 24 by downloading from the server 3, copying from the removable medium 28, copying from the optical disc 11, or the like will be described.

Merging of the file systems is performed when, for example, the optical disc 11 is mounted in the recording/ reproducing apparatus 1, when an instruction to play content recorded on the optical disc 11 is given, when an instruction to input/output any item of data recorded on the optical disc 11 or in the local storage 24 is given, when an instruction for merging is given by the user, or the like.

Figure 10:
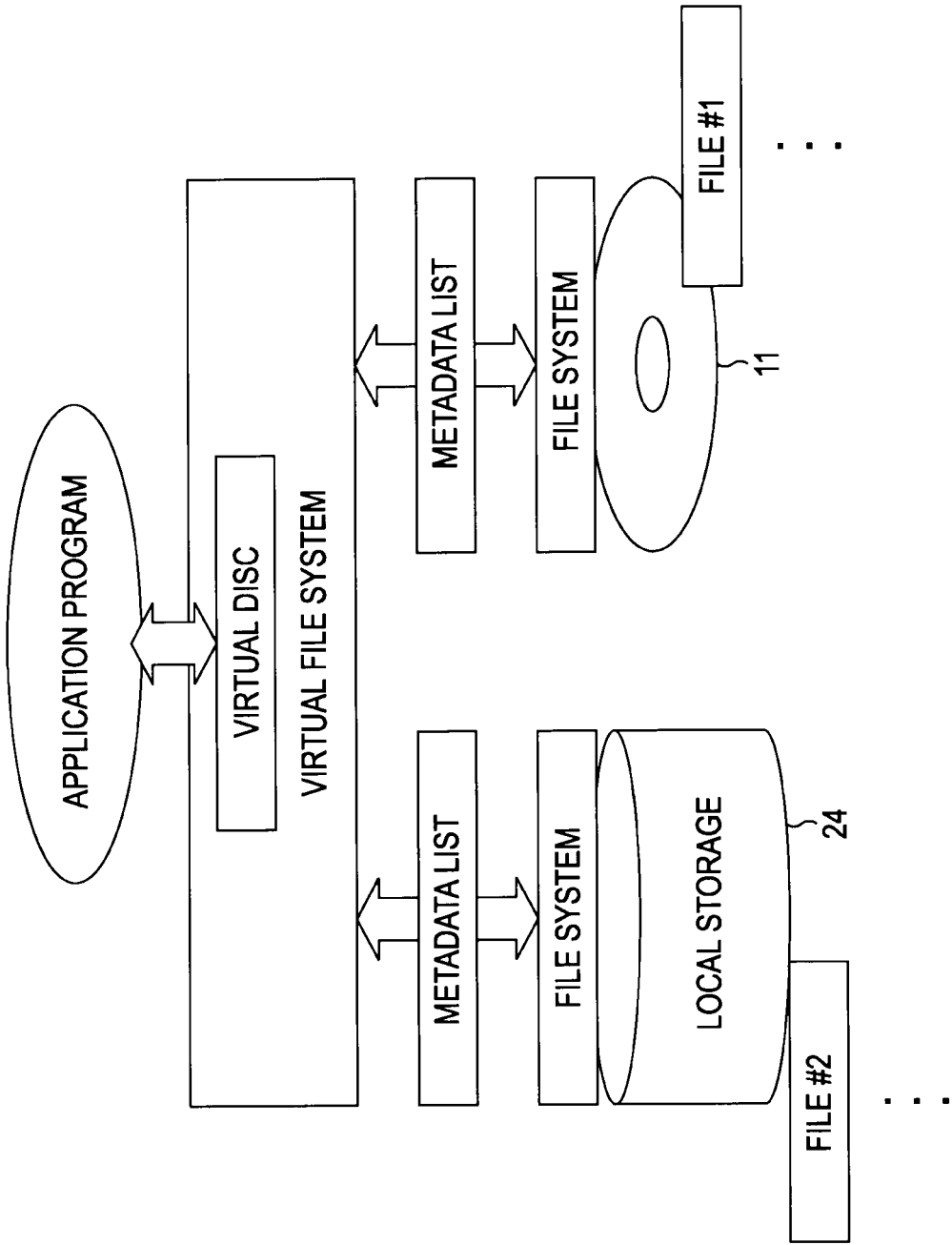
FIG. 10 is a diagram for describing a virtual file system.

A virtual file system is defined as an upper layer of a native file system of the system of the recording/reproducing apparatus 1 (file system of data actually recorded on the optical disc 11 or in the local storage 24). That is, as shown in FIG. 10, only the virtual file system which is the upper layer can be recognized by the navigation program 45, which executes a process of downloading new data from the server 3 and recording the new data in the local storage 24 or reproducing data actually recorded on the optical disc 11 or in the local storage 24, or by the user who handles the navigation program 45. In other words, the virtual file system is constructed to make the native file system abstract and to conceal the native structure, such as a physical device and the operating system in the recording/reproducing apparatus 1.

The role of the virtual file system is mainly to mount a file/directory in the physical device (the optical disc 11 or the local storage 24) to construct a file system of a virtual disc recognized by the user and to provide to the navigation program 45 a file access API for the constructed virtual disc.

Figure 11:
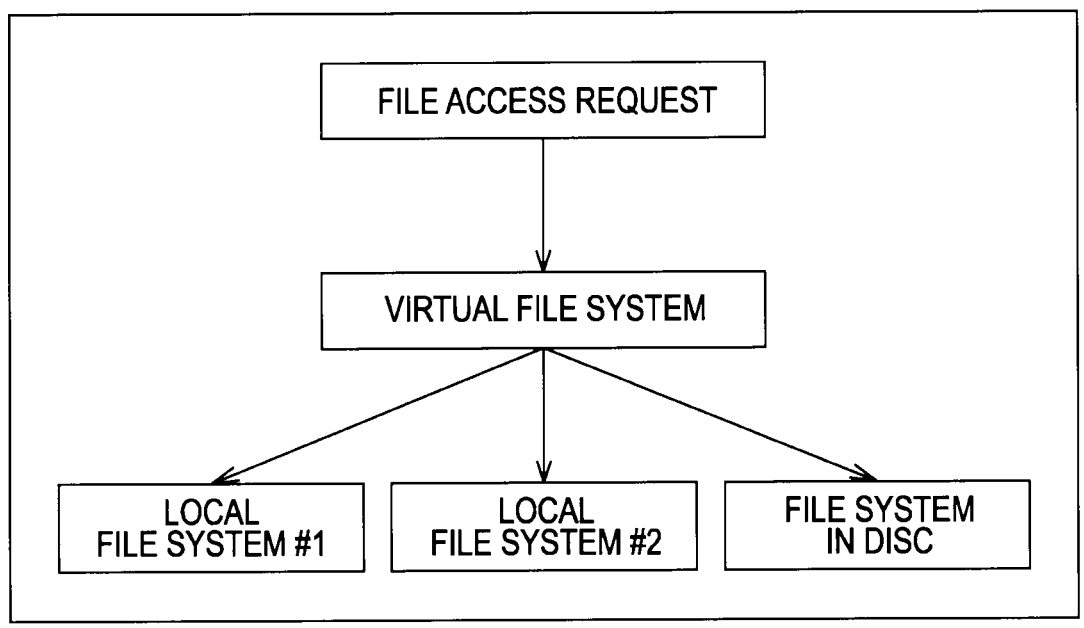
FIG. 11 is a diagram for describing the virtual file system.

For example, when the user performs an operation input to request access to any file recorded on the optical disc or in the local storage 24, as shown in FIG. 11, the navigation program 45 can recognize only the virtual file system.

A local file system #1 or a local file system #2 recorded on the optical disc 11 or in the local storage 24, which is the actual physical device, or the structure of the file system in the optical disc 11 is concealed from the navigation program 45 and the user who handles the navigation program 45 and is configured to be accessible via the virtual file system.

In order to execute a file access request shown in FIG. 11, the navigation program 45 in the recording/reproducing apparatus 1 calls a file input/output API (Application Programming Interface) provided by the virtual file system, thereby making the data actually recorded on the optical disc 11 or in the local storage 24 accessible without being conscious of the physical structure of the disk drive, the software structure of the file system, and the like. That is, the API of the virtual file system is actually calling the API of the native file system in the recording/reproducing apparatus 1.

The virtual file system provides various APIs (APIs included in the API library 46 in FIG. 6). APIs such as open( ) that opens a designated file, close( ) that closes a designated file, seek( ) that sets a reading position or writing position of a designated file, stat( ) that obtains the state of a designated file, read( ) that reads out a designated file, write( ) that writes a designated file are provided. When the navigation program 45 is being executed (that is, when the functions described using FIG. 9 are being realized), the reproducing control unit 67 uses these APIs to operate a file recorded on the optical disc 11 or in the local storage 24.

Figure 12:
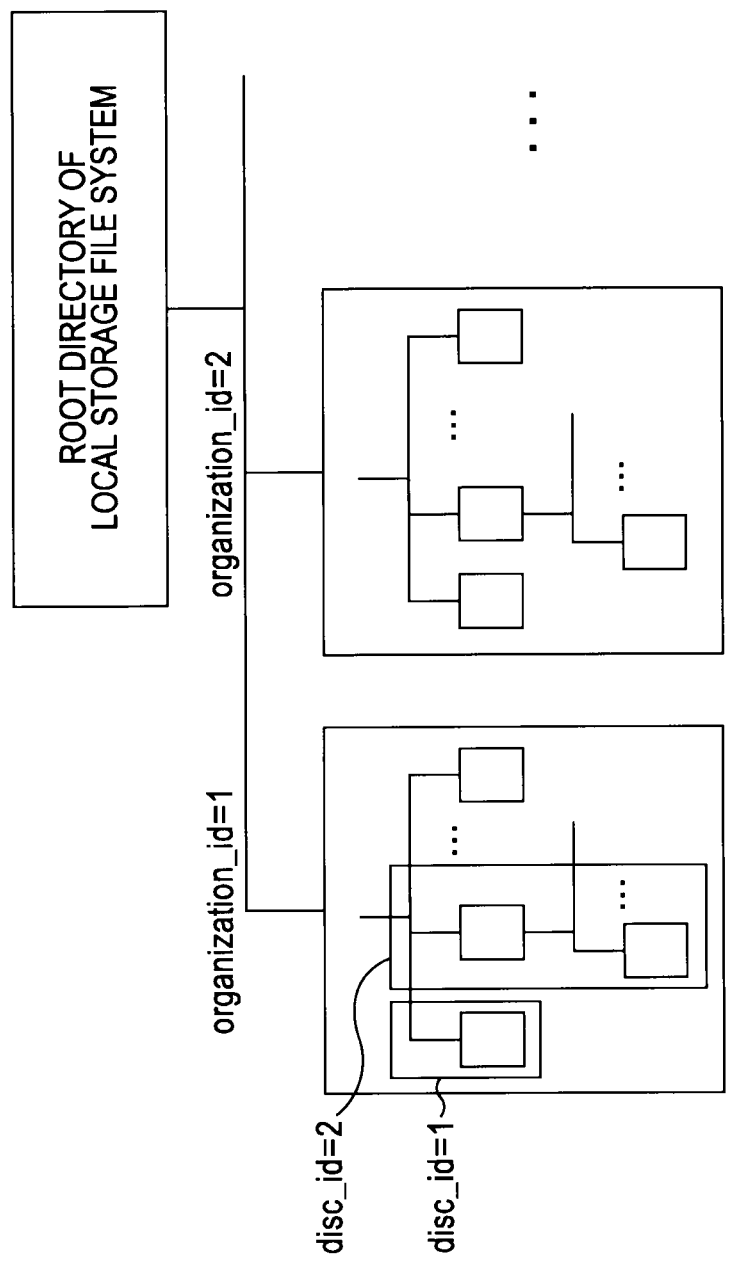
FIG. 12 is a diagram for describing the directory structure of a local storage.

Also, the virtual file system has a function of splitting and managing a disk region of the local storage 24. In the disk region of the local storage 24, a storage region for a file group managed by the navigation program 45 has, for example, a directory structure split for each org_id, as shown in FIG. 12. Below disc_id which is a directory immediately below org_id, a flexible file/directory structure can be constructed by a content author (provider of the content). Where in the disk region of the local storage 24 data to be stored in the local storage 24 is to be located, that is, the file/directory structure of a file to be downloaded, is designated by a description of file management information (Manifest file described later) included in data to be downloaded.

In the file/directory structure of the local storage 24, org_id which splits the directory is an identifier for use in constructing a virtual file system in a corresponding optical disc; and disc_id is an identifier for identifying each item of content associated with the same org_id and is used to construct a virtual file system in a corresponding optical disc, as in org_id. org_id and disc_id are items of information included in file management information (Manifest data described later) of data downloaded via the network 2 or detected from the optical disc 11 by the optical disc directory management unit 65.

org_id may be given for each organization or group, such as the provider of content (content author) or the manufacturer of content. Alternatively, a plurality of organizations or groups may use one org_id. Alternatively, one organization or group may use a plurality of org_ids. In addition, when it is assumed that one item of content is recorded on one optical disc 11, one disc_id is associated with the one optical disc 11. Alternatively, for example, a plurality of items of content may be recorded on one optical disc 11, and disc_ids may be associated with the individual items of content. Alternatively, when a plurality of items of content are recorded on one optical disc 11, one disc_id may be associated with the one optical disc 11, and content_ids different from disc_id may be associated with the individual items of content. That is, content_id is an identifier for identifying content. In this manner, regardless of how org_id and disc_id are used, the virtual file system is constructed on the basis of individual ids. Details of file management information (Manifest file), org_id, and disc_ id will be described later using FIG. 13.

In contrast, the directory/file structure of the virtual disc accessible from an application is adapted to conform to the directory/file structure of the optical disc 11. That is, the file structure of data below org_id and disc_id corresponding to the optical disc 11 mounted in the recording/reproducing apparatus 1 is merged with the file structure of data recorded on the optical disc 11, thereby constructing a virtual file system of a virtual disc having a directory/file structure based on the directory/file structure of the optical disc 11.

In addition, the virtual file system has a function of managing, besides a directory and file management scheme, file management information, that is, a Manifest file described later, in increments of a disc. There are three purposes for defining, by the virtual file system for the file model of the native file system, the field of a Manifest file which is file management information as metadata: to provide, instead of providing to the user a path or file name of a file actually recorded in the local storage 24, a name representing the contents of content to the user; to prevent double updating of the same file in a downloading process; and to define a path name in the virtual file system, that is, a path name at the time of playing the optical disc 11.

The virtual file system provides two functions for metadata management, a Manifest file and a metadata operation procedure. A Manifest file is metadata indicating various properties of a downloaded file. Manifest( ) may be saved in increments of a corresponding file, or Manifest ( ) sections may be merged into one file and set to be identifiable using manifest_id (described later in FIG. 13) which is the identifier of a Manifest( ) section as a key. Regardless of any format, here, they are collectively referred to as a Manifest file. The recording/reproducing apparatus 1 holding a file that has been downloaded to the local storage 24 must hold a Manifest file. Also, a Manifest file may be represented as text using a tagged language represented by XML.

FIG. 13 is a diagram showing the syntax of a Manifest file. manifest_id is an identifier of this Manifest( ) section.

organization_id (org_id) is a field for designating an identifier used to construct a virtual file system in a corresponding optical disc. This identifier is determined by referring to the org_id field of a content distribution file, which will be described later using FIG. 19. An application program or the user cannot freely set a value in this field.

disc_id is a field for designating an identifier for uniquely identifying each optical disc or each item of content associated with the same org_id. disc_id is also used, as in org_id, to construct a virtual file system in a corresponding optical disc. This identifier is determined by referring to the disc_id field of a content distribution file, which will be described later using FIG. 19. An application program or the user cannot freely set a value in this field.

Next, permission is a field for designating, by a content author, permission information indicating whether or not to make the property visible or invisible to a user, whether or not to forbid overwriting of the file, or the like. Note that information in permission may be written in any file other than the Manifest file or configured as an independent file.

FIG. 14 shows a list of values that can be designated in permission included in Manifest( ) in FIG. 13.

As shown in FIG. 14, when 0x00 is written in the 8-bit field of permission, the property of a file accompanied with this metadata is an invisible property to the user. When 0x01 is written in the 8-bit field of permission, the property of a file accompanied with this metadata is a visible property to the user. When 0x02 is written in the 8-bit field of permission, the property of a file accompanied with this metadata is an overwriting-forbidden property.

src_file_name is a field for designating a "path name" representing a so-called path that specifies a file using information that can uniquely designate, in the disk region of the local storage 24, where in the directory structure in the file system of a storage region managed by the navigation program 45, this file is to be recorded, that is, a file position in the hierarchical structure of the file system of the local storage 24. It is assumed that the names of files and directories for representing a path name are encoded in accordance with the ISO/IEC 646 standard.

dst_file_name is a field for designating a "path name" representing a so-called path that specifies a file using information that can uniquely designate, in a binding destination in the virtual disc of a file actually stored in the local storage 24, where in the directory structure this file is to be recorded, that is, a file position in the hierarchical structure of the virtual file system. It is assumed that the names of files and directories for representing a path name are encoded in accordance with the ISO/IEC 646 standard.

Note that the same name can be designated in src_file_name and dst_file_name.

When a file designated by src_file_name exists below directories with different org_ids, information for checking a file access permission is written in credential. Accordingly, a content file can be shared in directories below a plurality of org_ids in the local storage 24.

Next, a metadata operation procedure will be described.

The virtual file system defines an API for reading out the contents of Manifest( ) without publicizing the file name, file position, physical structure, or the like of Manifest( ) to the navigation program 45 or the user.

That is, the navigation program 45 or a resident program executed by software embedded in advance in the recording/reproducing apparatus 1 can indirectly access Manifest( ) by calling the following API.

get Property
Argument 1:
 character string type data
absolute path name of a file on which a metadata operation is to be performed
Argument 2:
 character string type data
 item name of metadata to read out
Return value:
character string type data
metadata corresponding to item designated by argument
Function:
read out metadata from Manifest( )

Note that, actually, detailed definitions of the API, such as type information, must be changed depending on the specification of the programming language of the software execution environment of the recording/reproducing apparatus 1.

Figure 15:
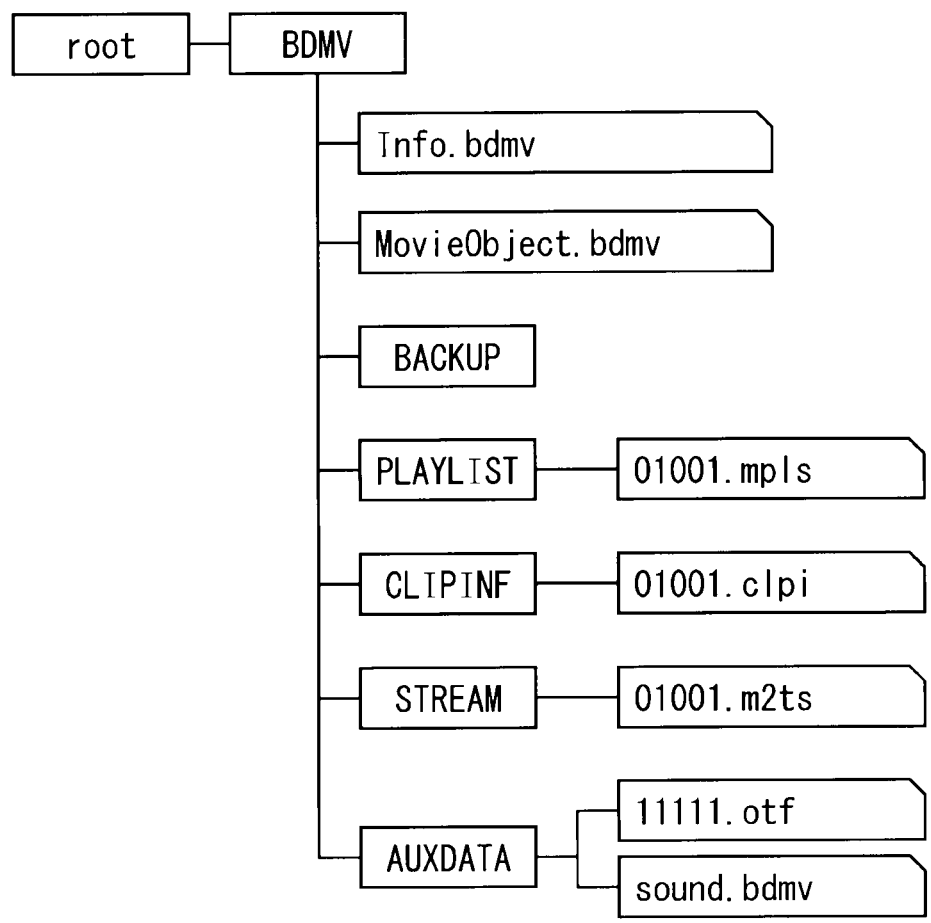
FIG. 15 is a diagram for describing an example of a file system of an optical disc.

FIG. 15 is a diagram showing an example of the file system of the optical disc 11. As shown in FIG. 15, the file system of the optical disc 11 has a directory structure.

Below "root" of the optical disc 11, a directory whose name has been set to "BDMV" is prepared. In that directory, a file whose name has been set to "Info.bdmv" and a file whose name has been set to "MovieObjects.bdmv" are stored. Hereinafter, these files are appropriately referred to as an Info file and a MovieObject file, respectively. In addition, each file is appropriately referred to by adding "file" to the "file name", or each directory is appropriately referred to by adding "directory" to the "directory name".

The Info file includes information regarding a menu for playing the optical disc 11. The recording/reproducing apparatus 1 displays a playback menu screen on the display device on the basis of the Info file, the playback menu screen including items whose contents include, for example, playing the whole content on the optical disc 11, playing only a specific chapter, performing repeated playback, displaying an initial menu, and the like. A MovieObject to be executed when each item is selected can be set in the Info file. When one item is selected by the user from the playback menu screen, the recording/reproducing apparatus 1 executes the command of the MovieObject set in the Info file.

The MovieObject file is a file including MovieObjects. A MovieObject includes a command that controls playback of a PlayList recorded on the optical disc 11, that is, a command issued by the navigation program 45. For example, the recording/reproducing apparatus 1 can play content recorded on the optical disc 11 by selecting and executing one from among MovieObjects recorded on the optical disc 11.

Further, a MovieObject includes various commands needed to execute a process in cooperation with the application program 47. Specifically, for example, a command that inquires as to whether or not the application program 47 executed in cooperation with the navigation program 45 is installed in the recording/reproducing apparatus 1, a command that activates the application program 47 when the application program 47 executed in cooperation with the navigation program 45 is installed in the recording/reproducing apparatus 1, and the like are included in a MovieObject.

In the BDMV directory, additionally a directory whose name has been set to "BACKUP" (BACKUP directory), a directory whose name has been set to "PLAYLIST" (PLAYLIST directory), a directory whose name has been set to "CLIPINF" (CLIPINF directory), a directory whose name has been set to "STREAM" (STREAM directory), and a directory whose name has been set to "AUXDATA" (AUX-DATA directory) are provided.

In the BACKUP directory, files and data for backing up files and data recorded on the optical disc 11 are recorded.

In the PLAYLIST directory, PlayList files are stored. Each PlayList file is given a name obtained by adding the extension ".mpls" to a file name consisting of a 5-digit number, as shown in the drawing.

In the CLIPINF directory, Clip Information files are stored. Each Clip Information file is given a name obtained by adding the extension ".clpi" to a file name consisting of a 5-digit number, as shown in the drawing.

In the STREAM directory, Clip AV stream files and sub-stream files are stored. Each stream file is given a name obtained by adding the extension ".m2ts" to a file name consisting of a 5-digit number, as shown in the drawing.

In the AUXDATA directory, files of data that are not included in Clip AV stream files or sub-stream files and are referred to by Clip AV stream files or sub-stream files, files of data used independently of Clip AV stream files or sub-stream files, and the like are stored. In the example in FIG. 15, in the AUXDATA directory, a subtitle font file to which the name "11111.otf" has been given and sound effects to which the name "sound.bdmv" has been set are stored.

In addition, org_id, disc_id, and, according to need, content_id, which are identifiers, are recorded on the optical disc 11 as secure electronic data that cannot be rewritten by the user or the like, or recorded physically using pits.

Figure 16:
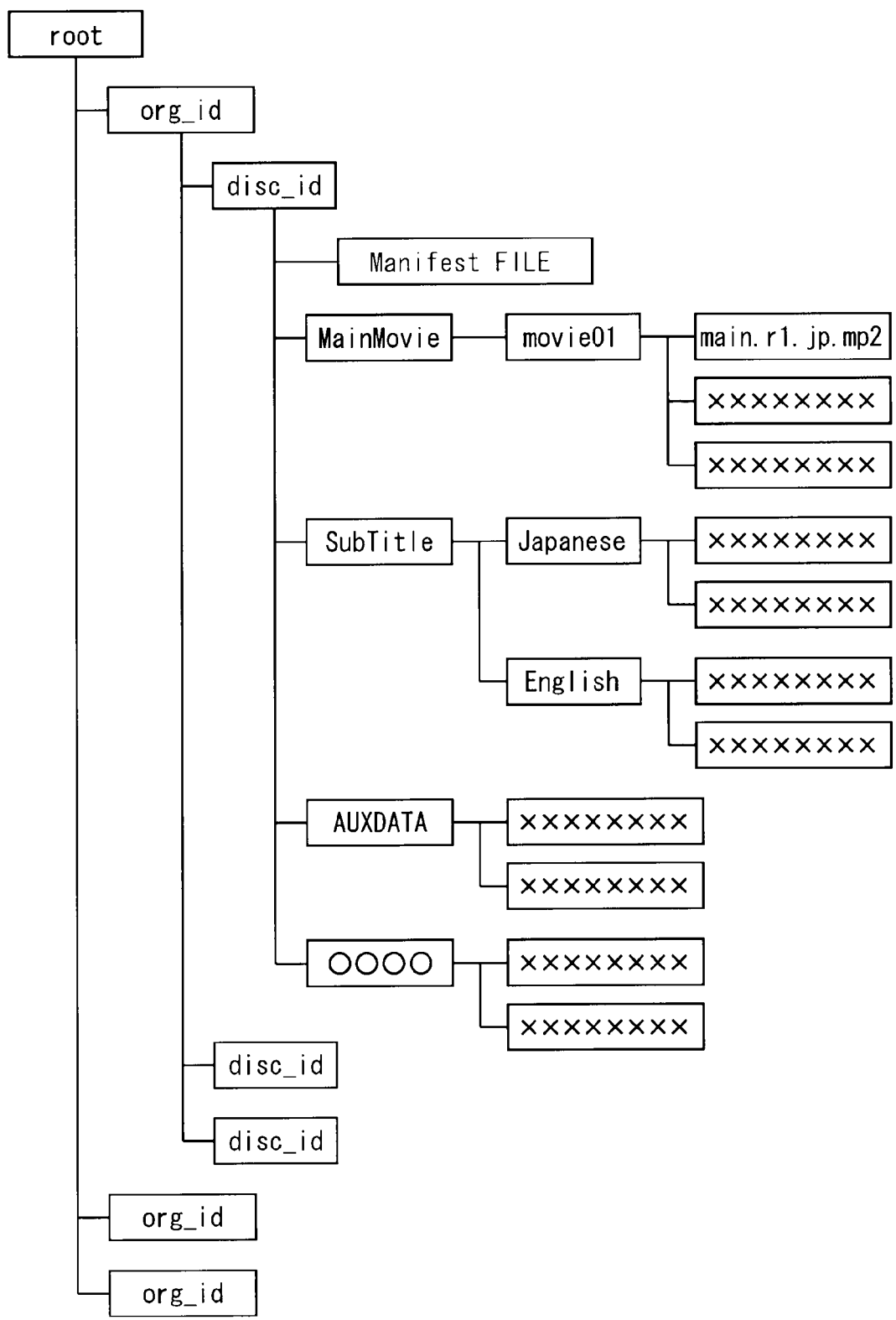
FIG. 16 is a diagram for describing an example of a file system of a local storage 24.

FIG. 16 is a diagram showing an example of, in the disk region of the local storage 24, a file system of a storage region managed by the navigation program 45. As shown in FIG. 16, the file system of the local storage 24 also has a directory structure.

Below "root" of the local storage 24, at least one directory whose name has been set to "org_id" is prepared. Below the "org_id" directory, at least one directory whose name has been set to "disc_id" is prepared. "org_id" and "disc_id" are used to construct a virtual file system. All "disc_ids" included in individual "org_ids" below "root" of the local storage 24 are made different from one another so as to be distinguishable from one another. The "disc_id" directory includes a Manifest file consisting of a set of Manifest( ) sections or one Manifest( ) section. The structure of other directories and files can be freely set by the content author. For example, this may be similar to the directory/file structure of the optical disc 11 described using FIG. 15, or, as shown in FIG. 16, totally different from the directory/file structure of the optical disc 11 described using FIG. 15.

For example, in FIG. 16, in the "disc_id" directory, besides the Manifest file, a plurality of folders such as the "Main-Movie" directory, the "SubTitle" directory, and the "AUX-DATA" directory are set. These directories may further include folders or files.

The directory/file structure of the local storage 24 shown in FIG. 16 is concealed from the navigation program 45 executed by the recording/reproducing apparatus 1 or from the user.

Figure 17:
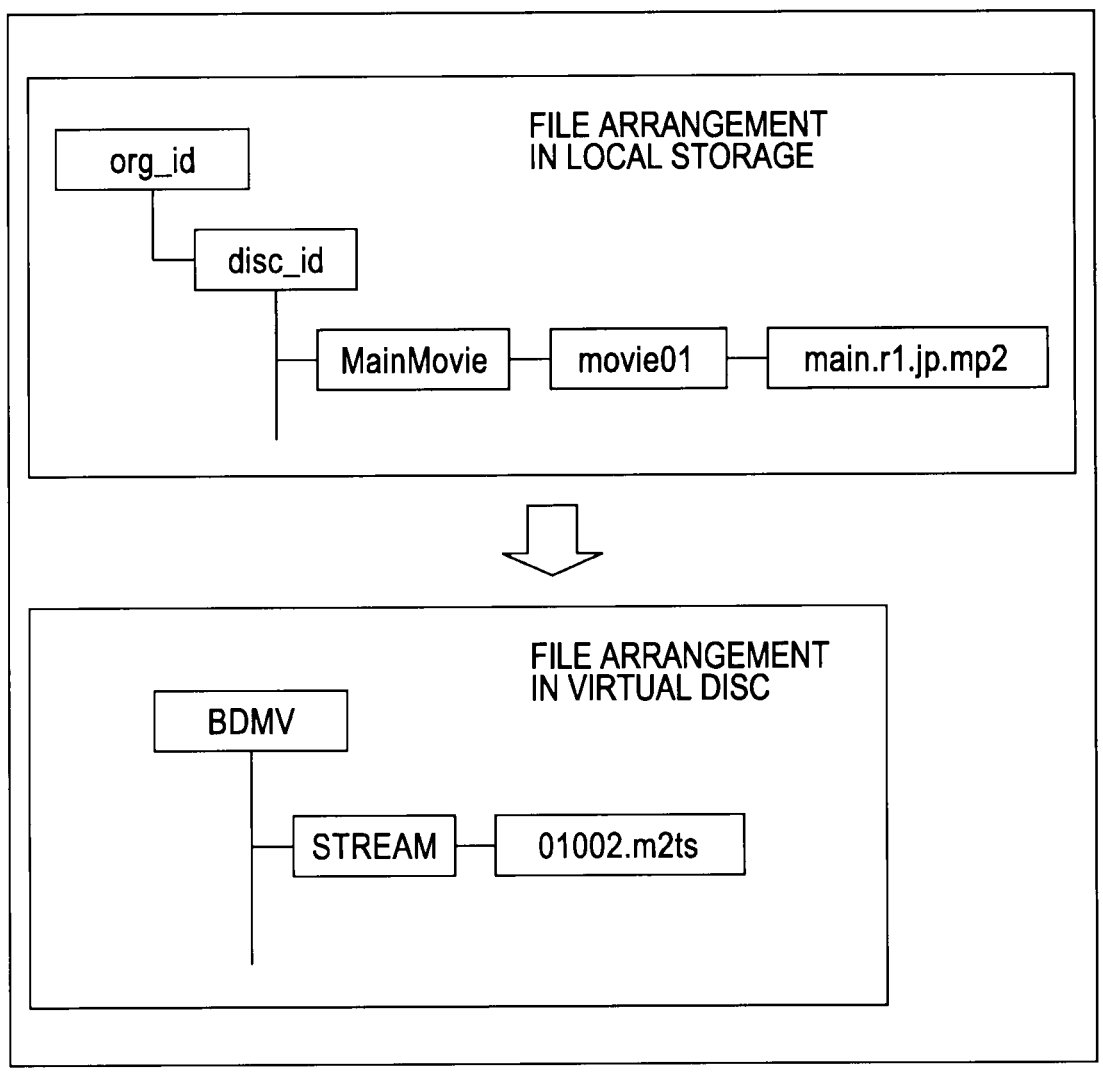
FIG. 17 is a diagram for describing designation of a path name.

For example, in the Manifest( ) section described using FIG. 13, when the path name "/MainMovie/movie01/main.r1.jp.mp2" is designated in the src_file_name field and the path name "/STREAM/01002.m2ts" is designated in the dst_file_name field, downloaded data is recorded, as shown in FIG. 17, with the file name main.r1.jp.mp2 in the movie01 directory in the MainMovie directory below corresponding org_id and disc_id in the local storage 24. In the virtual file system in the virtual disc, this is treated as a file with the file name 01002.m2ts in the STREAM directory.

In this manner, the content author can designate, in the src_file_name field of the Manifest( ) section of a downloaded file package, a path name in the local storage 24, and can designate, in the dst_file_name field, a path name in the virtual file system in the virtual disc. Therefore, when the path name adapted to the virtual file system in the virtual disc is set in the dst_file_name field, the content author can freely set the file/directory structure below disc_id of data actually recorded in the local storage 24 in the recording/reproducing apparatus 1, and can add a new directory or file to regions below disc_id.

Also, when downloading the actual file, if the dst_file_name field in the Manifest( ) section is left empty, that file cannot be referred to from an application program executed in the recording/reproducing apparatus 1 (that is, the existence of the file cannot be recognized from an application program executed in the recording/reproducing apparatus 1 or the user). That is, the actual file is stored in the local storage 24, and the file is correctly recognized in the file system of the local storage. However, by leaving the dst_file_name field empty, that file is regarded as not existing in the virtual file system and can be concealed from an application program executed in the recording/reproducing apparatus 1 or from the user.

Using this, for example, the actual file is downloaded while leaving the dst_file_name field of the Manifest( ) section empty. At a future day, a Manifest( ) section that has the same Manifest_id and has a predetermined path name in the virtual file system written in the dst_file_name field is newly downloaded, thereby overwriting the Manifest( ) section. Accordingly, at the timing at which the new Manifest( ) section was downloaded, this can be handled by an application program executed in the recording/reproducing apparatus 1 in a manner similar to the case where the actual file was downloaded.

In this way, for example, by allowing a plurality of bonus tracks to be simultaneously downloaded or by simultaneously distributing a plurality of bonus tracks using a predetermined recording medium or the like, and by subsequently allowing only the Manifest( ) section in which the dst_file_name field is written so that the different bonus tracks can be recognized by an application to be downloaded and overwritten at predetermined times, a service that adds bonus tracks at different times can be provided to a user without requiring a large capacity of data to be frequently downloaded.

In addition, the scheme of synchronizing (binding) the actual file systems in the optical disc 11 and the local storage 24 and the file system of the virtual disc may be a so-called static binding scheme or a dynamic binding scheme. Alternatively, a new API for updating the virtual file system (e.g., update( )) may be defined, and, when the API is explicitly called by a user operation or an application program, the virtual file system may be updated.

Note that static binding is adapted to, at the point at which the optical disc 11 is mounted in the recording/reproducing apparatus 1 or at the timing at which a playback title is switched, refer to the actual file systems in the optical disc 11 and the local storage 24 and map the directory/file structure of the virtual file system; and dynamic binding is adapted to search for a necessary file at the point at which a file input/output request is issued.

It is preferable that the directory/file structure of the virtual disc be adapted to match the directory/file structure of the optical disc 11, as has been described above. In many cases, the directory/file structure of the optical disc 11 is determined in advance by a standard or the like and is unchangeable. It is more preferable that the structure of directories and files in the actual file system in the local storage 24 be freely settable by the content author. Therefore, when the directory/file structure of the virtual disc is adapted to be settable on the basis of the directory/file structure of the optical disc 11 which is unchangeable, while the degree of freedom of data distributed by the content author is maintained, a playback process conforming to the standard, such as the application format of the optical disc 11, can be executed, which is preferable.

Figure 18:
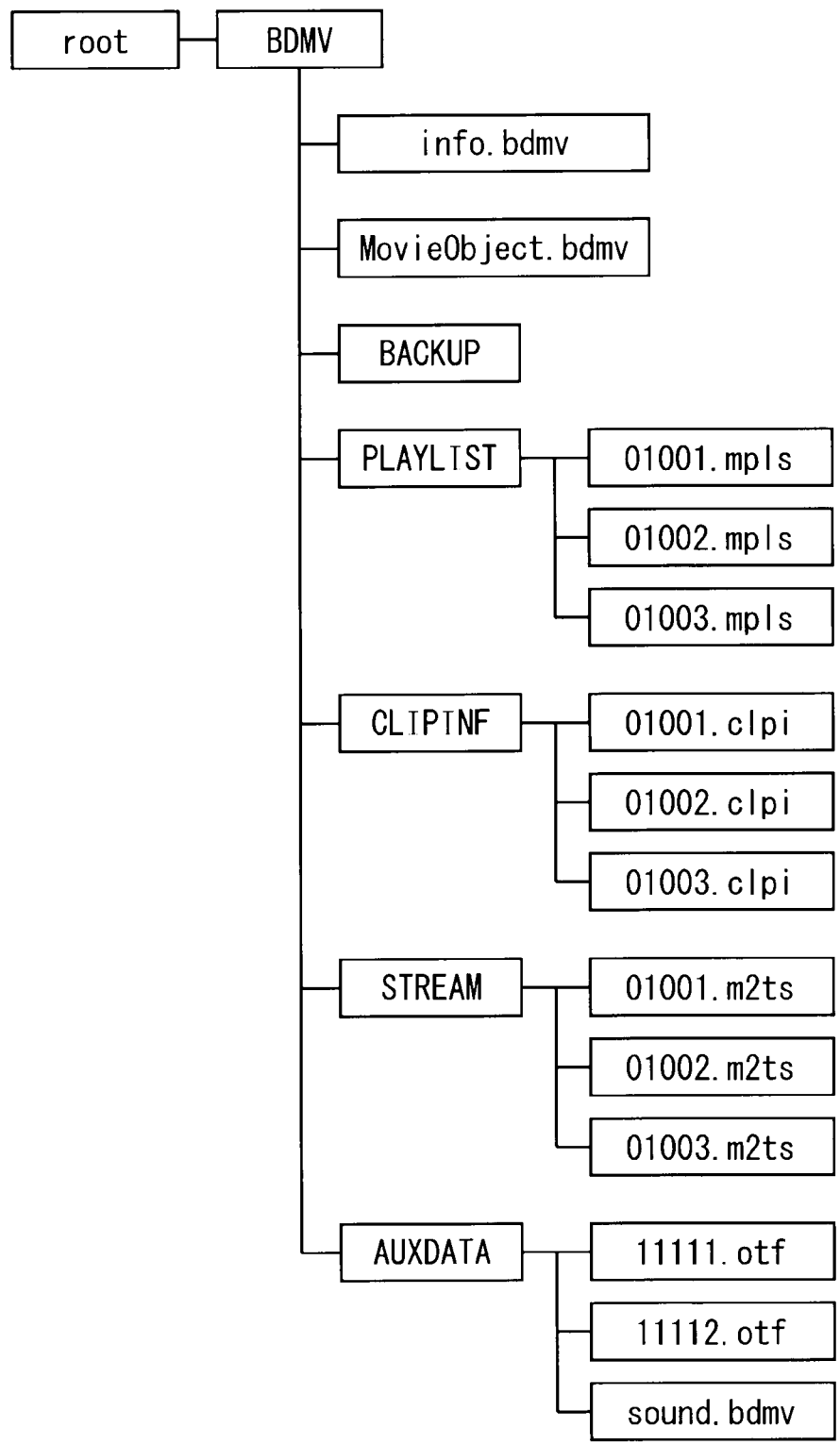
FIG. 18 is a diagram for describing an example of a directory/file structure in a virtual disc.

An example of the directory/file structure in the virtual disc is shown in FIG. 18.

Below "root" in the directory/file structure of the virtual disc shown in FIG. 18, a directory whose name has been set to "BDMV" is prepared. In that directory, a file whose name has been set to "Info.bdmv" and a file whose name has been set to "Movieobjects.bdmv" are stored.

The Info file includes information regarding a menu for playing content that is recorded on the optical disc 11 and in the local storage 24 and is treated by an application program as being recorded on the virtual disc. The recording/reproducing apparatus 1 displays a playback menu screen on the display device on the basis of the Info file, the playback menu screen including items whose contents include, for example, playing the whole content treated as being recorded on the virtual disc, playing only a specific chapter, performing repeated playback, displaying an initial menu, and the like. A MovieObject to be executed when each item is selected can be set in the Info file. When one item is selected by the user from the playback menu screen, the recording/reproducing apparatus 1 executes the command of the MovieObject set in the Info file.

The MovieObject file is a file including MovieObjects. A MovieObject includes a command that controls playback of a PlayList treated as being recorded on the virtual disc, that is, a command issued by the navigation program 45. For example, the recording/reproducing apparatus 1 can play content treated as being recorded on the virtual disc by selecting and executing one from among MovieObjects treated as being recorded on the virtual disc. Further, a MovieObject includes various commands needed to execute a process in cooperation with the application program 47.

In the BDMV directory, additionally a directory whose name has been set to "BACKUP" (BACKUP directory), a directory whose name has been set to "PLAYLIST" (PLAYLIST directory), a directory whose name has been set to "CLIPINF" (CLIPINF directory), a directory whose name has been set to "STREAM" (STREAM directory), and a directory whose name has been set to "AUXDATA" (AUXDATA directory) are provided.

In the BACKUP directory, files and data for backing up files and data treated as being recorded on the virtual disc are recorded.

In the PLAYLIST directory, PlayList files are stored. Each PlayList file is given a name obtained by adding the extension ".mpls" to a file name consisting of a 5-digit number, as with the case of the optical disc 11.

In the CLIPINF directory, Clip Information files are stored. Each Clip Information file is given a name obtained by adding the extension ".clpi" to a file name consisting of a 5-digit number, as with the case of the optical disc 11.

In the STREAM directory, Clip AV stream files and sub-stream files are stored. Each stream file is given a name obtained by adding the extension ".m2ts" to a file name consisting of a 5-digit number, as with the case of the optical disc 11.

In the AUXDATA directory, files of data that are not included in Clip AV stream files or sub-stream files treated as being recorded on the virtual disc and are referred to by Clip AV stream files or sub-stream files, files of data used independently of Clip AV stream files or sub-stream files, and the like are stored.

Note that, in the menu screen provided to the user, information indicating a file is normally a name designated in the display_name field. For example, the directory/file structure in the virtual disc, which has been described using FIG. 18, is not concealed from the navigation program 45, other applications, or the user. Depending on applications executed in the recording/reproducing apparatus 1, there is no problem in presenting the directory/file structure in the virtual disc to the user.

Next, using FIG. 19, the definition of a content distribution file format at the time a content author distributes content will be described. The file format at the time of distributing content may be individual distribution in increments of a content file or, as shown in FIG. 19, an archive format including metadata (Manifest( )).

Note that a Package_header( ) section and a Package_Body( ) section in the archive may be represented by text using a tagged language represented by XML.

Note that, when a content author individually distributes content in increments of a file, the metadata (Manifest( )) is treated as an independent binary file or text file. That is, anticipating the directory structure after addition, an appropriate state must be written in Manifest( ) associated with content distributed in increments of a file.

compression_type is a field for designating the compression format of data in Package_Body( ). When 0 is designated in this field, data in Package_Body( ) is regarded as being in the non-compressed format.

encryption_type is a field for designating the scramble scheme (encryption scheme) of data in Package_Body( ). When 0 is designated in this field, data in Package_Body( ) is regarded as being in the non-scrambled (plaintext) format.

Note that scramble and compression of data in Package_Body( ) are performed in the order of 1. Compression process and 2. scramble process.

file_count is a field for designating the total number of files to be archived.

manifest_id is a field for designating an identifier of this Manifest( ) section.

After archive data is downloaded, the Manifest( ) section may be saved in the local storage 24 in increments of a corresponding downloaded file (in increments of an item of archive data), or Manifest ( ) sections may be merged into one file and set to be identifiable using manifest_id which is the identifier of a Manifest( ) section as a key.

organization_id (org_id) is a field for designating an identifier used to construct a virtual file system in a corresponding optical disc.

disc_id is a field for designating an identifier for identifying each optical disc 11 or each item of content associated with the same org_id. That is, this archive is update data corresponding to content on the optical disc 11 designated by disc_id.

permission is a field for designating, by a content author, permission information indicating whether or not to make the property visible or invisible to a user, whether or not to permit overwriting of the file, or the like. Values that can be designated in Permission are the same as those described using FIG. 14. Note that information in permission may be written in any file other than the Manifest file or configured as an independent file.

src_file_name is a field for designating the path name of a file that should be recorded in the local storage 24, as has been described using FIG. 17. It is assumed that file/directory names are encoded in accordance with the ISO/IEC 646 standard.

dst_file_name is a field for designating the path name of a file at a binding destination in the virtual disc (virtual file system), as has been described using FIG. 17. It is assumed that file/directory names are encoded in accordance with the ISO/IEC 646 standard.

Note that the same name can be designated in src_file_name and dst_file_name.

When a file designated by src_file_name exists below directories with different org_ids, information for checking a file access permission is written in credential. Accordingly, a content file can be shared in directories below a plurality of org_ids in the local storage 24.

file_size is a field for designating the file size before compression in increments of a byte.

file_data is a field for designating file data as a byte sequence.

Data in the content distribution file format such as that described using FIG. 19 is downloaded, and, in the recording/reproducing apparatus 1, is merged with data recorded on the mounted optical disc 11, thereby constructing a virtual file system in a virtual disc. Accordingly, a user who plays content recorded on the optical disc 11 using the recording/reproducing apparatus 1 feels as if, for example, a bonus track, or audio or display subtitles in a different language, were added to the content recorded on the optical disc 11 and updated.

When content configured in accordance with the above-described file format is to be updated, for example, in the virtual file system described using FIG. 18, new data files are downloaded and bound so that an information file (Info.bdmv), a movie object file (Movieobjects.bdmv), a playlist file (***.mpls), a clip information file (*.clpi), a stream file or AUX data file (*.m2ts, *bdmv, ***.otf), and the like are added or updated. In order that these files are downloaded and played in association with content recorded on the mounted optical disc 11 which has been mounted, an addition of MainPath, an addition of SubPath, and the like are executed.

Note that, at the time of adding or updating a file, when a file saved in advance in the local storage 24 and a newly obtained file have the same file name, if the property written in permission permits file overwriting, overwriting copy is executed; if the property written in permission does not permit file overwriting, overwriting copy is not executed. In that case, even when a file copying process is not executed, the file name may be changed and a file copying process may be executed. Alternatively, when the file name of a newly obtained file is not the same file name of any file saved in advance in the local storage 24, the file is newly added and stored in the local storage 24.

Note that AV stream data other than that with the above-described file structure may be recorded on the optical disc 11, decoded and reproduced by the transcoder 26, and format-converted and recorded on another optical disc 11. However, regarding AV stream data other than that with the above-described file structure, a virtual file system cannot be constructed using a file downloaded into the local storage 24. Therefore, when AV stream data other than that with the above-described file structure is recorded on the optical disc 11, the user who uses the recording/reproducing apparatus 1 cannot handle the data so as to add a file recorded on the optical disc 11 or to update a portion thereof.

In addition, in order to dispense the recording/reproducing apparatus 1 from executing PlayList file editing, files needed for addition/updating may be packaged in advance at a data distribution source (content author), and files may be downloaded on a disc-by-disc basis (that is, in increments of data in a directory indicated by Disc_id).

In this manner, in the recording/reproducing apparatus 1, for example, new data having a structure such as that shown in FIG. 19 is downloaded from the server 3 via the network 2 and stored in the local storage 24 on the basis of the path name indicated in src_file_name written in Manifest( ) which is metadata. A path in the virtual file system is set on the basis of the path name indicated in dst_file_name written in Manifest( ). An application in the recording/reproducing apparatus 1 (e.g., the navigation program 45 which performs a playback process) is adapted to be capable of processing data recorded on the optical disc 11 and data recorded in the local storage 24 on the basis of the virtual file system, that is, the path indicated in dst_file_name, without distinguishing between the two.

That is, in the recording/reproducing apparatus 1, upon receipt of an instruction to add data (download instruction), corresponding Manifest files (may be all the Manifest files or some of the Manifest files) are sent to the server 3 via the network 2, and a list of items of content that can be currently added is obtained from the server 3. An application program presents to the user the list of items of content that can be added, and the user selects content to download from the presented list.

When the user selects content to download, an application that can execute a process of downloading data from the server 3 (e.g., this may be the same as or separate from an application program that can execute a data adding process or a data reproducing process) starts downloading data.

When downloading is completed, a downloaded file package group is mounted on the virtual file system using the navigation program 45 which manages the file system, and the native file system and the virtual file system are synchronized using static binding, dynamic binding, or the like.

Next, with reference to the flowcharts in FIG. 20 through FIG. 23, with execution of the navigation program in the recording/reproducing apparatus 1, processes needed to reproduce information recorded on the optical disc 11 and information stored in the local storage 24 by newly obtaining a file from the outside, storing the file in the local storage 24, and constructing a virtual file system will be described.

First, with reference to the flowchart in FIG. 20, an adding and updating process on a file-by-file basis will be described.

In step S1, the operation input obtaining unit 61 of the navigation program 45 executed by the controller 21 determines, on the basis of a signal supplied from the operation input unit 29, whether or not a command to start an adding process on a file-by-file basis, that is, a process of adding a file included in the directory indicated by a predetermined disc_id, is received from a user. When it is determined in step S1 that no command to start a file adding process has been received, the processing in step S1 is repeated until it is determined that a command to start a file adding process is received.

When it is determined in step S1 that a command to start a file adding process is received, in step S2, the local storage directory management unit 64 controls the data obtaining unit 63 to access the server 3 via the Internet interface 25 and the network 2 and sends information indicating the current state of the virtual file system, such as Manifest_id of a corresponding Manifest( ) section.

In step S3, the data obtaining unit 63 controls the Internet interface 25 to determine whether or not information corresponding to a list of files that can be downloaded has been received from the server 3 via the network 2.

When it is determined in step S3 that no information corresponding to a list of files that can be downloaded has been received, in step S4, the menu screen display control unit 62 performs control to display an error message for notifying the user of the fact that the file adding process is impossible, and the process is terminated.

When it is determined in step S3 that information corresponding to a list of files that can be downloaded has been received, in step S5, the data obtaining unit 63 supplies the information corresponding to a list of files that can be downloaded, which has been sent from the server 3 and received by the Internet interface 25, to the menu screen display control unit 62. The menu screen display control unit 62 displays, on the display device, a menu screen adapted to enable the user to select a desired one from the list of files that can be downloaded.

In step S6, the operation input obtaining unit 61 determines whether or not a button, icon, or the like of the menu screen controlled to be displayed with the processing performed by the menu screen display control unit 62 has been operated by the user to select an item to add. When it is determined in step S6 that no item to add has been selected, the processing in step S6 is repeated until it is determined that an item to add has been selected.

When it is determined in step S6 that an item to add has been selected, in step S7, the operation input obtaining unit 61 supplies information indicating the contents of update selected by the user to the data obtaining unit 63. The data obtaining unit 63 controls the Internet interface 25 to send information indicating a requested file to the server 3 and requests download of the file selected by the user.

In step S8, the data obtaining unit 63 controls the Internet interface 25 to download a PlayList file, a ClipInformation file, a ClipAV stream file, an audio file, a text subtitle stream file, a font file, or the like, which is prepared by the server 3 as a download file, and notifies the local storage directory management unit 64 that these files have been downloaded.

In step S9, the local storage directory management unit 64 determines, on the basis of org_id and disc_id included in Manifest( ) of the downloaded file, whether or not a directory identified by these IDs already exists in the local storage 24. When the corresponding directory already exists, the downloaded data file is expanded in that directory. When the corresponding directory does not exist, a new directory designated by org_id and disc_id is created in the local storage 24, and the downloaded data file is expanded.

Figure 21:
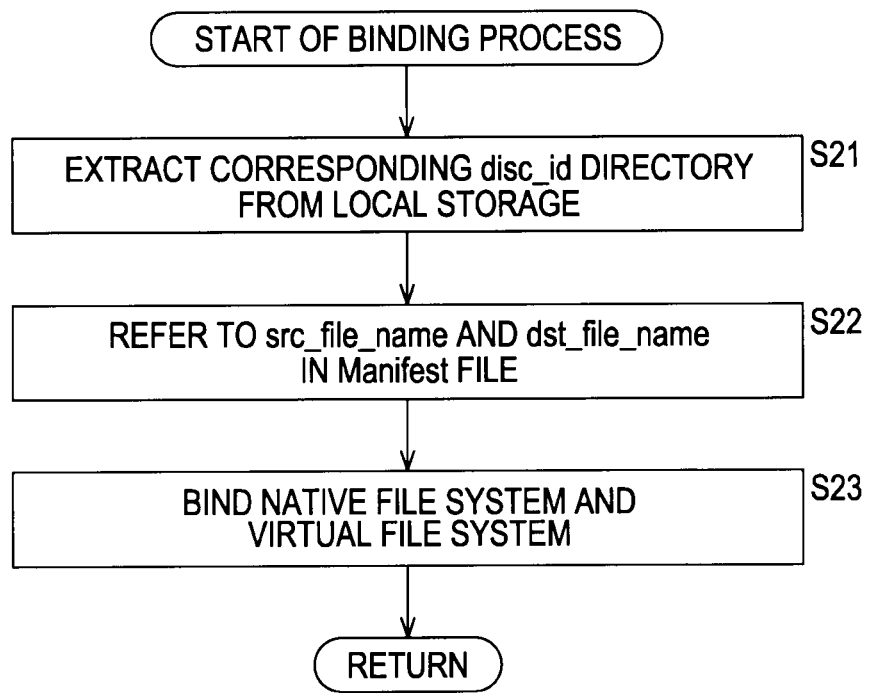
FIG. 21 is a flowchart for describing a binding process.

In step S10, a binding process described later using FIG. 21 is executed, and the process is terminated.

With such a process, an update file can be downloaded from the server 3, recorded in the local storage 24, and treated as an update file of content recorded on the optical disc 11.

That is, with such a process, a virtual file system that enables, for example, a user who purchased the optical disc 11 on which content such as a movie is recorded to obtain a file needed to display subtitles in a language that has not been recorded in advance on the optical disc 11 or a file needed to view a bonus track and to store the obtained file in the local storage 24, additionally, that enables the navigation program 45 which executes a playback process to handle data recorded on the optical disc 11 and data stored in the local storage 24 without distinguishing between the two, and that can conceal the physical storage of data from the user or the navigation program 45 can be constructed.

Downloading of an update file such as that described above may be performed at a cost or free of charge.

Next, with reference to the flowchart in FIG. 21, the binding process executed in step S10 in FIG. 20 will be described.

In step S21, the local storage directory management unit 64 extracts the corresponding disc_id directory from the downloaded data group recorded in the local storage 24 and supplies the disc_id directory to the file system merge processing unit 66.

In step S22, the file system merge processing unit 66 refers to src_file_name and dst_file_name in the Manifest file.

In step S23, the file system merge processing unit 66 binds the native file system and the virtual file system on the basis of src_file_name and dst_file_name referred to in step S22.

Specifically, a "path name" representing a so-called path, which is information that can uniquely designate, in the file system of the local storage 24, where in the directory structure this file is to be recorded, is designated in src_file_name. A "path name" representing a so-called path, which is information that can uniquely designate, in a biding destination in the virtual disc of the file which is actually to be stored in the local storage 24, where in the directory structure this file is to be recorded, is designated in dst_file_name.

For example, in the Manifest( ) section described using FIG. 13, when the path name "/MainMovie/movie01/main.r1.jp.mp2" is designated in the src_file_name field and the path name "/STREAM/01002.m2ts" is designated in the dst_file_name field, downloaded data is recorded in the local storage 24, as has been described using FIG. 17, with the file name main.r1.jp.mp2 in the movie01 folder in the MainMovie folder below corresponding org_id and disc_id. In the virtual file system in the virtual disc, the file system merge processing unit 66 binds this data so as to be treated as a file with the file name 01002.m2ts in the STREAM directory.

The content author can designate, in the src_file_name field of the Manifest( ) section of a downloaded file package, a path name in the local storage 24, and can designate, in the dst_file_name field, a path name in the virtual file system in the virtual disc. Therefore, when the path name adapted to the virtual file system in the virtual disc (adapted to the file system of the optical disc 11) is set in the dst_file_name field, the content author can freely set the file/directory structure below disc_id of data actually recorded in the local storage 24 in the recording/reproducing apparatus 1, and can add a new directory or file to regions below disc_id.

Next, with reference to the flowchart in FIG. 22, an adding and updating process on a disc-by-disc basis will be described.

In step S41, the operation input obtaining unit 61 of the navigation program 45 executed by the controller 21 determines, on the basis of a signal supplied from the operation input unit 29, whether or not a command to start an adding process on a disc-by-disc basis, that is, a process of adding a file below disc_id of data actually to be recorded in the local storage 24, is received from a user. When it is determined in step S41 that no command to start a file adding process has been received, the processing in step S41 is repeated until it is determined that a command to start a file adding process is received.

When it is determined in step S41 that a command to start a file adding process has been received, in step S42, the local storage directory management unit 64 of the controller 21 controls the data obtaining unit 63 to access the server 3 via the Internet interface 25 and the network 2 and to send information indicating the current state of the virtual file system, such as Manifest_ids of all Manifest( ) sections included in Manifest files below the corresponding disc_id.

In step S43, the data obtaining unit 63 controls the Internet interface 25 to determine whether or not information corresponding to a list of files that can be downloaded on a disc-by-disc basis has been received from the server 3 via the network 2.

When it is determined in step S43 that no information corresponding to a list of files that can be downloaded on a disc-by-disc basis has been received, in step S44, the menu screen display control unit 62 performs control to display an error message for notifying the user of the fact that the file adding process is impossible, and the process is terminated.

When it is determined in step S43 that information corresponding to a list of files that can be downloaded has been received, in step S45, the data obtaining unit 63 supplies the information corresponding to a list of files that can be downloaded on a disc-by-disc basis, which has been sent from the server 3 and received by the Internet interface 25, to the menu screen display control unit 62. The menu screen display control unit 62 displays, on the display device, a menu screen adapted to enable the user to select a desired one from the list of files that can be downloaded.

In step S46, the operation input obtaining unit 61 determines whether or not a button, icon, or the like of the menu screen controlled to be displayed with the processing performed by the menu screen display control unit 62 has been operated by the user to select an item to add. When it is determined in step S46 that no item to add has been selected, the processing in step S46 is repeated until it is determined that an item to add has been selected.

When it is determined in step S46 that an item to add has been selected, in step S47, the operation input obtaining unit 61 supplies information indicating the contents of update selected by the user to the data obtaining unit 63. The data obtaining unit 63 controls the Internet interface 25 to send information indicating a requested file to the server 3 and requests download of the file(s) selected by the user on a disc-by-disc basis.

In step S48, the data obtaining unit 63 controls the Internet interface 25 to download a file group on a disc-by-disc basis, which is prepared by the server 3 as a download file(s), and notifies the local storage directory management unit 64 that the file group on a disc-by-disc basis has been downloaded.

In step S49, the local storage directory management unit 64 generates, on the basis of org_id and disc_id included in Manifest( ) of the downloaded file(s), a directory identified by these IDs in the local storage 24 and expands the downloaded data on a disc-by-disc basis.

In step S50, the binding process described using FIG. 21 is executed, and the process is terminated.

With such a process, an update file can be downloaded from the server 3 on a disc-by-disc basis, recorded in the local storage 24, and treated as an update file of content recorded on the optical disc 11.

That is, with such a process, a virtual file system that enables, for example, a user who purchased the optical disc 11 on which content such as a movie is recorded to obtain a file needed to display subtitles in a language that has not been recorded in advance on the optical disc 11 or a file needed to view a bonus track and to store the obtained file in the local storage 24, additionally, that enables the navigation program 45 which executes a playback process or the like to handle data recorded on the optical disc 11 and data stored in the local storage 24 without distinguishing between the two, and that can conceal the physical storage of data from the user or the navigation program 45 can be constructed.

In addition, such downloading of an update file on a disc-by-disc basis may be performed at a cost or free of charge, as in the case in which downloading is performed on a file-by-file basis.

Figure 22:
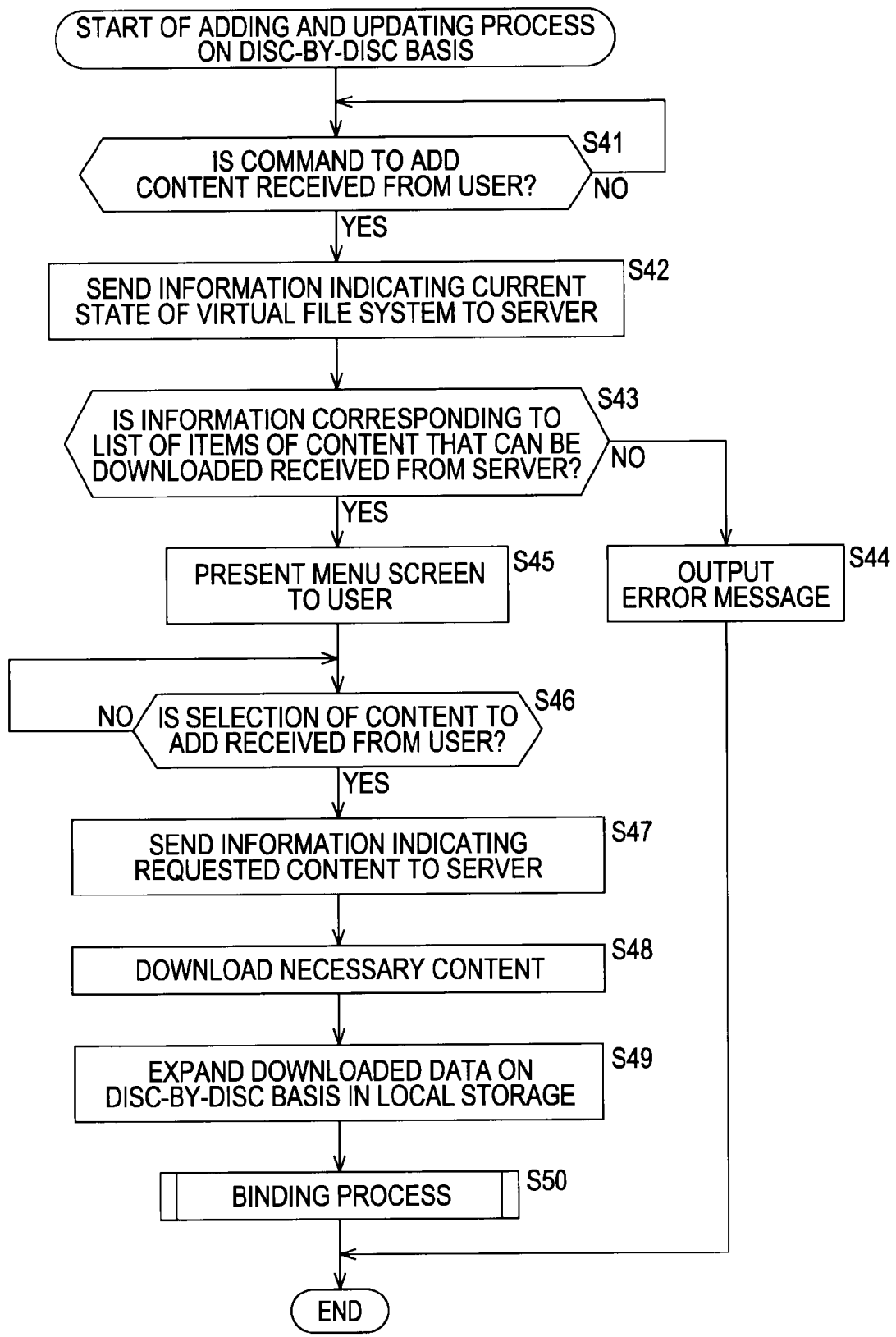
FIG. 22 is a flowchart for describing an adding and updating process on a disc-by-disc basis.

Also, the process in the case where a command for downloading on a file-by-file basis is given by the user has been described in FIG. 20, and the process in the case where a command for downloading on a disc-by-disc is given by the user has been described in FIG. 22. Alternatively, needless to say, for example, the user may be allowed to give an instruction to start downloading a file without distinguishing between a file-by-file basis and a disc-by-disc basis. That is, depending on whether the format of data downloaded from the server 3 is on a file-by-file basis or a disc-by-disc basis, the method of expanding, by the local storage directory management unit 64, the downloaded data in the local storage 24 may be allowed to be changed.

Processes executed only by the navigation program 45, such as the process of adding and updating an update data file of content and the binding process described above, are basically processes executed on data files associated with the same disc_id. In other words, these processes are executed as processes relating to the mounted optical disc 11.

That is, as has been described above, by executing the navigation program 45, update data corresponding to an optical disc 11 is downloaded, and the downloaded update data is stored in a path defined by corresponding org_id and disc_id in the local storage 24. Accordingly, a file playing process is executed without distinguishing between storage regions defined by corresponding org_id and disc_id in the optical disc 11 and the local storage 24. Further, basically, even when the same optical disc 11 is mounted in a reproducing apparatus that is different from the recording/reproducing apparatus 1 which can execute the navigation program 45, this reproducing apparatus is configured to execute similar processing. When a different optical disc is mounted in the recording/reproducing apparatus 1, with a different navigation program for playing this optical disc, a binding process to a storage region defined by a different disc_id in the local storage 24 is executed.

In contrast, when the application program 47 is installed in the recording/reproducing apparatus 1, the navigation program 45 and the application program 47 can be cooperatively executed, and additionally, a series of processes can be executed in association with a plurality of optical discs 11.

Next, with reference to the flowchart in FIG. 23, a playback process and a file system constructing process 1 will be described.

In step S141, the controller 21 determines whether or not the optical disc 11 has been mounted. When it is determined in step S141 that no optical disc 11 has been mounted, the processing in step S141 is repeated until it is determined that the optical disc 11 has been mounted.

When it is determined in step S141 that the optical disc 11 has been mounted, in step S142, the controller 21 executes the navigation program 45.

In step S143, the optical disc directory management unit 65 of the navigation program 45 reads out org_id and disc_id from the optical disc 11 and supplies the read org_id and disc_id to the local storage directory management unit 64, the file system merge processing unit 66, and the application program cooperation processing control unit 71.

Figure 25:
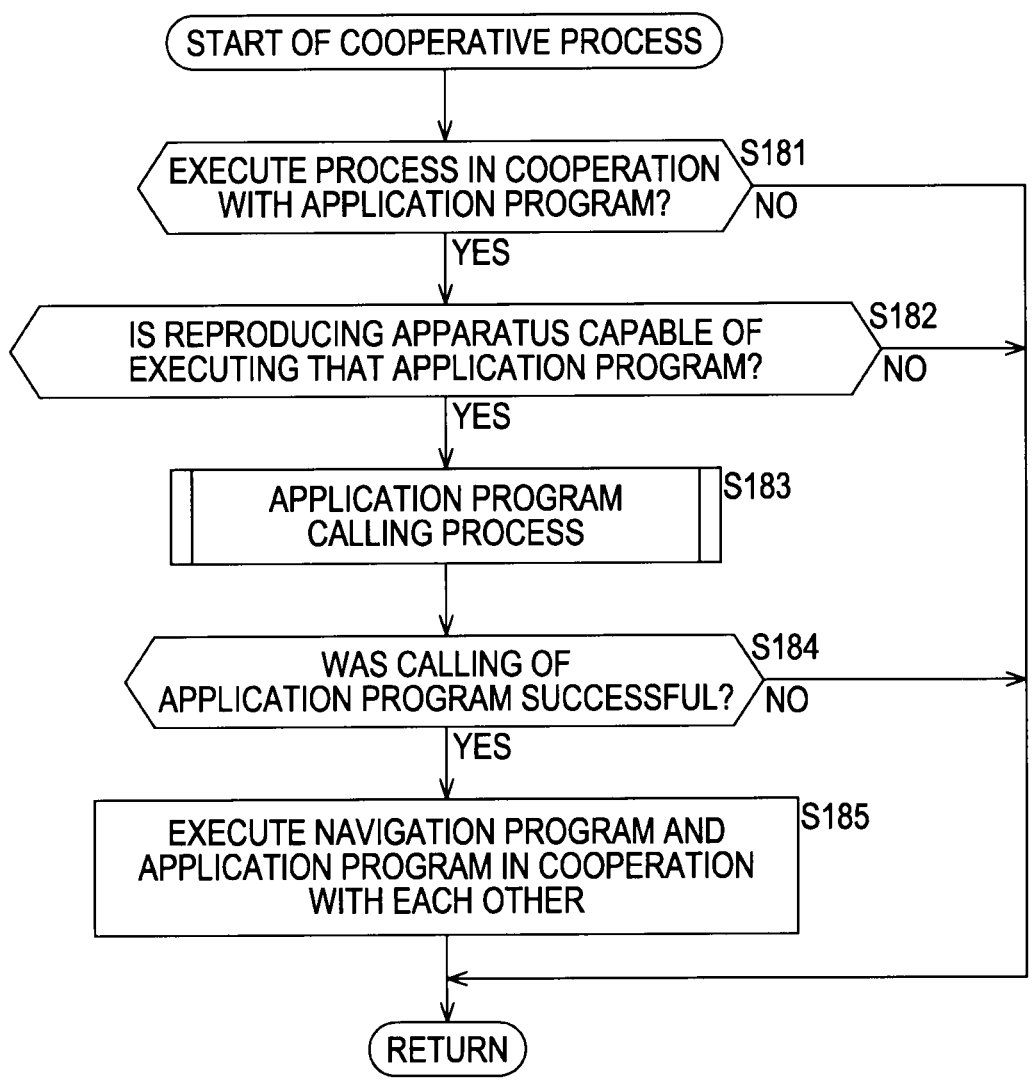
FIG. 25 is a flowchart for describing a cooperative process of the navigation program and the application program.

In step S144, a cooperative process described later using FIG. 25 is executed.

In step S145, the reproducing control unit 67 of the navigation program 45 determines, on the basis of a user operation input supplied from the operation input obtaining unit 61, whether or not an operation input to give a command to play content has been received from the user. When it is determined in step S145 that no operation input to give a command to play content has been received, the process proceeds to step S150 described later.

When it is determined in step S145 that an operation input to give a command to play content has been received, the operation input obtaining unit 61 supplies a signal corresponding to the user operation input to the optical disc directory management unit 65, and the optical disc directory management unit 65 outputs org_id and disc_id read out from the optical disc 11 to the local storage directory management unit 64. Accordingly in step S146, the binding process described using FIG. 21 is executed.

In step S147, the reproducing control unit 67 controls the local storage directory management unit 64 and the optical disc directory management unit 65 to obtain a PlayList and a SubPlayItem designated by the navigation program as a playback section, read out a stream file (AV file, audio file, text subtitle file, or the like) referred to by the obtained PlayList and SubPlayItem, and supply the stream file to the transcoder 26. Here, a time stamp indicated by the PlayList and SubPlayItem is converted into an address using Clip information, and access is gained to the AV stream or the like.

In step S148, the reproducing control unit 67 controls the transcoder 26 to play content designated by the PlayItem.

In step S149, the operation input obtaining unit 61 determines whether or not an operation input to give a command to switch a playback title (content to play) has been received. When it is determined in step S149 that no operation input to give a command to change the playback title has been received, the process proceeds to step S150 described later.

When it is determined in step S149 that an operation input to give a command to change the playback title has been received, the operation input obtaining unit 61 supplies a signal corresponding to the user operation input to the optical disc directory management unit 65, and the optical disc directory management unit 65 outputs org_id and disc_id read out from the optical disc 11 to the local storage directory management unit 64. Accordingly, the process returns to step S146, and the process thereafter is repeated.

When it is determined in step S145 that no operation input to give a command to play content has been received, or when it is determined in step S149 that no operation input to give a command to change the playback title has been received, in step S150, the operation input obtaining unit 61 determines whether or not a command to add a file has been given by the user.

When it is determined in step S150 that a command to add a file has been given, in step S151, the data obtaining unit 63, the local storage directory management unit 64, or the like executes a process of adding a file as has been described using, for example, FIG. 20 and FIG. 22.

In step S152, the binding process described using FIG. 21 is executed.

When it is determined in step S150 that no command to add a file has been given, or, after the end of the processing in step S152, in step S153, the operation input obtaining unit 61 determines whether or not a command to update the virtual file system has been given.

When it is determined in step S153 that a command to update the virtual file system has been given, for example, the API defined for updating the virtual file system (e.g., update( )) is called, and, in step S154, the binding process described using FIG. 21 is executed.

When it is determined in step S153 that no command to update the virtual file system has been given, or, after the end of the processing in step S154, in step S155, the operation input obtaining unit 61 determines whether or not a command to terminate the processing performed by the recording/reproducing apparatus 1 (e.g., termination of the navigation program 45 or switching off the power of the recording/reproducing apparatus 1) has been given.

When it is determined in step S155 that no command to terminate the processing performed by the recording/reproducing apparatus 1 has been given, the process returns to step S144, and the process thereafter is repeated. When it is determined in step S155 that a command to terminate the processing performed by the recording/reproducing apparatus 1 has been given, the process is terminated.

With such a process, data recorded in advance on the optical disc 11 and data downloaded from the server 3 and stored in the local storage 24 are bound at a predetermined timing to construct a virtual file system, and content is played on the basis of the virtual file system.

Note that, here, it has been described that binding is performed after the file adding process has been executed. Needless to say, binding is also performed after a file deletion process has been performed.

In addition, since org_id and disc_id are read out from the optical disc 11 and supplied to the application program cooperation processing control unit 71 in step S143, in step S144, the controller 21 can execute a cooperative process of the application program 47 and the corresponding navigation program 45.

In addition, here, it has been described that the cooperative process described later using FIG. 25 is executed prior to the binding process and the content playing process. Needless to say, the cooperative process may be executed at any timing during the execution of the navigation program 45. That is, the cooperative process described later using FIG. 25 can be executed at a timing desired by the creator or provider of the navigation program 45 on the basis of descriptions of the navigation program 45.

In addition, the controller 21 can control the operation of the recording/reproducing apparatus 1 by expanding in the memory 23 the application program 47 stored in the local storage 24 and the navigation program 45 recorded on the optical disc 11 and running the application program 47 and the navigation program 45 in cooperation with each other.

Figure 24:
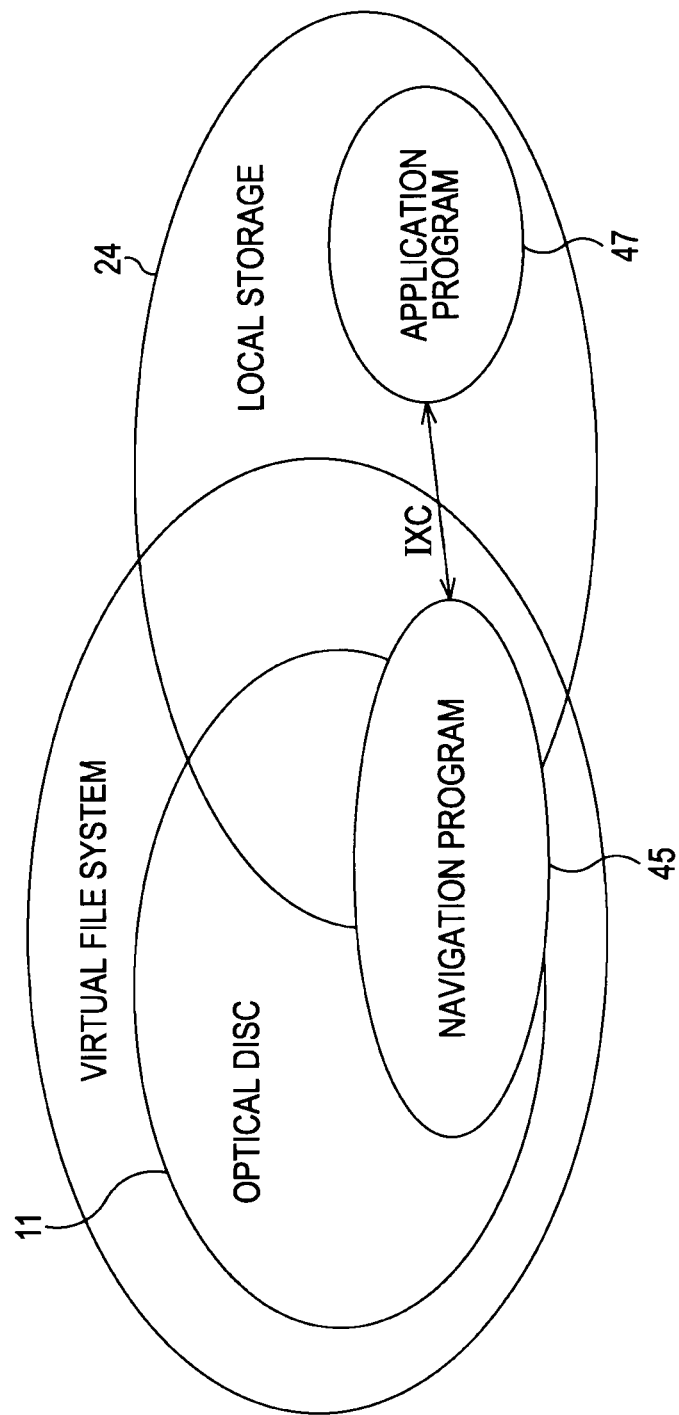
FIG. 24 is a diagram for describing cooperation of an application program 47 and a navigation program 45.

Referring to FIG. 24, cooperation between the application program 47 and the navigation program 45 will be described.

As has been described above, the controller 21 can execute either of an application that can run on a multi-platform due to the mounting of a virtual machine, such as JAVA (registered trademark), and an application that can run only in an execution environment of the controller 21. However, functions that can be provided only by embedded applications in the recording/reproducing apparatus 1 are limited.

In addition, in the recording/reproducing apparatus 1, as has been described above, the virtual file system is constructed by the navigation program 45, thereby making it possible to handle respective data storage regions in the optical disc 11 and the local storage 24 as one region.

Therefore, when a JAVA (registered trademark) operation environment is prepared in the controller 21 and when the navigation program 45 is written using JAVA (registered trademark) and is adapted to be capable of running on the JVM 44, as has been described using FIG. 6 (in other words, when the navigation program 45 and the application program 47 are adapted to run in a common execution environment), by preparing, besides a storage region of the file system to be bound using the navigation program 45, a region for storing another application program 47 that can run similarly on the JVM 44 in the local storage 24 or the memory 23, it is made possible to run the navigation program 45 and the application program 47 in cooperation with each other using IXC (Inter-Xlet Communication).

For example, when the navigation program 45 and the application program 47 are not applications that can run on the multi-platform due to the mounting of the virtual machine, since the application program 47 which can provide unique functions of the recording/reproducing apparatus 1 is designed on the basis of a software platform of a reproducing apparatus that can play the optical disc 11 and is provided by each manufacturer, in order to run the navigation program 45 and the application program 47 in cooperation with each other, it has been necessary to prepare the navigation program 45 in association with the application program 47 which runs on each software platform.

In other words, when the navigation program 45 and the application program 47 are applications that can run on the multi-platform due to the mounting of the virtual machine, even when software platforms of reproducing apparatuses that can play the optical disc 11 and are provided by individual manufacturers are not made common, an API for activating, from the navigation program 45 recorded on the optical disc 11, the application program 47 which can provide unique functions of the recording/reproducing apparatus 1 can be easily provided.

That is, by configuring the navigation program 45 and the application program 47 as JAVA (registered trademark) Xlets which are applications that can run on the multi-platform due to the mounting of the virtual machine, a cooperative process can be executed by executing communication between the navigation program 45 and the application program 47 using IXC. Additionally, the application program 47 can access the function group 54 and the embedded applications 49, which include functions embedded in advance in the recording/reproducing apparatus 1 and are not essential for a playback process, by using an independent API or JNI (JAVA (registered trademark) Native Interface).

JNI is an API for using, from a JAVA (registered trademark) program, a program of native code developed using another language (e.g., C language or C++ language), that is, an API for using, from a program developed using the JAVA (registered trademark) language, a program of native code developed using another language (program that can be executed as it is on a specific platform).

In addition, when the application program 47 which is an independent function of the recording/reproducing apparatus 1 (that is, unlike the navigation program 45, the application program 47 need not essentially be installed in all apparatuses that can play the optical disc 11) is configured as a JAVA (registered trademark) Xlet, a more flexible application environment can be configured.

Note that, in the navigation program 45, a file managed by a Manifest file is basically a file in a virtual file system defined by org_id and disc_id. Therefore, in order that the application program 47 and the navigation program 45 cooperatively execute a process, it is necessary to set, so as to enable the application program 47 to access a file managed by a predetermined manifest file according to need, credential in the manifest file.

Specifically, for example, when the whole series of movies is played, a bonus track may be allowed to be downloaded; when a predetermined number of optical discs 11 or more that are sold or provided by Company A have been played, a game may be allowed to be downloaded free of charge. When the navigation program 45 and the application program 47 which are executed in a virtual file system defined by org_ids and disc_ids corresponding to a plurality of optical discs 11 cooperatively execute a process, credential in corresponding individual manifest files must be set to permit access to this application program 47.

Next, with reference to the flowchart in FIG. 25, a cooperative process of the navigation program 45 and the application program 47, which is executed in step S144 in FIG. 23, will be described.

In step S181, the application program cooperation processing control unit 71 determines whether or not to execute a process in cooperation with the application program 47 corresponding to itself (that is, the navigation program 45). When it is determined in step S181 not to execute a process in cooperation with the corresponding application program 47, the process returns to step S144 in FIG. 23 and proceeds to step S145.

When it is determined in step S181 to execute a process in cooperation with the corresponding application program 47, in step S182, the application program cooperation processing control unit 71 determines whether or not the recording/reproducing apparatus 1 is capable of executing the application program 47.

Specifically, for example, when the detected application program 47 is to perform a process of controlling execution of a timer recording, unless the recording/reproducing apparatus 1 has a picture-recording function or is connected to an external picture-recording apparatus and is in a state in which the recording/reproducing apparatus 1 can control a timer recording process of the picture-recording apparatus, the recording/reproducing apparatus 1 cannot execute the detected application program 47. Alternatively, when the detected application program 47 is, for example, to perform a process of controlling playback of a bonus track using picture-in-picture displaying, unless the recording/reproducing apparatus 1 has a function of performing picture-in-picture displaying, the recording/reproducing apparatus 1 cannot execute the detected application program 47. Alternatively, when the detected application program 47 is, for example, to perform a process of controlling playback of comments of the director and performers using sub-voice, unless the recording/reproducing apparatus 1 has a function of playing sub-voice, the recording/reproducing apparatus 1 cannot execute the detected application program 47.

Figure 23:
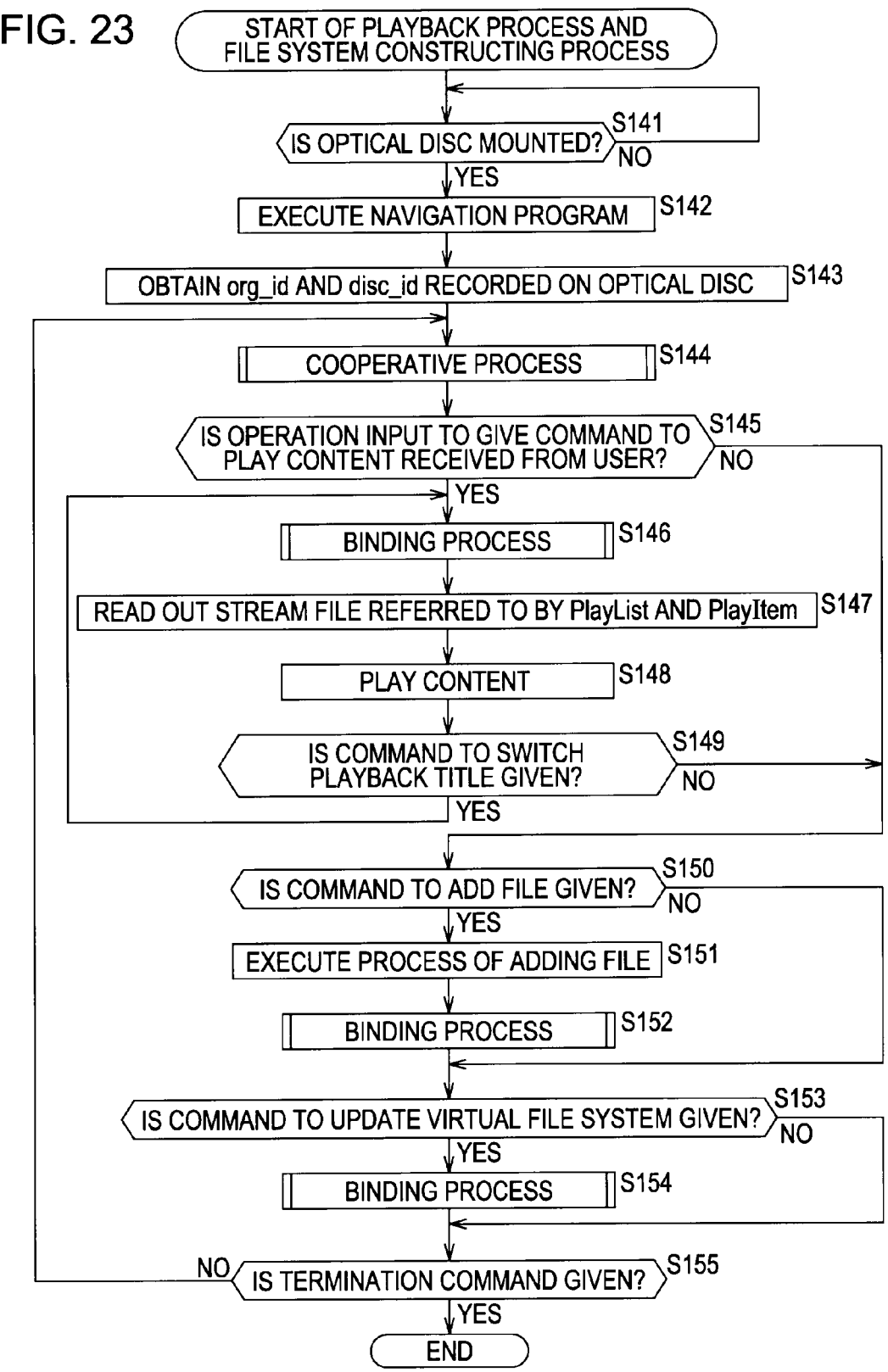
FIG. 23 is a flowchart for describing a playback process and a file system constructing process 1.

When it is determined in step S182 that the detected application program 47 cannot be executed, the process returns to step S144 in FIG. 23 and proceeds to step S145.

Figure 26:
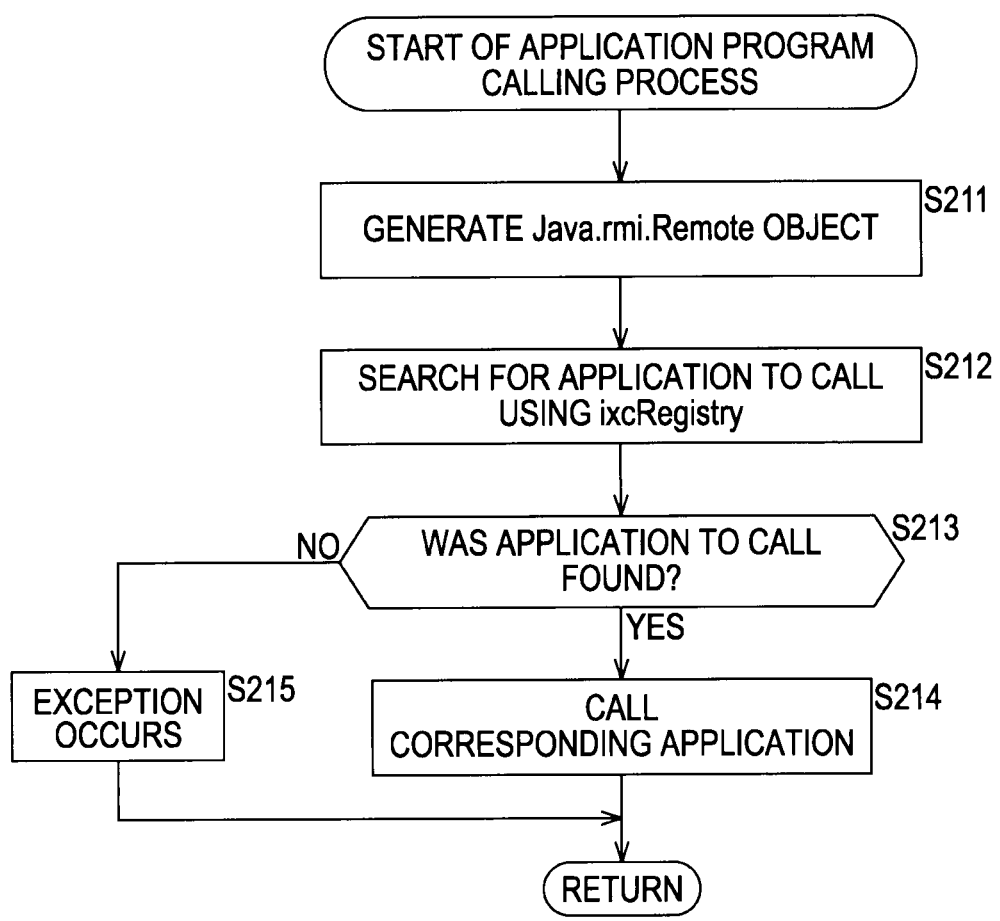
FIG. 26 is a flowchart for describing an application program calling process.

When it is determined in step S182 that the detected application program 47 can be executed, in step S183, an application program calling process, which will be described later using FIG. 26, is executed.

In step S184, the application program cooperation processing control unit 71 determines whether or not, in the application program calling process in step S183, the calling of the detected application program 47 was successful. When it is determined in step S184 that the calling of the detected application program 47 was unsuccessful, the process returns to step S144 in FIG. 23 and proceeds to step S145.

When it is determined in step S184 that the calling of the detected application program 47 was successful, in step S185, the application program cooperation processing control unit 71 controls execution of itself (that is, the navigation program 45) and the corresponding application program 47 in cooperation with each other. The process returns to step S144 in FIG. 23 and proceeds to step S145.

With such a process, the application program 47 corresponding to the navigation program 45 is detected, and whether or not a process is executable is determined. When a process is executable and a calling process is correctly executed, the navigation program 45 and the corresponding application program 47 are cooperatively executed.

Next, with reference to the flowchart in FIG. 26, the application program calling process executed in step S183 in FIG. 25 will be described.

In step S211, an IXC control unit 72 generates a JAVA (registered trademark).rmi.Remote object.

When inter-Xlet communication is to be executed, that is, when IXC is to be used, an object with the JAVA (registered trademark).rmi.Remote interface is adapted to be registered, searched for, and used by using an IxcRegistry class.

In step S212, the IXC control unit 72 searches for, using ixcRegistry, an application to call and notifies the application program cooperation processing control unit 71 of the search result.

In step S213, the application program cooperation processing control unit 71 determines whether or not the application program 47 to call was found.

When it is determined in step S213 that the application to call was found, in step S214, the application program cooperation processing control unit 71 calls the corresponding application program 47. That is, in the storage region of the local storage 24, from a second storage region for storing another application program 47 that can run on the JVM 44, the second storage region being either a storage region different from a first storage region storing a file system to be bound by the navigation program 45, or the storage region of the memory 23, the application program 47 corresponding to itself (that is, the navigation program 45) is detected on the basis of org_id and disc_id supplied in step S143 in FIG. 23, and the detected application program 47 is expanded in the memory 23 and activated. After the end of the processing in step S214, the process returns to step S183 in FIG. 25 and proceeds to step S184.

When it is determined in step S213 that the application to call was not found, in step S215, the application program cooperation processing control unit 71 executes an exceptional process, that is, determines that the calling of the application program was unsuccessful in step S184 in FIG. 25, and the process returns to step S183 in FIG. 25 and proceeds to step S184.

With such a process, the corresponding application program 47 which can perform a process in cooperation with the navigation program 45 is called.

Now, the process of the navigation program 45 and the application program 47, which is executed in step S185 in FIG. 25, is executed when the optical disc 11 having recorded thereon the navigation program 45 is mounted in the recording/reproducing apparatus 1 in which the application program 47 is installed in advance, or when the optical disc 11 for activating the updated navigation program 45 recorded in the local storage 24 is mounted in the recording/reproducing apparatus 1 in which the application program 47 is installed in advance.

For example, the URL of a website where a game relating to content recorded on the optical disc 11 can be downloaded or goods relating to the content can be purchased is recorded in the navigation program 45 recorded on the optical disc 11. When the optical disc 11 is mounted in the recording/reproducing apparatus 1 and the navigation program 45 is executed by the controller 21, it is determined whether or not, in the recording/reproducing apparatus 1, the application program 47 that is used for executing, in cooperation with the navigation program 45, a process of accessing the predetermined website or that can perform a process in cooperation with the embedded application 49-1 which controls the web browsing function (so-called web browser), which is installed as the embedded application 49 in the recording/reproducing apparatus 1. When it is determined that no corresponding application program 47 has been installed, the navigation program 45 executes an ordinary playback process or the like. When it is determined that the corresponding application program 47 has been installed, the navigation program 45 activates the application program 47 for executing a process of accessing the predetermined website and executes inter-application communication using Xlets.

In the recording/reproducing apparatus 1, the application program 47 may be stored in advance, may be installed via the removable medium 28 mounted to the drive 27, or may be downloaded from a predetermined server via the network 2 using the Internet interface 25 and installed. Also, when the recording/reproducing apparatus 1 has a function using cable broadcasting or terrestrial or satellite broadcasting services, the application program 47 may be obtained together with data of a predetermined program and installed.

When the provider of the optical disc 11 and the provider of the recording/reproducing apparatus 1 cooperate in advance to respectively design the navigation program 45 and the application program 47 which run as a pair, a cooperative operation of the navigation program 45 and the application program 47 which are designed to run as a pair can be executed only when the optical disc 11 is mounted in the specific recording/reproducing apparatus 1.

For example, besides the recording/reproducing apparatus 1, reproducing apparatuses or the like that can mount and play the optical disc 11 are provided by a plurality of manufacturers. Content recorded on the optical disc 11 can be played by any reproducing apparatus or the like that can execute the navigation program 45. In contrast, only when the corresponding optical disc 11 is played using the recording/reproducing apparatus 1 in which the specific application program 47 is installed, access can be gained to a website where limited goods relating to the content can be purchased. Only when the whole series of movies is played using this recording/reproducing apparatus 1, a bonus track can be downloaded. Only when a predetermined number of optical discs 11 or more sold or provided by Company A are played using this recording/reproducing apparatus 1, a game can be downloaded free of charge.

Also in some cases, the versions of the embedded applications 49 are updated. Since it is normally the case that these embedded applications 49 are commonly used in a plurality of information processing apparatuses or the like and that the embedded applications 49 are designed assuming in advance that the versions thereof are to be updated, it is often the case that the versions of the embedded applications 49 are updated without changing interfaces with the OS and other applications. Therefore, even when the versions of the embedded applications 49 are updated, if the interface with the application program 47 is not changed, the inter-application communication function with the application program 47 is maintained. That is, even when the versions of the embedded applications 49 used in the case where the navigation program 45 runs in cooperation with the application program 47 are updated, similar processing can be executed without changing the navigation program 45 and the application program 47.

In this manner, the application program 47 is activated by the navigation program 45 which is essential for reproducing content data stored on the optical disc 11 or stored inside in association with the optical disc 11, and the navigation program 45 and the application program 47 are adapted to be cooperatively executed. Accordingly, unlike the case where a single application is remotely controlled and merely executed in a predetermined apparatus, specifically, unlike the case where a predetermined apparatus is configured to be remotely controlled by supplying, using various recording media or wired or wireless communication, a control program that directly controls the function included in the predetermined apparatus or supplying a command for a control program already installed in the predetermined apparatus, unique services of the apparatus can be provided in association not solely with the apparatus, but with the optical disc 11, while conforming to the standard (or protocols pursuant to the standards) defined for enabling various reproducing apparatuses to play content associated with the optical disc 11.

However, when a service provided by the navigation program 45 and the application program 47 which run as a pair is mainly just for fun for the viewer, the chances of the optical disc 11 being viewed using reproducing apparatuses other than the recording/reproducing apparatus 1 may be reduced. This is not desirable for the content provider. Therefore, it is preferable that a service provided by the navigation program 45 and the application program 47 running as a pair be an Easter-egg-like additional service accompanying a service provided by the optical disc 11.

Accordingly, the provider of the recording/reproducing apparatus 1 can distinguish the recording/reproducing apparatus 1 from other reproducing apparatuses and the like that can play the optical disc 11. Also, the provider of the optical disc 11 may obtain a rebate (or something corresponding to this) for the provider of the recording/reproducing apparatus 1 who permitted to provide a service different from the manufacturers of other reproducing apparatuses and the like.

In this manner, when the provider of the optical disc 11 and the provider of the recording/reproducing apparatus 1 individually make a contract to provide the navigation program 45 and the application program 47 running in cooperation with each other, individual services are provided to the user. Therefore, for example, the provider of the optical disc 11 can have a chance to provide a service whose contents are difficult to demand from the manufacturers of all reproducing apparatuses, such as guiding to a site where the provider's goods are sold, to the user by individually affiliating with any of the manufacturers (provider of the recording/reproducing apparatus 1).

Next, with reference to FIG. 27 through FIG. 32, a specific example of the process of the navigation program 45 and the application program 47, which is executed in step S185 in FIG. 25, will be described.

Firstly, with reference to the flowchart in FIG. 27, a first example of a process executed by cooperation of the navigation program 45 and the application program 47 which controls a content information registration process, which are executed in the recording/reproducing apparatus 1, will be described.

The application program 47 (Xlet) which controls the content information registration process is stored in the recording/reproducing apparatus 1, and the application program 47 is in an executable state. The application program 47 which controls the content information registration process is activated by the navigation program 45 (Xlet), and executes a process of registering, for example, content title name and additional information (e.g., the performers and director names, the artist name, or the date and year when the work was publicized) regarding content controlled to be played by the navigation program 45 and image data of the content, such as a jacket photograph, into a region in the local storage 24 not managed by the navigation program 45. On this occasion, the application program 47 activates database software (may be an Xlet or software that can perform inter-application communication using JNI other than JAVA (registered trademark)) that controls storage of data into the local storage 24, which is the embedded application 49 in the recording/reproducing apparatus 1, performs inter-application communication, and controls a process thereof.

Also, when a certain condition is satisfied, such as when all movies included in the same series are collected (the number of items of content collected is counted by performing a playback process of movie content using the same recording/reproducing apparatus 1; the same applies hereafter), when a predetermined number of video clips or more of an artist are collected, or when a predetermined number of items of content or more provided by a content author are collected, the application program 47 executes a process of controlling access to a predetermined website where bonus content can be downloaded. On this occasion, the application program 47 activates a web browser (may be an Xlet or software that can perform inter-application communication using JNI other than JAVA (registered trademark)), which is the embedded application 49 in the recording/reproducing apparatus 1, performs inter-application communication, and controls a process thereof.

In step S241, the application program cooperation processing control unit 71 (navigation program 45) controls the optical disc directory management unit 65 or the local storage directory management unit 64 to search for the content title name and additional information (e.g., information indicating the performers and director names, the artist name, or the date and year when the work was publicized, and the series to which the content belongs, which is used in a process described later) stored in a path in the local storage 24 corresponding to the optical disc 11. Note that, when the content title name and additional information are not recorded or stored in a predetermined format such as metadata, the optical disc directory management unit 65 or the local storage directory management unit 64 extracts corresponding information from the recorded or stored data according to need.

In step S242, the application program cooperation processing control unit 71 controls the optical disc directory management unit 65 or the local storage directory management unit 64 to search for content jacket data recorded on the optical disc 11 or stored in the path in the local storage 24 corresponding to the optical disc 11. Note that, when the content jacket data is not recorded or stored in a predetermined format such as metadata, the optical disc directory management unit 65 or the local storage directory management unit 64 extracts corresponding image data from the recorded or stored data according to need.

In step S243, the application program cooperation processing control unit 71 supplies the content title name, additional information, and jacket data which are searched for or extracted by the processing in step S241 and step S242 to the IXC control unit 72. The IXC control unit 72 sends the content title name, additional information, and jacket data to the application program 47, that is, specifically, binds to IxcRegistry.

In step S244, the application program 47 which controls the content information registration process receives the content title name, additional information, and jacket data from the navigation program 45, that is, specifically, looks up IxcRegistry.

In step S245, when the optical disc 11 is started, mounted in the recording/reproducing apparatus 1, and played, if no counter for the number of registrations of the series to which the content belongs exists in a region in the local storage 24 not managed by the navigation program 45, the application program 47 sets a registration number counter and registers the count number 1; if the registration number counter exists, the application program 47 increments the registration number counter.

Specifically, the additional information supplied from the navigation program 45 includes information indicating the series to which the content belongs in order to determine whether or not a predetermined condition is satisfied, such as when all movies included in the same series are collected, when a predetermined number of video clips or more of an artist are collected, or when a predetermined number of items of content or more provided by a content author are collected. The application program 47 refers to the information and increments the registration number counter.

In step S246, the application program 47 refers to the registration number counter and determines whether or not a predetermined condition for providing bonus content was satisfied depending on, for example, whether all items of content included in the specific series are registered, or a predetermined number of items of content or more are registered. When it is determined in step S246 that the predetermined condition was unsatisfied, the process proceeds to step S251 described later.

When it is determined in step S246 that the predetermined condition was satisfied, in step S247, the application program 47 activates the embedded application 49-1 which controls the web browsing function (so-called web browser), which is installed as the embedded application 49 in the recording/reproducing apparatus 1, and gives a notification of information of the URL for accessing the website for downloading bonus content or the like.

Note that the embedded application 49 may be an Xlet or software that can perform inter-application communication using JNI other than JAVA (registered trademark). When the embedded application 49 is an Xlet, the application program 47 executes inter-application communication using IXC. When the embedded application 49 is an application program other than JAVA (registered trademark), the application program 47 executes inter-application program using JNI.

Note that the address (URL) of the website for downloading bonus content may be managed by the navigation program 45, and the application program 47 may be notified of the address, together with information regarding the content. Alternatively, the address may be managed by the application program 47.

In step S248, the web browser which is the embedded application 49 in the recording/reproducing apparatus 1 and is executed by the controller 21 controls the Internet interface 25 to access the website for downloading bonus content via the network 2.

In step S249, the web browser which is the embedded application 49 obtains data of the corresponding website from the Internet interface 25, supplies the obtained data to an external display device, and displays a display screen of the website on the external display device.

In step S250, for example, when a command to download bonus content is given on the basis of a user operation input supplied from the operation input unit 29, the web browser controls the Internet interface 25 to supply a signal requesting download of the bonus content to a predetermined server via the network 2. When a command to terminate the displaying of the website is given, the web browser terminates the displaying of the website on the external display device. In this manner, the web browser performs processing on the basis of a user operation input.

Note that, when bonus content is adapted to be played in association with the specific optical disc 11, the bonus content has the above-described Manifest file and is adapted to be bound to data recorded on the optical disc 11 and played. When bonus content is adapted to be played in association with a plurality of specific optical discs 11, credential of the Manifest file of the bonus content is set to be accessible from navigation programs that play the plurality of specific optical discs 11.

When it is determined in step S246 that the predetermined condition was unsatisfied, or after the end of the processing in step S247, in step S251, the application program 47 activates database software that controls storage of data into the local storage 24, which is the embedded application 49 in the recording/reproducing apparatus 1, and sends the content title name, additional information, and jacket data to the embedded application 49.

Note that, also in here, the embedded application 49 may be an Xlet or software that can perform inter-application communication using JNI other than JAVA (registered trademark). When the embedded application 49 is an Xlet, the application program 47 executes inter-application communication using IXC. When the embedded application 49 is an application program other than JAVA (registered trademark), the application program 47 executes inter-application program using JNI.

In step S252, the database software which controls storage of data into the local storage 24, which is the embedded application 49 in the recording/reproducing apparatus 1, receives the content title name, additional information, and jacket data from the application program 47.

In step S253, the embedded application 49 registers the content title name, additional information, and jacket data in a list of libraries of the database managed by itself.

The database software which controls storage of data into the local storage 24, which is the embedded application 49, is executable by the controller 21 even when the optical disc 11 is not mounted in the recording/reproducing apparatus 1. With a process described later using FIG. 28, regardless of whether or not the optical disc 11 is mounted in the recording/reproducing apparatus 1, the database software is adapted to be capable of performing, when the user desires, a process of presenting information of registered content to the user.

With such a process, the navigation program 45 associated with the optical disc 11 and the application program 47 installed in the recording/reproducing apparatus 1 are cooperatively executed, and the database software which controls storage of data into the local storage 24, which is the embedded application 49 in the recording/reproducing apparatus 1, is activated to register title name, additional information, and jacket data of content played using the optical disc 11.

Further, when the application program 47 is executed in cooperation with a plurality of navigation programs 45 (activated by a plurality of navigation programs 45) and when a predetermined condition was satisfied by performing management by, for example, counting the number of items of content (optical disc 11) played on the recording/reproducing apparatus 1, the application program 47 can activate the web browser which is the embedded application 49 in the recording/reproducing apparatus 1 and download the bonus content.

Note that it has been described here that the web browser which is the embedded application 49 in the recording/reproducing apparatus 1 can be activated to download the bonus content. Needless to say, downloading of the bonus content may be performed alternatively using a content downloading function included in the navigation program 45. In this case, needless to say, even when no embedded applications 49 such as the web browser and the database software are installed, a process is executed by cooperation of the navigation program 45 and the application program 47, thereby counting the number of items of content (optical disc 11) played on the recording/reproducing apparatus 1 and executing a process of downloading the bonus content.

Since both the navigation program 45 and the application program 47 are Xlets written using JAVA (registered trademark), the navigation program 45 and the application program 47 run in a common execution environment and can execute inter-application communication. Also, when the application program 47 serving as a unique function of the recording/reproducing apparatus 1 is configured as a JAVA (registered trademark) Xlet, a more flexible application environment can be configured. Further, the application program 47 can use, using JNI, a program of native code developed using another language (e.g., C language or C++ language). Although services that can be provided using applications embedded in the recording/reproducing apparatus 1 are limited, by using JNI, the application program 47 which can perform inter-application communication with the navigation program 45 which is executable using the optical disc 11 can access functions embedded in advance in the recording/reproducing apparatus 1. Therefore, the degree of freedom of services that can be provided to the user is increased.

Hitherto, operating a function of a receiver that receives a broadcast signal by including a JAVA (registered trademark) applet in the broadcast signal has been done. Since broadcasting is done assuming that basically the same screen is displayed on any receiver, no application that can run only on specific apparatuses has been assumed. In contrast, in the above-described processes, even when the optical disc 11 which can execute the navigation program 45 which is capable of executing a process in cooperation with the application program 47 is mounted in a reproducing apparatus or the like in which no corresponding application program 47 is installed and the optical disc 11 is played, needless to say, a process in cooperation with the application program 47 cannot be executed. Also, even when various embedded applications 49 are installed, if there is no intermediary of the application program 47, no process corresponding to the navigation program 45 associated with the optical disc 11 is executed.

That is, only when, in the recording/reproducing apparatus 1 in which the predetermined application program 47 is installed, the specific optical disc 11 having recorded thereon the corresponding navigation program 45 is mounted, the navigation program 45 associated with the optical disc 11 and the application program 47 included in the recording/reproducing apparatus 1 are adapted to be cooperatively executed to perform a predetermined operation. That is, the recording/reproducing apparatus 1 is configured to be capable of executing processes different from processes executable by a conventional apparatus in which various items of software are simply installed. By realizing such a structure, the apparatus can be made distinguishable.

Figure 27:
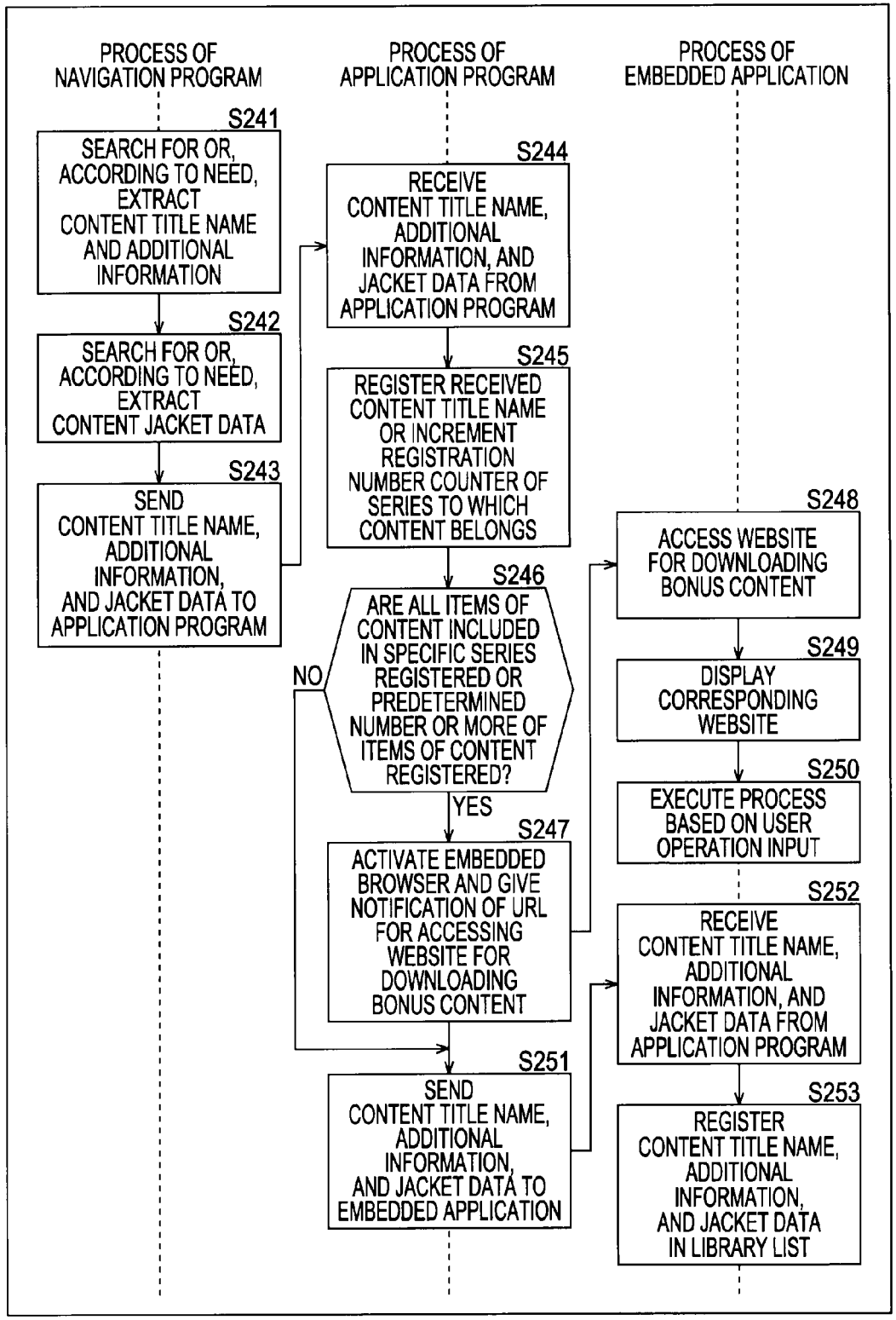
FIG. 27 is a flowchart for describing a first example of a process executed by cooperation of the navigation program and the application program.

With the process described using FIG. 27, the database software which controls storage of data into the local storage 24, which is the embedded application 49 in the recording/reproducing apparatus 1, registers the content title name, additional information, and jacket data in the list of libraries of the database managed by itself.

Therefore, when the controller 21 executes this embedded application 49, regardless of whether or not the optical disc 11 is mounted in the recording/reproducing apparatus 1, the controller 21 is configured to be capable of performing a process of presenting to the user information of the registered content.

Figure 28:
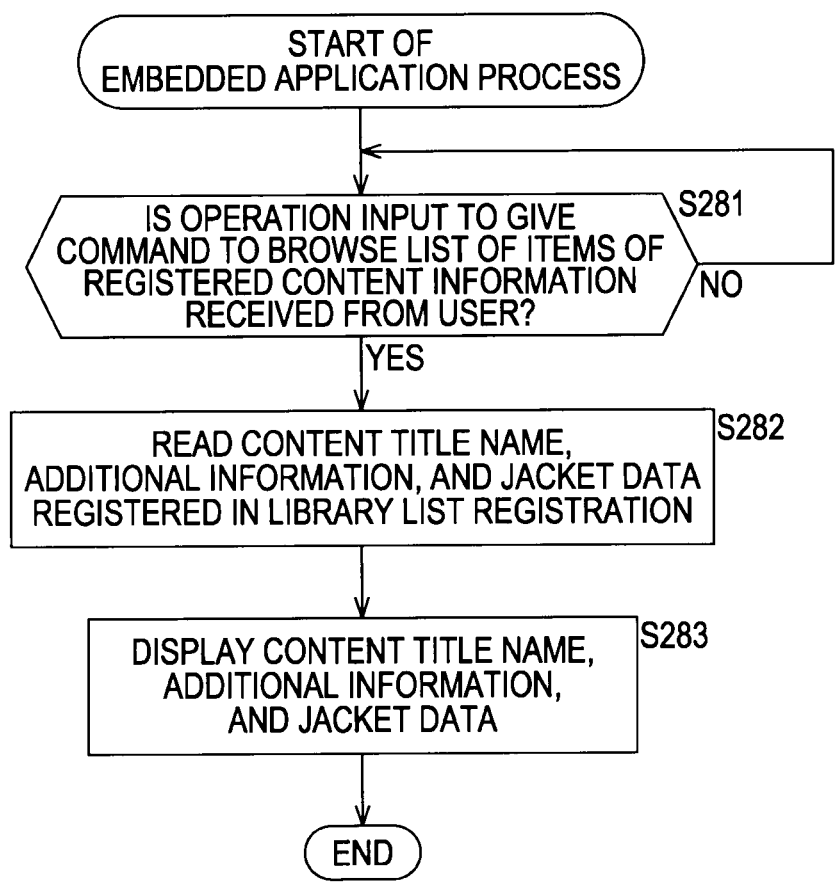
FIG. 28 is a flowchart for describing a process of an embedded application.

Referring to FIG. 28, a process performed by the embedded application 49 (database software which controls storage of data into the local storage 24) will be described.

In step S281, the controller 21 which runs the database software controlling storage of data into the local storage 24, which is the embedded application 49 in the recording/reproducing apparatus 1, determines, on the basis of a signal supplied from the operation input unit 29, whether or not an operation input to give a command to browse a list of items of registered content information has been received from the user. When it is determined in step S281 that no operation input to give a command to browse a list of items of registered content information has been received from the user, the processing in step S281 is repeated until it is determined that an operation input to give a command to browse a list of items of registered content information has been received.

When it is determined in step S281 that an operation input to give a command to browse a list of items of registered content information has been received from the user, in step S282, the controller 21 reads the content title name, additional information, and jacket data which are registered in the library list registration.

In step S283, the controller 21 generates display image data for displaying the content title name, additional information, and jacket data and outputs the display image data to an external display device for display, and the process is terminated.

With such a process, when the controller 21 executes this embedded application 49, regardless of whether or not the optical disc 11 is mounted in the recording/reproducing apparatus 1, the controller 21 is configured to be capable of performing a process of presenting to the user information of the registered content.

Next, referring to FIG. 29, a picture recording/recording/reproducing apparatus 101 that further has a function of receiving broadcast waves or obtaining program content of, for example, a cable television or the like and recording the program content will be described.

Note that portions corresponding to the recording/reproducing apparatus 1 described using FIG. 1 are given the same reference numerals, and descriptions thereof are appropriately omitted.

Figure 29:
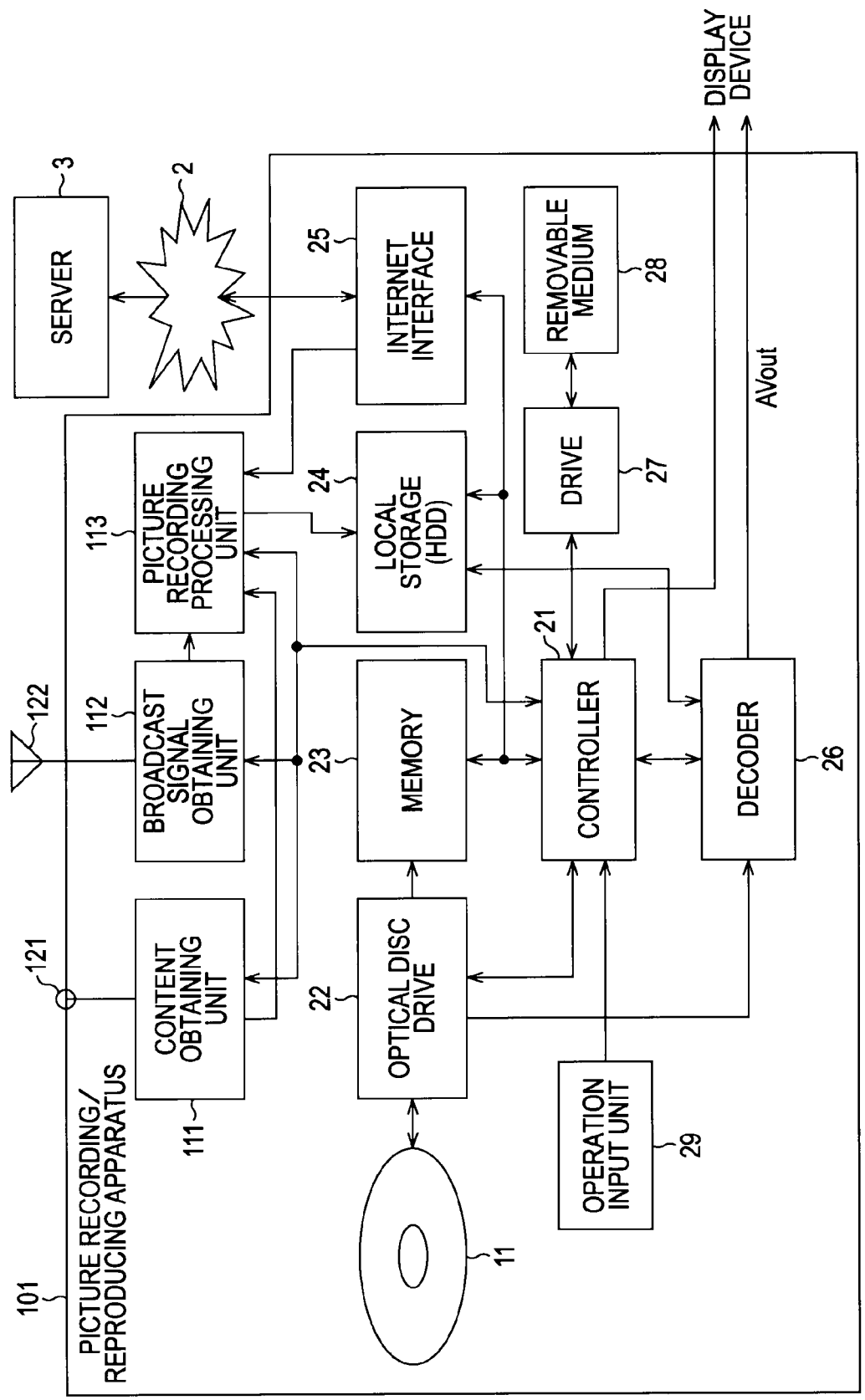
FIG. 29 is a block diagram showing a different exemplary structure of the reproducing apparatus.

That is, the picture recording/recording/reproducing apparatus 101 in FIG. 29 is basically configured in which, in addition to the structure included in the recording/reproducing apparatus 1 described using FIG. 1, a content obtaining unit 111, a broadcast signal obtaining unit 112, a picture recording processing unit 113, an input terminal 121, and an antenna 122 are newly provided.

The content obtaining unit 111 obtains, for example, program content of a cable television or the like, which has been input from the input terminal 121, and supplies the program content to the picture recording processing unit 113.

The broadcast signal obtaining unit 112 obtains a broadcast signal received by the antenna 122 and supplies the broadcast signal to the picture recording processing unit 113.

The picture recording processing unit 113 executes a process of recording, into the local storage 24, program content supplied from the content obtaining unit 111 or the broadcast signal obtaining unit 112 or program content or the like supplied from the Internet interface 25 and distributed via the network 2, that is, a picture recording process. The picture recording processing unit 113 is also capable of setting a timer recording under control of the controller 21.

According to need, picture recording data recorded in the local storage 24 is decoded by the transcoder 26, output to an external display unit, and reproduced and displayed. In addition, when the picture recording data recorded in the local storage 24 is supplied in association with the above-described Manifest file, a path based on the Manifest file may be set to the recorded data, the above-described binding process may be executed by the navigation program 45, and the recorded data may be reproduced together with content recorded on the specific optical disc 11.

The obtaining of content data by the content obtaining unit 111, the broadcast signal obtaining unit 112, or the Internet interface 25 may be regarded as a function embedded in advance in the picture recording/recording/reproducing apparatus 101, and may be adapted to be executed by a process performed by the embedded application 49. In addition, a content data recording process performed by the picture recording processing unit 113 may be regarded as a function embedded in advance in the picture recording/recording/reproducing apparatus 101, and may be adapted to be executed by a process performed by the embedded application 49.

Among the functions included in the controller 21, functions provided by the JAVA (registered trademark) environment are basically similar to those in the case described using FIG. 6 or FIG. 7, and functions realized by executing the navigation program 45 when the optical disc 11 is mounted are basically similar to those in the case described using FIG. 9.

Also, the content obtaining unit 111 or the broadcast signal obtaining unit 112 may be capable of obtaining a JAVA (registered trademark) Xlet, together with program content. The controller 21 can store the obtained JAVA (registered trademark) Xlet in the local storage 24 so that the JAVA (registered trademark) Xlet is in an executable state, that is, can install the JAVA (registered trademark) Xlet.

In the picture recording/recording/reproducing apparatus 101 in FIG. 29, a software platform that controls the function of receiving broadcast waves or obtaining program content of, for example, a cable television or the like and recording the program content may be an environment different from a software platform that controls a process of playing the optical disc 11. Therefore, it has hitherto been difficult for applications written in or executed in association with the mounted optical disc 11 to prepare all APIs for executing processes in cooperation with these functions.

In contrast, both the navigation program 45 which is an application written on the optical disc 11 mounted in the picture recording/recording/reproducing apparatus 101 and the application program 47 which is unique to the picture recording/recording/reproducing apparatus 101 are Xlets using JAVA (registered trademark), which is a programming language that can run on a virtual machine, that is, that can run on a multi-platform. Therefore, the navigation program 45 and the application program 47 can run in a common execution environment and can mutually execute inter-application communication, and accordingly, the navigation program 45 and the application program 47 can run in cooperation with each other. Further, the application program 47 may have a function of using, using JNI (JAVA (registered trademark) Native Interface), a program of native code developed using another language (e.g., C language or C++ language). Therefore, the navigation program 45 executable using the optical disc 11 can access, via the application program 47, a function embedded in advance in the picture recording/recording/reproducing apparatus 101, i.e., can communicate with the embedded application 49 using JNI or IXC and control a process thereof. Therefore, while the development cost can be suppressed by using the already existing technology (functions embedded in advance in the picture recording/recording/reproducing apparatus 101) as they are, the degree of freedom of services that can be provided to the user can be improved.

That is, the embedded application 49 may be an Xlet or a module that can perform inter-application communication using JNI other than JAVA (registered trademark). When the embedded application 49 is an Xlet, the application program 47 executes inter-application communication using IXC. When the embedded application 49 is an application program other than JAVA (registered trademark), the application program 47 executes inter-application program using JNI.

Next, referring to the flowchart in FIG. 30, a second example of the process executed by cooperation of the navigation program 45 and the application program 47 which controls a timer recording process, which are executed in the picture recording/recording/reproducing apparatus 101 in FIG. 29 or the recording/reproducing apparatus 1 in FIG. 1 externally connected to a picture recording apparatus, will be described.

The application program 47 (Xlet) which controls a timer recording process is stored in the picture recording/recording/reproducing apparatus 101, and the application program 47 is in an executable state. Specifically, the application program 47 which controls the timer recording process is activated by the navigation program 45 and is adapted to be capable of activating the embedded application 49 (may be an Xlet or software that can perform inter-application communication using JNI other than JAVA (registered trademark)), which is the embedded application 49 in the picture recording/recording/reproducing apparatus 101, for receiving broadcast waves or obtaining program content of, for example, a cable television or the like and recording the program content, performing inter-application communication, and controlling a process thereof.

Note that, when a picture recording apparatus that has a function of receiving broadcast waves or obtaining program content of, for example, a cable television or the like and recording the program content, that is, a picture recording apparatus that has a structure similar to the content obtaining unit 111, broadcast signal obtaining unit 112, picture recording processing unit 113, input terminal 121, and antenna 122 in the picture recording/recording/reproducing apparatus 101 in FIG. 29, is connected to the recording/reproducing apparatus 1 described using FIG. 1, the application program 47 which controls a timer recording process sends out a control signal to the outside and controls a picture recording process using the embedded application 49 embedded in the picture recording apparatus.

In step S311, the application program cooperation processing control unit 71 controls the optical disc directory management unit 65 or the local storage directory management unit 64 to detect information needed to obtain program content, such as the broadcast or provided time and date of the program content relating to the optical disc 11 or content played using the optical disc 11, which is recorded on the optical disc 11 or stored in a path in the local storage 24 corresponding to the optical disc 11, and path information in the case where the recorded program content is to be stored in the local storage 24.

In step S312, the application program cooperation processing control unit 71 sends to the application program 47, specifically, binds to IxcRegistry, the information needed to obtain the program content, and the path information in the case where the recorded program content is to be stored in the local storage 24, which are detected by the processing in step S311.

In step S313, the application program 47 which controls the timer recording process receives, from the navigation program 45, the information needed to obtain the program content, and the path information in the case where the recorded program content is to be stored in the local storage 24, specifically, looks up IxcRegistry.

In step S314, the application program 47 generates control information for causing the timer recording process to be executed on the basis of the received information.

In step S315, the application program 47 outputs the control information for causing the timer recording to be executed to an external picture recording apparatus or the like that executes a picture recording process (sends the control information to the embedded application 49 embedded in an external picture recording apparatus) or activates the embedded application 49 which executes a picture recording process and sends the control information to this embedded application 49.

In step S316, the external picture recording apparatus which executes a picture recording process or the embedded application 49 which executes a picture recording process executes a timer recording process on the basis of the control information supplied from the application program 47.

In step S317, the external picture recording apparatus which executes a picture recording process or the embedded application 49 which executes a picture recording process determines whether or not the recording of the predetermined program content has been completed. When it is determined in step S317 that the recording of the program content has not been completed, the processing in step S317 is repeated until it is determined that the recording of the program content is completed.

When it is determined in step S317 that the recording of the program content is completed, in step S318, the external picture recording apparatus which executes a picture recording process or the embedded application 49 which executes a picture recording process sets or supplies and stores data of the recorded program content in the predetermined path in the local storage 24. Also, the external picture recording apparatus which executes a picture recording process or the embedded application 49 which executes a picture recording process notifies the application program 47 of the completion of the picture recording process, and accordingly the application program 47 notifies the navigation program 45 of the completion of the picture recording process.

In step S319, the file system merge processing unit 66 of the navigation program 45 executes the binding process described using FIG. 21 to reach a state in which the recorded program content and the content recorded on the optical disc (including data stored in the local storage corresponding to that content) can be combined and played.

In order to execute such a process, information needed to record the predetermined program content, and path information in the local storage 24 of the recorded program content are recorded on the optical disc 11 or in the path in the local storage 24 corresponding to the optical disc 11. The path information is information needed to bind the recorded program content to the file system of the content recorded on the optical disc 11. Only when that optical disc 11 is mounted in the external picture recording apparatus which executes a picture recording process or in the recording/reproducing apparatus 1 or the picture recording/recording/reproducing apparatus 101 in which the application program 47 which can control the embedded application 49 which executes a picture recording process is installed, the predetermined program content is automatically recorded, bound to the file system of the content recorded on the optical disc 11, and played.

Since the navigation program 45 and the application program 47 are cooperatively executed in this manner, without greatly changing the function and structure of the embedded application 49 or the external apparatus, a service that cannot be provided to the user only using the embedded application 49 can be provided to the user as a service unique to the recording/reproducing apparatus 1 or the picture recording/recording/reproducing apparatus 101 in which the application program 47 is installed.

Figure 31:
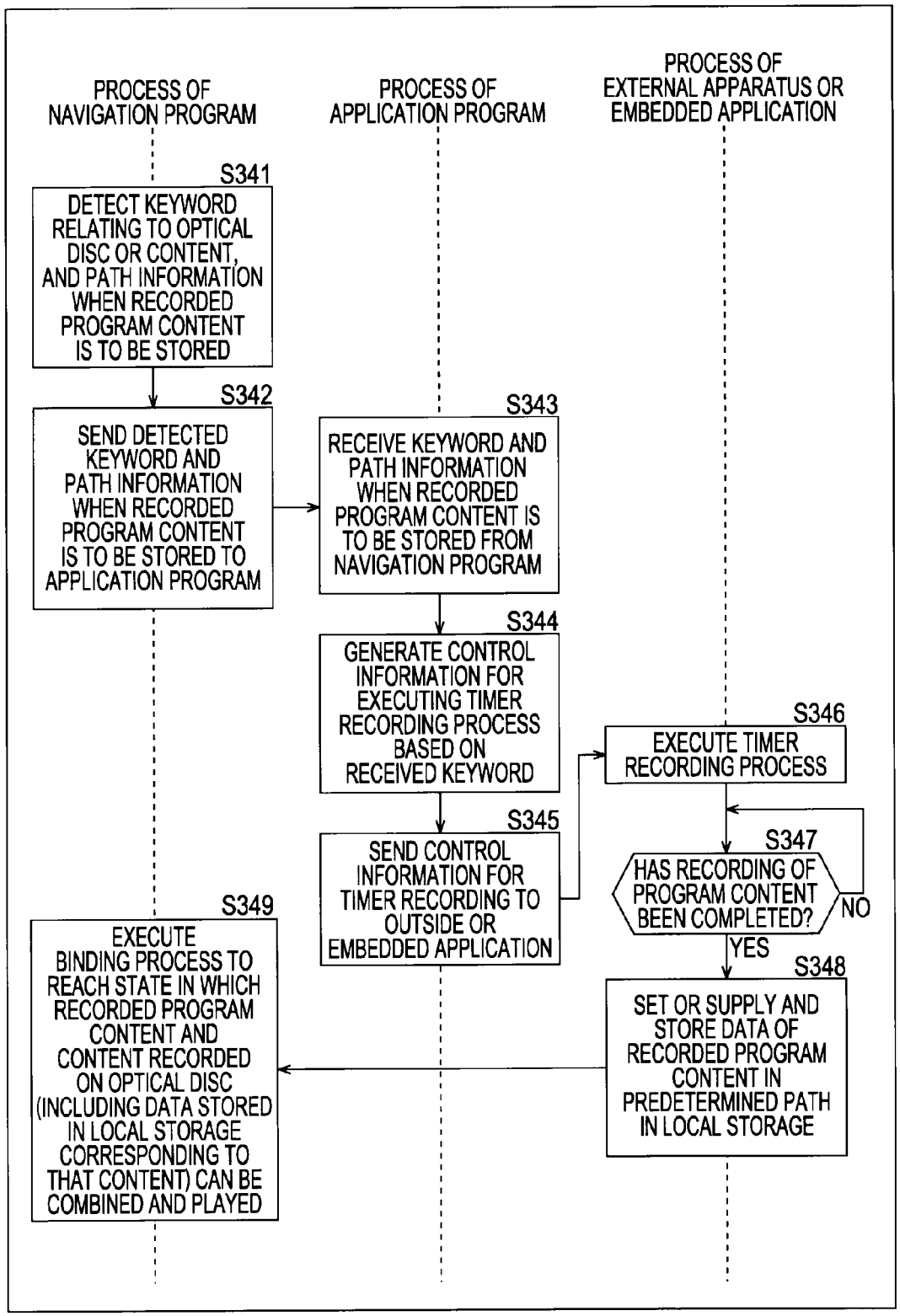
FIG. 31 is a flowchart for describing a third example of the process executed by cooperation of the navigation program and the application program.

Next, referring to the flowchart in FIG. 31, a third example of the process executed by running the navigation program 45 and the application program 47, which controls a picture recording process, in cooperation with each other, which are executed in the picture recording/recording/reproducing apparatus 101 in FIG. 29 or the recording/reproducing apparatus 1 in FIG. 1 externally connected to a picture recording apparatus, will be described.

Also in here, the application program 47 (Xlet) which controls a timer recording process is stored in the picture recording/recording/reproducing apparatus 101, and the application program 47 is in an executable state. The application program 47 which controls a timer recording process is activated by the navigation program 45 and executes a process that controls a timer recording of a predetermined program or the like. Also, the picture recording processing unit 113 is configured to be capable of receiving an input of a keyword and performing a picture recording process based on information indicating the contents of program content and metadata, such as an EPG (Electronic Program Guide). Also in here, when a picture recording apparatus that has a function of receiving broadcast waves or obtaining program content of, for example, a cable television or the like and recording the program content, that is, a picture recording apparatus that has a structure similar to the content obtaining unit 111, broadcast signal obtaining unit 112, picture recording processing unit 113, input terminal 121, and antenna 122 in the picture recording/recording/reproducing apparatus 101 in FIG. 29, is connected to the recording/reproducing apparatus 1 described using FIG. 1, the application program 47 which controls a timer recording process is adapted to send out a control signal to the outside and to control a picture recording process performed by the picture recording apparatus.

In step S341, the application program cooperation processing control unit 71 controls the optical disc directory management unit 65 or the local storage directory management unit 64 to detect a keyword relating to the optical disc 11 or content played using the optical disc 11, which is recorded on the optical disc 11 or stored in a path in the local storage 24 corresponding to the optical disc 11, and path information in the case where the recorded program content is to be recorded in the local storage 24.

In step S342, the application program cooperation processing control unit 71 sends to the application program 47, specifically, binds to IxcRegistry, the keyword and the path information in the case where the recorded program content is to be recorded in the local storage 24, which are detected by the processing in step S341.

In step S343, the application program 47 which controls the timer recording process receives, from the navigation program 45, the keyword and the path information in the case where the recorded program content is to be recorded in the local storage 24, specifically, looks up IxcRegistry.

In step S344, the application program 47 generates control information for causing the timer recording process to be executed on the basis of the received information.

Figure 30:
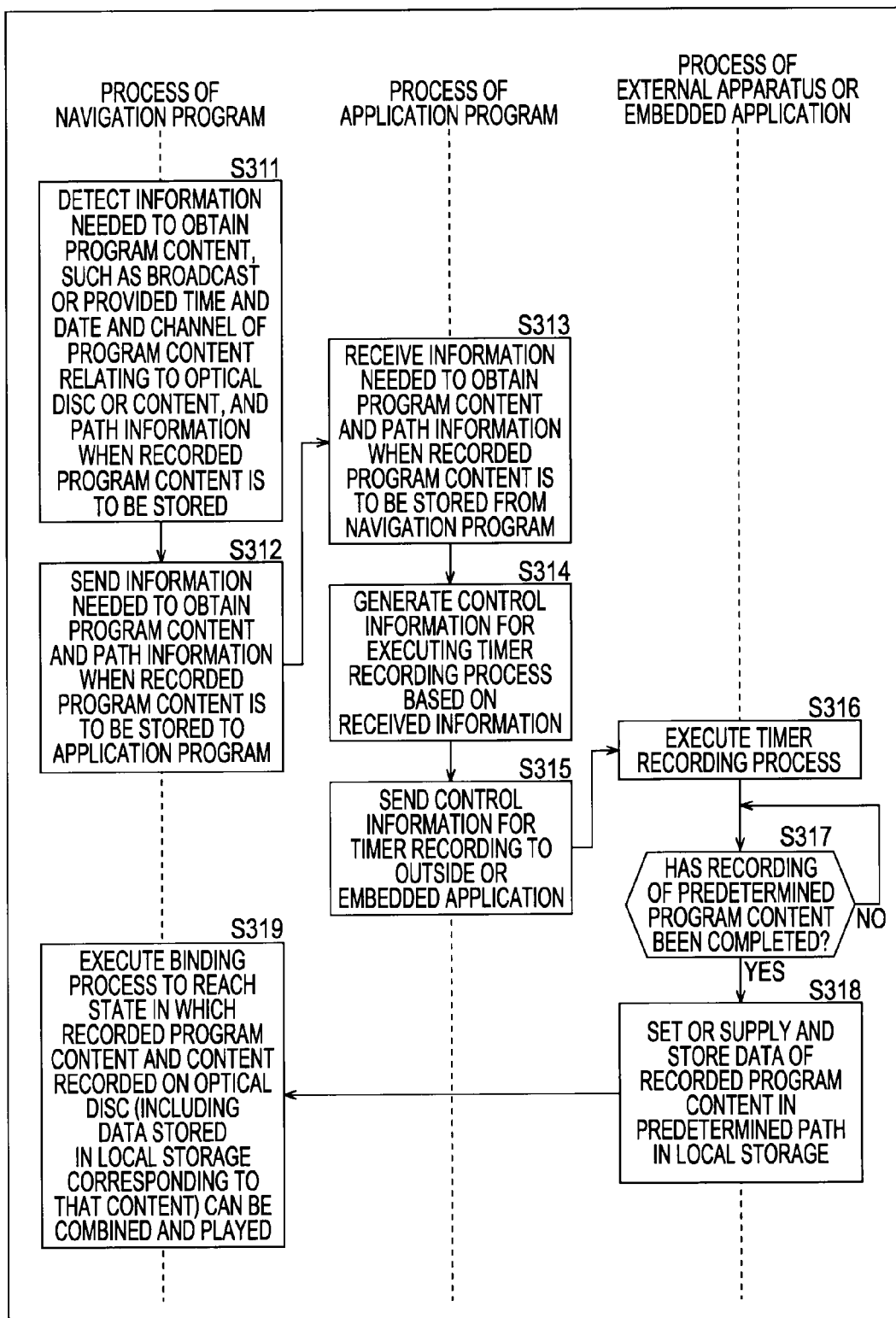
FIG. 30 is a flowchart for describing a second example of the process executed by cooperation of the navigation program and the application program.

In step S345 through step S349, the processing basically similar to step S315 through step S319 described using FIG. 30 is executed, and the process is terminated.

That is, the application program 47 outputs the control information for causing the timer recording to be executed to an external picture recording apparatus that executes a picture recording process (sends the control information to the embedded application 49 embedded in an external picture recording apparatus) or activates the embedded application 49 which executes a picture recording process and sends the control information to this embedded application 49. The external picture recording apparatus which executes a picture recording process or the embedded application 49 which executes a picture recording process executes a timer recording process of program content that matches the keyword by referring to the information relating to the program content, such as an EPG, on the basis of the control information supplied from the application program 47, and, when it is determined that the recording of the program content has been completed, sets or supplies and stores data of the recorded program content in the predetermined path in the local storage 24 and notifies the application program 47 of the completion of the picture recording process. The application program 47 notifies the navigation program 45 of the completion of the picture recording process. Then, the file system merge processing unit 66 of the navigation program 45 executes the binding process described using FIG. 21 to reach a state in which the recorded program content and the content recorded on the optical disc (including data stored in the local storage corresponding to that content) can be combined and played.

In order to execute such a process, on the optical disc 11 or in the path in the local storage 24 corresponding to the optical disc 11, the keyword is recorded as information needed to record the predetermined program content, and path information in the local storage 24 of the recorded program content is recorded. Only when that optical disc 11 is mounted in the external picture recording apparatus which executes a picture recording process or in the recording/reproducing apparatus 1 or the picture recording/recording/reproducing apparatus 101 in which the application program 47 which can control the embedded application 49 which executes a picture recording process is installed, the predetermined program content is automatically recorded, bound to the file system of the content recorded on the optical disc 11, and played.

Also, needless to say, the program content automatically recorded in this manner may be set playable by itself without being bound to the file system of the content recorded on the optical disc 11. Accordingly, for example, even when the user does not enter a keyword by himself/herself, program content relating to the optical disc 11 which has been played by the recording/reproducing apparatus 1 or the picture recording/recording/reproducing apparatus 101, that is, program content in which the user is highly likely to be interested, can be automatically recorded. This makes it possible to provide a service of automatically recording program content that matches the user's taste.

Since the navigation program 45 and the application program 47 are cooperatively executed in this manner, without greatly changing the function and structure of the embedded application 49 or the external apparatus, a service that cannot be provided to the user only using the embedded application 49 can be provided to the user as a service unique to the recording/reproducing apparatus 1 or the picture recording/recording/reproducing apparatus 101 in which the application program 47 is installed.

In addition, since the navigation program 45 and the application program 47 are adapted to be executable in cooperation with each other, a GUI (Graphic User Interface) display screen widely used in various apparatuses, such as television receivers and picture recording/reproducing apparatuses, to assist the user in entering an operation input can be used in the recording/reproducing apparatus 1 in FIG. 1 or the picture recording/recording/reproducing apparatus 101 in FIG. 29.

Specifically, for example, as the applicant has publicized in "SONY WEGA|Experience! XMB", <URL: http://www.sony.jp/products/Consumer/wega/xmb/index.html> at the time of Jun. 20, 2006, electrical household appliances with various functions, such as a function of receiving a broadcast program, recording the broadcast program on an internal hard disk, and playing the broadcast program, and a function of playing music and still images recorded on the hard disk, have been on sale in recent years. Among these devices, there are devices prepared with, as a menu screen for enabling the user to use the various functions, a screen displaying icons of individual categories in the horizontal direction of the screen and displaying individual items of a selected category in the vertical direction.

As categories for categorizing items, "video" relating to recording of programs and playback of recorded programs, "photo" relating to playback of still images, "music" relating to playback of music, and the like are prepared.

For example, when the "photo" category is selected from among a plurality of categories, all images (thumbnail images) loaded in the device are displayed on the screen in one line in the vertical direction, and the user can find a target image simply by entering up/down operations. Devices displaying such a screen realize an environment in which the user can easily find a target image by shortening the response time of display in response to an up/down operation.

Such a GUI display function is installed as the embedded application 49 in various apparatuses and provided to users.

Figure 32:
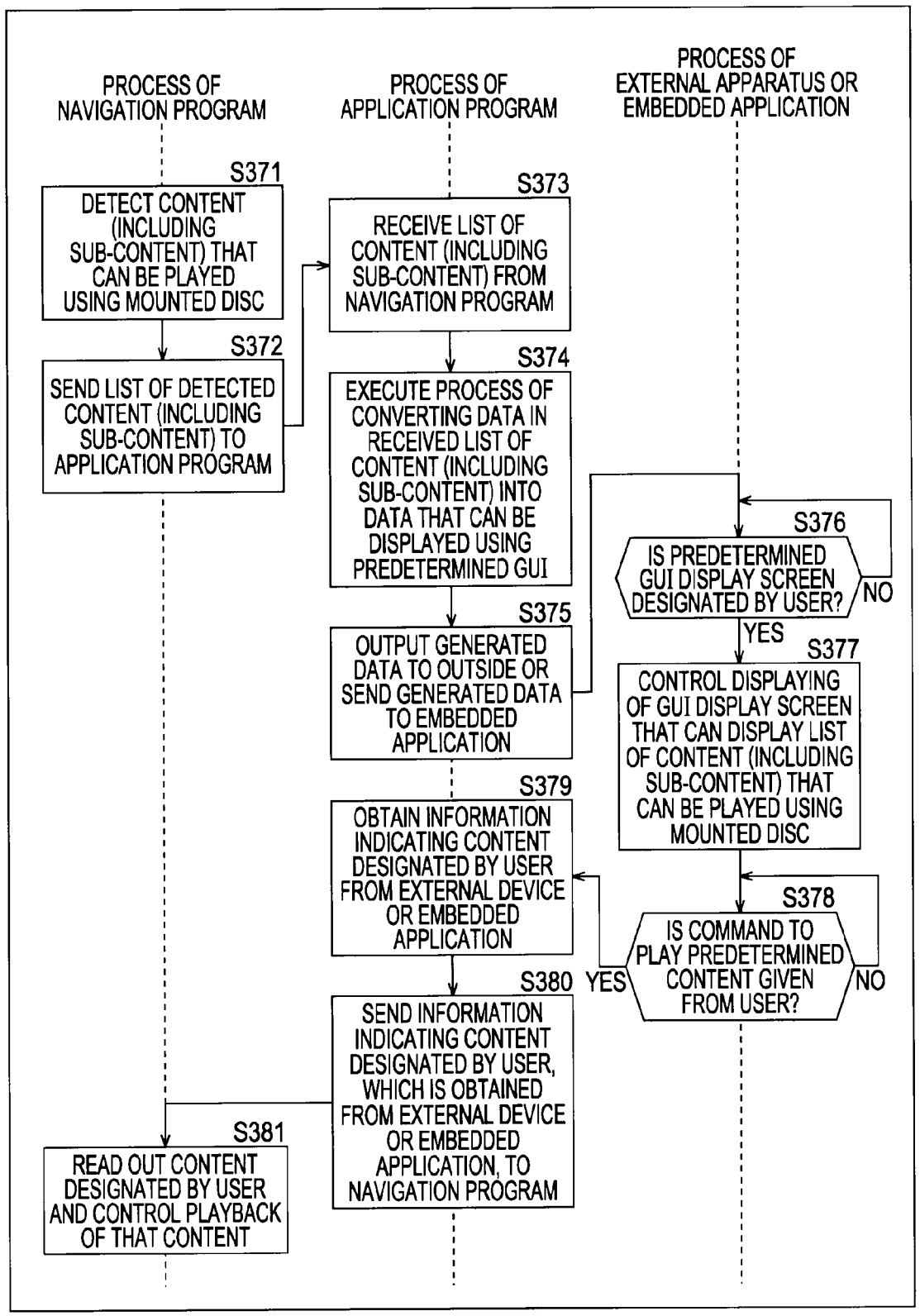
FIG. 32 is a flowchart for describing a fourth example of the process executed by cooperation of the navigation program and the application program.

Next, referring to the flowchart in FIG. 32, a fourth example of the process executed by running the navigation program 45 and the application program 47, which controls displaying of a GUI display screen, in cooperation with each other, which are executed in the recording/reproducing apparatus 1 in FIG. 1 or the picture recording/recording/reproducing apparatus 101 in FIG. 29, will be described.

In step S371, the application program cooperation processing control unit 71 controls the optical disc directory management unit 65 or the local storage directory management unit 64 to detect a title, additional information, and the like of the optical disc 11 or content (including sub-content) played using the optical disc 11, which are recorded on the optical disc 11 or stored in a path in the local storage 24 corresponding to the optical disc 11.

In step S372, the application program cooperation processing control unit 71 sends to the application program 47, specifically, binds to IxcRegistry, a list of a title, additional information, and the like of content (including sub-content), which are detected by the processing in step S371.

In step S373, the application program 47 which controls a process of displaying a GUI display screen receives the list of a title, additional information, and the like of content (including sub-content) from the navigation program 45, specifically, looks up IxcRegistry.

In step S374, the application program 47 executes a process for converting data such as the received title, additional information, and the like of content (including sub-content) into data that can be displayed using a predetermined GUI.

In step S375, the application program 47 outputs the generated data to an external display device or the like that executes a GUI display process and a process of obtaining a user operation entered by a user who refers to a GUI display screen (sends the generated data to the embedded application 49 embedded in an external display device) or activates the embedded application 49 which executes a GUI display process and a process of obtaining a user operation entered by a user who refers to a GUI display screen and sends control information to this embedded application 49.

In step S376, the external display device or the embedded application 49 determines whether or not a command to display a predetermined GUI display screen has been given from the user. When it is determined in step S376 that no command to display a predetermined GUI display screen has been given from the user, the processing in step S376 is repeated until it is determined that a display command has been given.

When it is determined in step S376 that a command to display a predetermined GUI display screen has been given from the user, in step S377, the external display device or the embedded application 49 controls displaying of a GUI display screen capable of displaying the list of a title, additional information, and the like of content (including sub-content) which can be played using the mounted optical disc 11.

In step S378, the external display device or the embedded application 49 determines whether or not predetermined content has been selected and determined from the list of a title, additional information, and the like of content (including sub-content) which can be played using the mounted optical disc 11, which is displayed on the GUI display screen, and a command to play the selected content has been given. When it is determined in step S378 that no playback command has been given, the processing in step S378 is repeated until it is determined that a playback command has been given.

When it is determined in step S378 that a playback command has been given, the external display device or the embedded application 49 notifies the application program 47 of the command given from the user. In step S379, the application program 47 obtains information indicating the content designated by the user from the external display device or the embedded application 49.

In step S380, the application program 47 sends the information indicating the content designated by the user, which has been obtained from the external display device or the embedded application 49, to the navigation program 45.

In step S381, the navigation program 45 controls a process of reading out and playing the content designated by the user to be played.

With such a process, a list of a title, additional information, and the like of content (including sub-content) that can be displayed using the optical disc 11 can be displayed using a function of displaying a GUI display screen provided as the embedded application 49 (e.g., may be that widely used in other apparatuses). Accordingly, the user can easily check the contents of playable content and designate content to play by using a GUI display screen that is familiar and is easy to use. Further, the manufacturer of the recording/reproducing apparatus 1 or the picture recording/recording/reproducing apparatus 101 need not develop a unique GUI display screen. While reducing the development cost, the manufacturer can provide to the user a GUI display screen that is familiar and is easy to use for the user.

As has been described above, for example, as in JAVA (registered trademark) or the like, the application program 47 which can run on a multi-platform due to the mounting of a virtual machine and is installed uniquely in the apparatus and the navigation program 45 which is associated with a recording medium such as an optical disc mounted in the apparatus can be adapted to run in cooperation with each other using inter-application communication such as IXC. The manufacturer of an apparatus that has a function of playing a recording medium such as an optical disc can differentiate the apparatus by installing or making it possible to install, in the apparatus, an application program that can run in cooperation with a navigation program associated with the recording medium such as the optical disc.

Also, using these techniques, when the provider who provides content (content author) using a recording medium such as an optical disc individually makes a contract with the provider of an apparatus that plays that recording medium, individual services can be provided to the user. Therefore, for example, the provider who provides content using a recording medium such as an optical disc can provide to the user even a service whose contents are difficult to demand from all manufacturers, such as guiding to a site where the provider's goods are sold, by individually affiliating with the provider of an apparatus that plays that recording medium.

Now, as has been described above, the application program 47 may be one that is downloaded from another apparatus. In addition, with the application program 47, another application program 47 may be downloaded.

Figure 33:
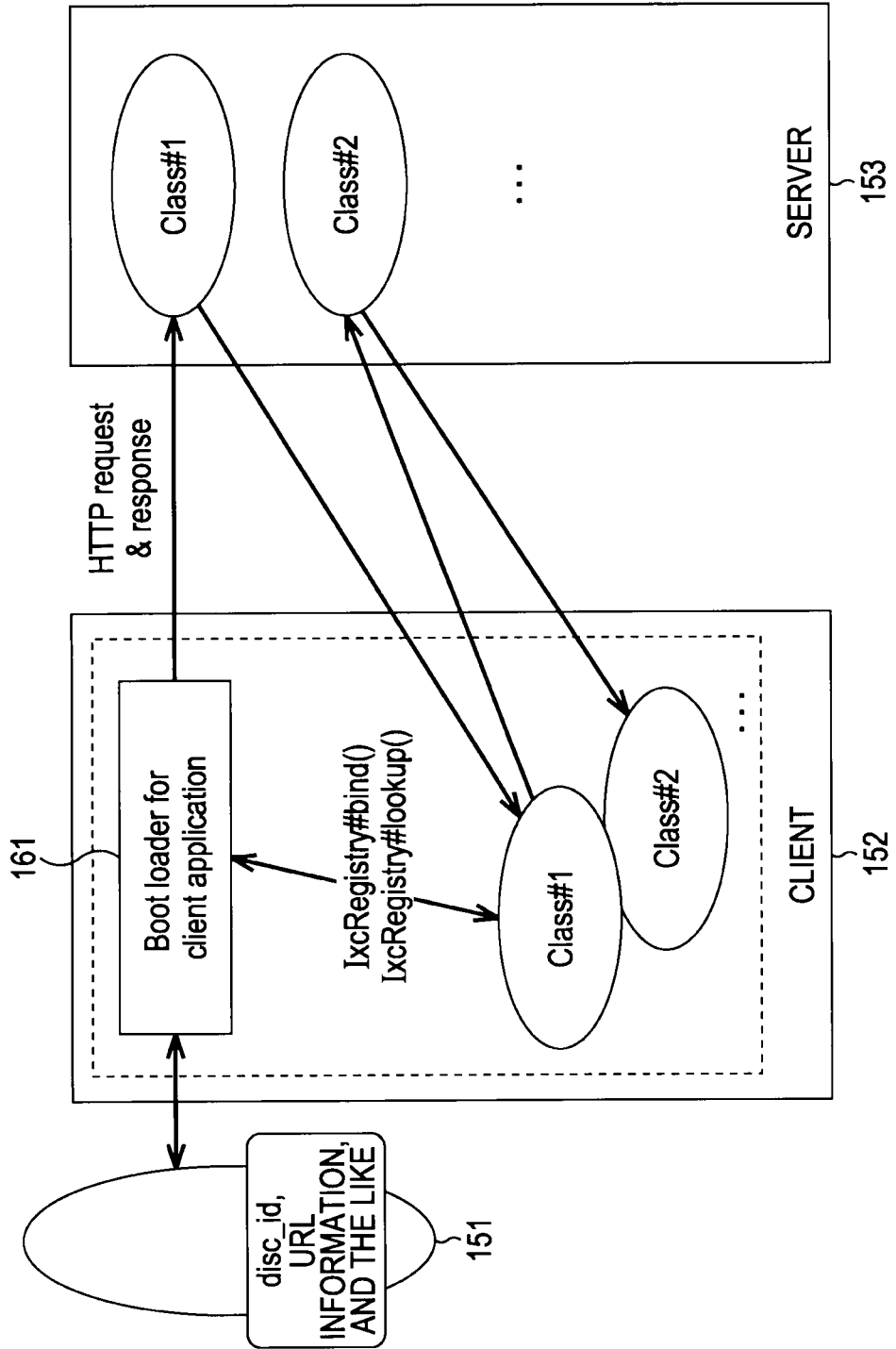
FIG. 33 is a diagram for describing downloading of an application program.

Referring to FIG. 33, downloading and activation of the application program 47 will be described.

In a client 152, such as the above-described recording/reproducing apparatus 1 or picture recording/recording/reproducing apparatus 101, in which an optical disc 151 is mounted, the optical disc 151 having recorded thereon, in addition to disc_id, URL information and the like of a downloading destination of the application program 47, a boot loader (Boot loader for client application) 161 that executes a process of downloading the application program 47 from a predetermined server, storing the application program 47 therein, and activating the application program 47 is installed. The boot loader 161 is one of application programs 47 which are JAVA (registered trademark) Xlets.

When this boot loader 161 is activated, the boot loader performs IXC-based inter-program communication with the navigation program 45 of the mounted optical disc 151, obtains URL information and the like of a downloading destination of a new application program 47 to download, accesses a predetermined server 153 using a general protocol such as HTTP, downloads the designated application program 47, and stores the application program 47 in a predetermined storage region. The boot loader 161 executes, according to need, downloading and storage processes by performing processes in cooperation with the above-described function group 54, the embedded applications 49, and the like which are not essential for a playback process. Here, it is assumed that Class#1 which is a JAVA (registered trademark) Xlet is downloaded from the server 153 and stored in a predetermined storage region.

The boot loader 161 binds Class#1, which has been downloaded and stored in the predetermined storage region, to IxcRegistry. Also, the boot loader 161 looks up IxcRegistry when activating the downloaded Class#1. Needles to say, functions executed by the boot loader 161 may include a function of downloading a plurality of application programs 47.

Also, when processes executed by the downloaded Class#1 further include a process of downloading a different application program 47, Class#1 which is a JAVA (registered trademark) Xlet connects to a predetermined server (e.g., the server 153) on the basis of logic described in Class#1, downloads Class#2 which is a JAVA (registered trademark) Xlet different from Class#1 as the application program 47, and stores Class#2 in a predetermined storage region. In FIG. 33, it has been described that Class#2 is downloaded from the same server 153 as that of Class#1. However, it is only necessary that URL information and the like for downloading Class#2 be written in Class#1, and, needless to say, Class#2 may be downloaded from a server that is different from that of Class#1. In addition, needless to say, Class#1 may include a function of downloading three or more application programs 47, and Class#2 may also include a function of downloading a plurality of application programs 47.

Note that, in the processes described using FIG. 25 through FIG. 32, the application program 47 has been described as being activated by the navigation program 45 recorded on the mounted optical disc 11. In contrast, the boot loader 161 which is the application program 47 may be activated by the navigation program 45 recorded on the mounted optical disc 11, or may be activated, for example, in response to a user operation input. The boot loader 161 is adapted to be capable of downloading the application program 47 corresponding to the navigation program 45 recorded on the mounted optical disc 11. That is, the boot loader 161 which is the application program 47 is adapted to perform a process in cooperation with the navigation program 45, as in the case of the above-described processes. Needless to say, the navigation program 45 downloaded by the boot loader corresponds to the mounted optical disc 11.

Also, it has been described here that the boot loader 161 is adapted to execute a process of downloading and a process of activating the application program 47 corresponding to the navigation program 45 recorded on the mounted optical disc 11. Needless to say, however, downloading and activation may be executed by different application programs 47. Even in the case where downloading and activation are executed by different application programs 47, since these application programs 47 are JAVA (registered trademark) Xlets and can perform inter-application communication using IXC, downloading and activation can be cooperatively performed.

Next, referring to the flowchart in FIG. 34, a process of downloading another application program 47 using the boot loader which is the application program 47 will be described.

In step S431, the controller 21 determines whether or not a command to activate the boot loader 161 has been given on the basis of a user operation input supplied from the operation input unit 29 or, when the navigation program 45 is being executed, a command issued by the processing of the navigation program. When it is determined in step S431 that no command to activate the boot loader 161 has been given, the processing in step S431 is repeated until it is determined that a command to activate the boot loader 161 has been given.

When it is determined in step S431 that a command to activate the boot loader 161 has been given, in step S432, the boot loader 161 is activated by the application program cooperation processing control unit 71 and the IXC control unit 72 of the controller 21, and a process of the boot loader 161 is started by the application program execution processing unit 73. Basically, the boot loader 161 which is the application program 47 is activated by a process similar to the application program calling process described using FIG. 26.

In step S433, the application program execution processing unit 73 which executes the boot loader 161 obtains information needed to download the application program 47 read by the navigation program 45 from the mounted optical disc 151, such as disc_id recorded on the mounted optical disc 151 and URL information of the server 153 which is a downloading destination, by performing inter-program communication between the boot loader 161 and the navigation program 45 under control of the IXC control unit 72.

In step S434, the application program execution processing unit 73 which executes the boot loader 161 executes, according to need, a process in cooperation with the function group 54 or the embedded application 49 which is not essential for a playback process, thereby establishing an HTTP connection to the corresponding server 153 and sending necessary information.

In step S435, the application program execution processing unit 73 which executes the boot loader 161 executes, according to need, a process in cooperation with the function group 54 or the embedded application 49 which is not essential for a playback process, thereby downloading a predetermined application program 47 from the corresponding server 153 and recording the downloaded application program 47 in the local storage 24.

In step S436, the application program execution processing unit 73 which executes the boot loader 161 executes a process of binding to ixcRegistry in order to activate the downloaded application program 47.

In step S437, the application program execution processing unit 73 which executes the boot loader 161 looks up ixcregistry and activates the downloaded application program 47.

Figure 35:
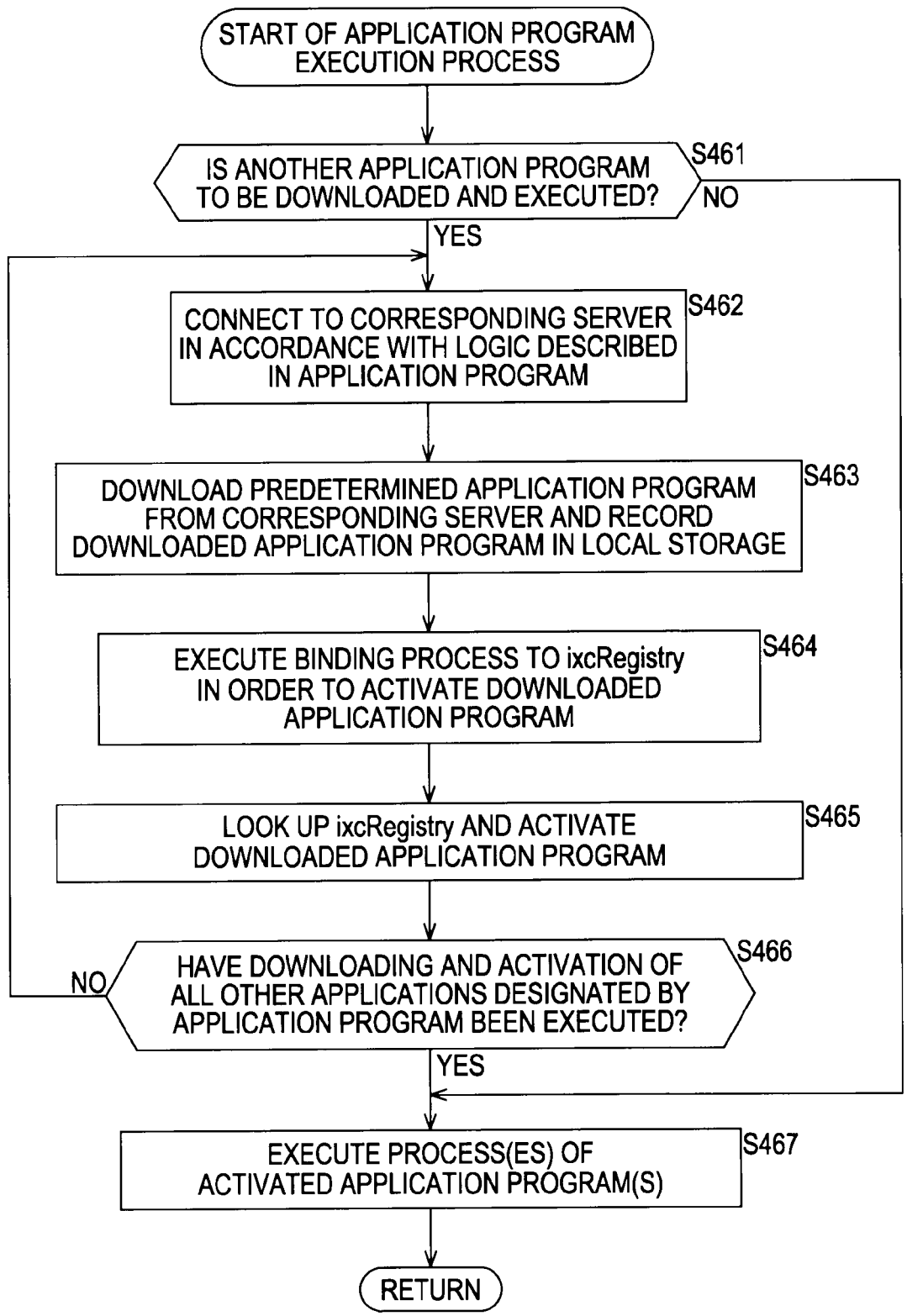
FIG. 35 is a flowchart for describing an application program execution process.

In step S438, an application program execution process described using FIG. 35 is executed, and the process is terminated. That is, the application program execution processing unit 73 executes a process of the application program 47 activated by the boot loader 161.

With such a process, the boot loader 161 and the navigation program 45 can run in cooperation with each other by performing inter-program communication using IXC. Additionally, the boot loader 161 can execute a process in cooperation with the function group 54 or the embedded application 49 which is not essential for a playback process using API or JNI. Then, the l boot loader 161 can download, from a server or the like, an application program 47 that is different from the boot loader 161 and can execute a process in cooperation with the function group 54 or the embedded application 49 which is not essential for a playback process using API or JNI and activate the downloaded application program 47.

Next, with reference to the flowchart in FIG. 35, the application program execution process executed in step S438 in FIG. 34 will be described.

Figure 34:
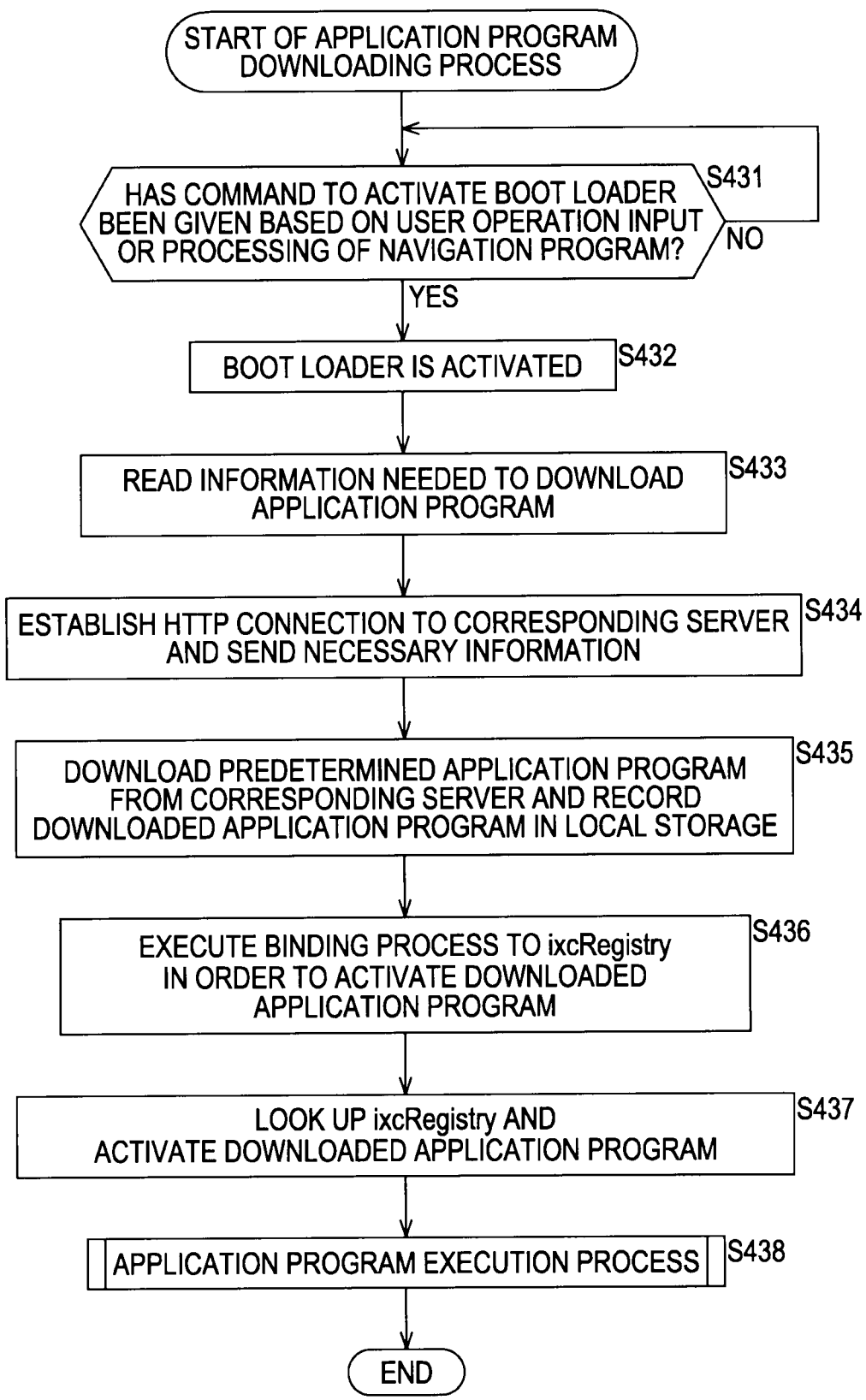
FIG. 34 is a flowchart for describing an application program downloading process.

In step S461, the application program execution processing unit 73 which executes the application program 47 downloaded by the boot loader 161 using the process described using FIG. 34 determines, with execution of this application program 47, whether or not another application program 47 is to be downloaded and executed. Hereinafter, it is assumed that the application program 47 downloaded by the boot loader 161 using the process described using FIG. 34 is called an application program 47-2, and a newly downloaded application program 47 is called an application program 47-3. When it is determined in step S461 that no application program 47-3 is to be downloaded, the process proceeds to step S467 described later.

When it is determined in step S461 that the application program 47-3 is to be downloaded and executed, in step S462, the application program execution processing unit 73 which executes the application program 47-2 performs, according to need, a process in cooperation with the function group 54 or the embedded application 49 which is not essential for a playback process in accordance with logic described in the application program 47-2, thereby connecting to the corresponding server 153.

In step S463, the application program execution processing unit 73 which executes the application program 47-2 executes, according to need, a process in cooperation with the function group 54 or the embedded application 49 which is not essential for a playback process, thereby downloading the predetermined application program 47-3 from the corresponding server 153, supplying the application program 47-3 to the local storage 24, and recording the application program 47-3 in the local storage 24.

In step S464, the application program execution processing unit 73 which executes the application program 47-2 executes a process of binding to ixcRegistry in order to activate the downloaded application program 47-3.

In step S465, the application program execution processing unit 73 which executes the application program 47-2 looks up ixcRegistry and activates the downloaded application program 47-3.

In step S466, the application program execution processing unit 73 which executes the application program 47-2 determines whether or not downloading and activation of all other application programs 47-3 designated by the application program 47-2 have been executed. When it is determined in step S466 that downloading and activation of all other application programs 47-3 have not been executed yet, the process returns to step S462, and the process thereafter is repeated.

When it is determined in step S461 that the application program 47-3 is not to be downloaded or when it is determined in step S466 that downloading and activation of all other application programs 47-3 have been executed, a process(es) of one or a plurality of activated application programs are executed by the application program execution processing unit 73, and the process is terminated.

With such a process, using the downloaded application program 47-2, another application program 47-3 is further downloaded.

Now, as has been descried above, the application program 47 prepares the unique API libraries 51 and 52 different from the API library 46, and accordingly, the application program 47 can access the function group 53 whish is essential for a playback process and can access the function group 54 which is included in the recording/reproducing apparatus 1 and is not essential for a playback process. Further, the application program 47 can access the embedded application 49 which is a local function of the recording/reproducing apparatus 1 using JNI (or IXC according to circumstances). In the recording/reproducing apparatus 1 or the picture recording/recording/reproducing apparatus 101, as the function group 54 which is not essential for a playback process, for example, a function of reading out data recorded on the mounted recording medium and copying the data to another recording medium and a function of converting the format of data to be copied may further be provided. In addition, as the embedded application 49 which is a local function of the recording/reproducing apparatus 1, the embedded application 49 which controls processes of copying data to a recording medium and converting the format for copying may further be provided.

AACS (Advanced Access Content System) exists as a framework relating to copyright protection of video packaged software recorded on a recording medium such as an optical disc. AACS includes protocols regarding the function named Managed Copy which can permit, only when a predetermined authentication process is executed, copying of content on a packaged medium such as an optical disc to another medium such as an HDD of a home media server or another optical disc that is mounted, or stream distribution of such content to another device connected via a network.

In order to use the Managed Copy function, a device corresponding to Managed Copy needs to access an authentication server on the Internet and to be authenticated for a copying process. A device corresponding to Managed Copy reads out a file describing information needed for authentication, which is called a Title Usage File (TUF) and recorded on a packaged medium serving as a copy source, and obtains content_id that identifies content and URL information of an authentication server that performs authentication of the device. The device corresponding to Managed Copy further reads out, from the packaged medium, Serial Number (e.g., disc_id) uniquely assigned to the packaged medium. Then, the device corresponding to Managed Copy is configured to be capable of accessing the authentication server on the basis of the obtained URL information, sending information needed for authentication, such as content_id and disc_id, to the authentication server, and performing an authentication process. Only when an authentication process is correctly executed, copying of content is permitted.

Figure 36:
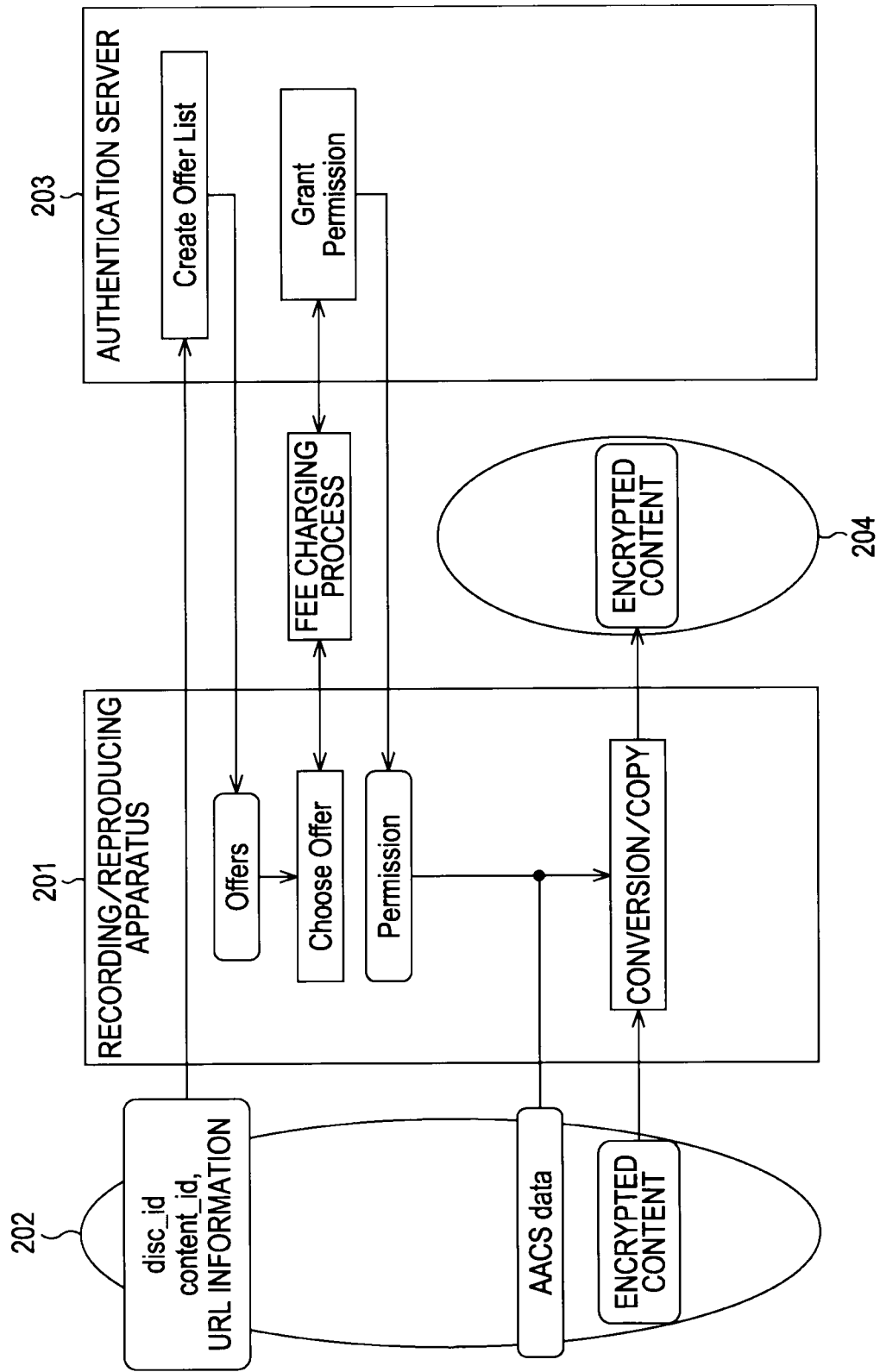
FIG. 36 is a diagram for describing Managed Copy.

Referring to FIG. 36, Managed Copy will be described. Note that, in FIG. 36, a description is given assuming that a conventional recording/reproducing apparatus 201 having a content recording/reproducing function corresponding to the recording/reproducing apparatus 1 is used as the device corresponding to Managed Copy.

On a first optical disc 202 that serves as a content copy source and is mounted in the recording/reproducing apparatus 201, besides the navigation program 45 and items of data which are needed to play content, such as a PlayList and a Clip, which are recorded on the above-described optical disc 11, a Managed Copy Manifest File which is a Title Usage File (TUF) needed for authentication of Managed Copy is recorded. In the Managed Copy Manifest File, disc_id, content_id, URL information needed to access an authentication server 203, and the like are written.

The recording/reproducing apparatus 201 reads out the Managed Copy Manifest File from the first optical disc 202, accesses the authentication server 203 on the basis of the URL information, and sends information such as disc_id and content_id to the authentication server 203.

On the basis of the sent information, the authentication server 203 searches data recorded on the first optical disc 202 mounted in the recording/reproducing apparatus 201 for a list of Managed Copy services that can be provided (Create Offer List), such as content or data of which Managed Copy can be performed, and sends the list to the recording/reproducing apparatus 201.

Among services described in the Create Offer List supplied from the authentication server 203, the recording/reproducing apparatus 201 selects contents for which authentication is to be requested on the basis of, for example, a user operation input, requests the authentication server 203 to perform authentication, and performs a fee charging process relating to the contents for which authentication is requested.

After the authentication process and the fee charging process are executed, the authentication server 203 permits the recording/reproducing apparatus 201 to perform Managed Copy.

The recording/reproducing apparatus 201 which is permitted to perform Managed Copy reads, from the mounted first optical disc 202, information relating to AACS and encrypted content to copy, performs format conversion of the encrypted content using the information relating to AACS, that is, performs decoding of the content, thereafter executes encoding in a predetermined format such as the Window Media Format, and writes the encoded data onto a second optical disc 204.

In this manner, in order to execute Managed Copy in accordance with the framework of AACS, the recording/reproducing apparatus 201 is necessary to include in advance, as an embedded application, an application that controls an authentication process executed by exchanging information with the authentication server 203, a fee charging process for the authentication process, and a series of processes of permitting execution of Managed Copy only when authentication is received.

Further, when, for example, the provider of the first optical disc 202 is different, the recording/reproducing apparatus 201 has a possibility of executing an authentication process with a plurality of authentication servers, rather than performing an authentication process only with one authentication server 203. For example, when transactions (e.g., the method of exchanging information for authentication and the method of a fee charging process) in authentication processes are different in individual authentication servers, it becomes necessary to prepare a plurality of embedded applications that can handle the respective transactions in the recording/reproducing apparatus 201. In addition, when the authentication method or the method of exchanging information between the server and the apparatus which executes Managed Copy is changed, it becomes necessary each time to update the version of the application in the recording/reproducing apparatus 201 which controls execution of Managed Copy.

Therefore, applications that control execution of Managed Copy are prepared as JAVA (registered trademark) Xlets in the individual authentication servers 203. The recording/reproducing apparatus 1 and the picture recording/recording/reproducing apparatus 101 include in advance boot loaders for downloading and activating the applications which control execution of Managed Copy. From the authentication server 203 which permits Managed Copy of content stored on the mounted first optical disc 202, the recording/reproducing apparatus 1 and the picture recording/recording/reproducing apparatus 101 download the application which controls execution of Managed Copy.

The downloaded application which controls execution of Managed Copy can perform, as the application program 47, inter-application communication using IXC with another JAVA (registered trademark) Xlet. Also, by preparing the unique API libraries 51 and 52 different from the API library 46, the downloaded application can access the function group 53 which is essential for a playback process and the function group 54 which is included in the recording/reproducing apparatus 1 and the picture recording/recording/reproducing apparatus 101 and is not essential for a playback process. Further, the downloaded application can access the embedded application 49 which is a local function of the recording/reproducing apparatus 1 using JNI.

Figure 37:
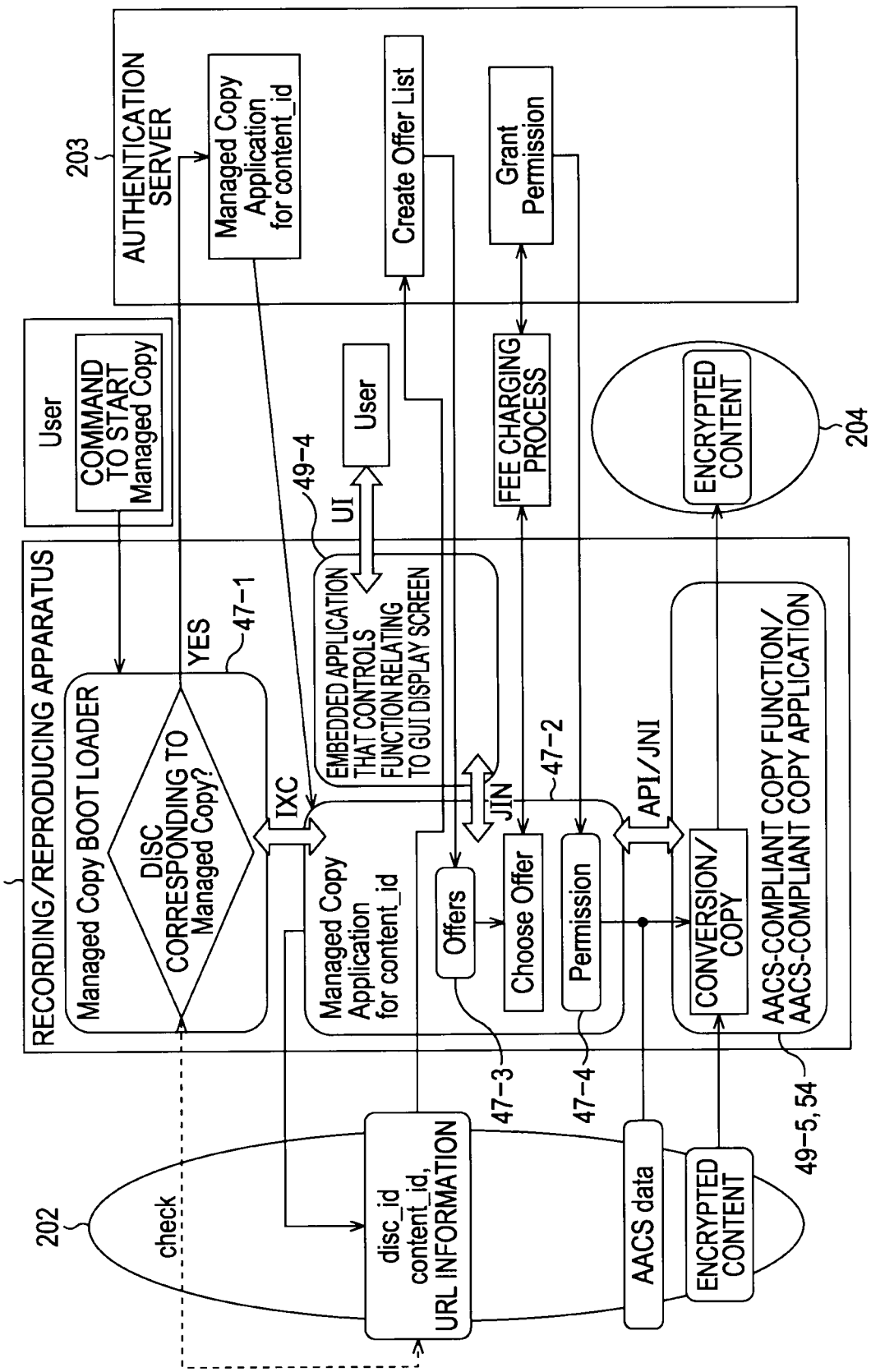
FIG. 37 is a diagram for describing Managed Copy realized by downloading application programs.

Referring to FIG. 37, Managed Copy in the case where a JAVA (registered trademark) Xlet that controls, as the application program 47, execution of Managed Copy is downloaded from the authentication server 203 will be described. Note that, in FIG. 37, a description is given using the case in which the recording/reproducing apparatus 1 serves as a device corresponding to Managed Copy by way of example. Needless to say, similar processing is executable even in the case of the picture recording/recording/reproducing apparatus 101.

The recording/reproducing apparatus 1 receives a command to start Managed Copy from the user and activates a Managed Copy boot loader 47-1 which is the application program 47 which executes a process of downloading and activating a JAVA (registered trademark) Xlet that controls execution of Managed Copy. It is determined whether or not the mounted first optical disc 202 is a disc corresponding to Managed Copy. When the first optical disc 202 is a disc corresponding to Managed Copy, the Managed Copy boot loader 47-1 performs inter-application communication using IXC with the navigation program 45 of the first optical disc 202 and executes a process in cooperation with the navigation program 45, thereby reading out a Managed Copy Manifest File which is a Title Usage File (TUF) needed for authentication of Managed Copy and which is recorded on the first optical disc 202, and obtaining disc_id, content_id, URL Information needed to access the authentication server 203, and the like.

The recording/reproducing apparatus 1 accesses the authentication server 203 on the basis of the URL information read out from the first optical disc 202, sends information such as disc_id and content_id to the authentication server 203, and requests download of a Managed Copy Application for content_id 47-2 which is a JAVA (registered trademark) Xlet that controls execution of Managed Copy corresponding to the first optical disc 202 mounted in the recording/reproducing apparatus 1.

On the basis of the sent information, the authentication server 203 sends the Managed Copy Application for content_id 47-2 corresponding to the first optical disc 202 mounted in the recording/reproducing apparatus 1 to the recording/reproducing apparatus 1.

The recording/reproducing apparatus 1 stores the downloaded Managed Copy Application for content_id 47-2 in the local storage 24, and additionally executes binding to and looking up IxcRegistry, thereby activating the Managed Copy Application for content_id 47-2.

The downloaded Managed Copy Application for content_id 47-2 may include all steps that control execution of Managed Copy, or some objects thereof may be configured as different JAVA (registered trademark) Xlets. For example, in the Managed Copy Application for content_id 47-2, objects such as a portion (offers 47-3) that executes a process of presenting to the user the list of Managed Copy services that can be provided, which has been sent from the authentication server 203, and, upon selection of a service desired by the user, requesting the authentication server 203 to perform authentication and a fee charging process, and a portion (Permission 47-4) that receives a Managed Copy permission from the authentication server 203, and, on the basis of this, controls a process of copying corresponding data from the first optical disc 202 to the second optical disc 204 can be configured as independent Xlets.

When some objects that control execution of Managed Copy are configured as different JAVA (registered trademark) Xlets, the Managed Copy Application for content_id 47-2 is adapted to further download necessary objects (e.g., objects such as Offers 47-3 and Permission 47-4) from the authentication server 203 or a different server and activate the necessary objects.

The Managed Copy Application for content_id 47-2 (or Offers 47-3 included in this) performs inter-application communication using IXC with the navigation program 45 of the first optical disc 202 and executes a process in cooperation with the navigation program 45, thereby reading out a Managed Copy Manifest File which is a Title Usage File (TUF) needed for authentication of Managed Copy, which is recorded on the first optical disc 202, and obtaining disc_id, content_id, URL information needed to access the authentication server 203, and the like.

The Managed Copy Application for content_id 47-2 (or Offers 47-3 included in this) accesses the authentication server 203 on the basis of the URL information read out from the first optical disc 202 and sends information such as disc_id and content_id to the authentication server 203.

On the basis of the sent information, the authentication server 203 searches data recorded on the first optical disc 1 mounted in the recording/reproducing apparatus 201 for a list of Managed Copy services that can be provided (Create Offer List), such as content or data of which Managed Copy can be performed, and sends the list to the recording/reproducing apparatus 1 which executes the Managed Copy Application for content_id 47-2 (or Offers 47-3 included in this).

In the recording/reproducing apparatus 1, among services described in the Create Offer List supplied from the authentication server 203, the Managed Copy Application for content_id 47-2 (or Offers 47-3 included in this) selects contents for which authentication is to be requested on the basis of, for example, a user operation input, requests the authentication server 203 to perform authentication, and performs a fee charging process relating to the contents for which authentication is requested.

After the authentication process and the fee charging process are executed, the authentication server 203 permits the recording/reproducing apparatus 1 to perform Managed Copy.

In the recording/reproducing apparatus 1 which is permitted to perform Managed Copy, the Managed Copy Application for content_id 47-2 (or Permission 47-4 included in this) reads, from the mounted first optical disc 202, information relating to AACS and encrypted content to copy, performs format conversion of the encrypted content using the information relating to AACS, that is, performs decoding of the content, thereafter executes encoding in a predetermined format such as the Window Media Format, and writes the encoded data onto the second optical disc 204.

Note that, on this occasion, when update data such as content to be copied from the mounted first optical disc 202 to the second optical disc 204 is recorded in the local storage 24, and the virtual file system is configured as described above so that the updated content can be played, the Managed Copy Application for content_id 47-2 (or Permission 47-4 included in this) performs inter-application communication using IXC with the navigation program 45, requests an updating process of the virtual file system, obtains information needed to play the updated content, and write the corresponding content and information relating to this onto the second optical disc 204 so that the updated content can be played.

When executing the above-described process, the Managed Copy Application for content_id 47-2 (or Offers 47-3 and Permission 47-4 included in this) exchanges information using IXC-based program communication with the navigation program 45, reads necessary information recorded on the first optical disc 202, performs, according to need, an operation in cooperation with the embedded application 49 using JNI, and controls the function group 54 which is not essential for a playback process using the API 52.

Accordingly, development of applications for execution of Managed Copy can be facilitated (functions included in the navigation program 45 and the embedded application 49 can be used), and additionally, the updating of versions thereof can be easily handled.

Figure 38:
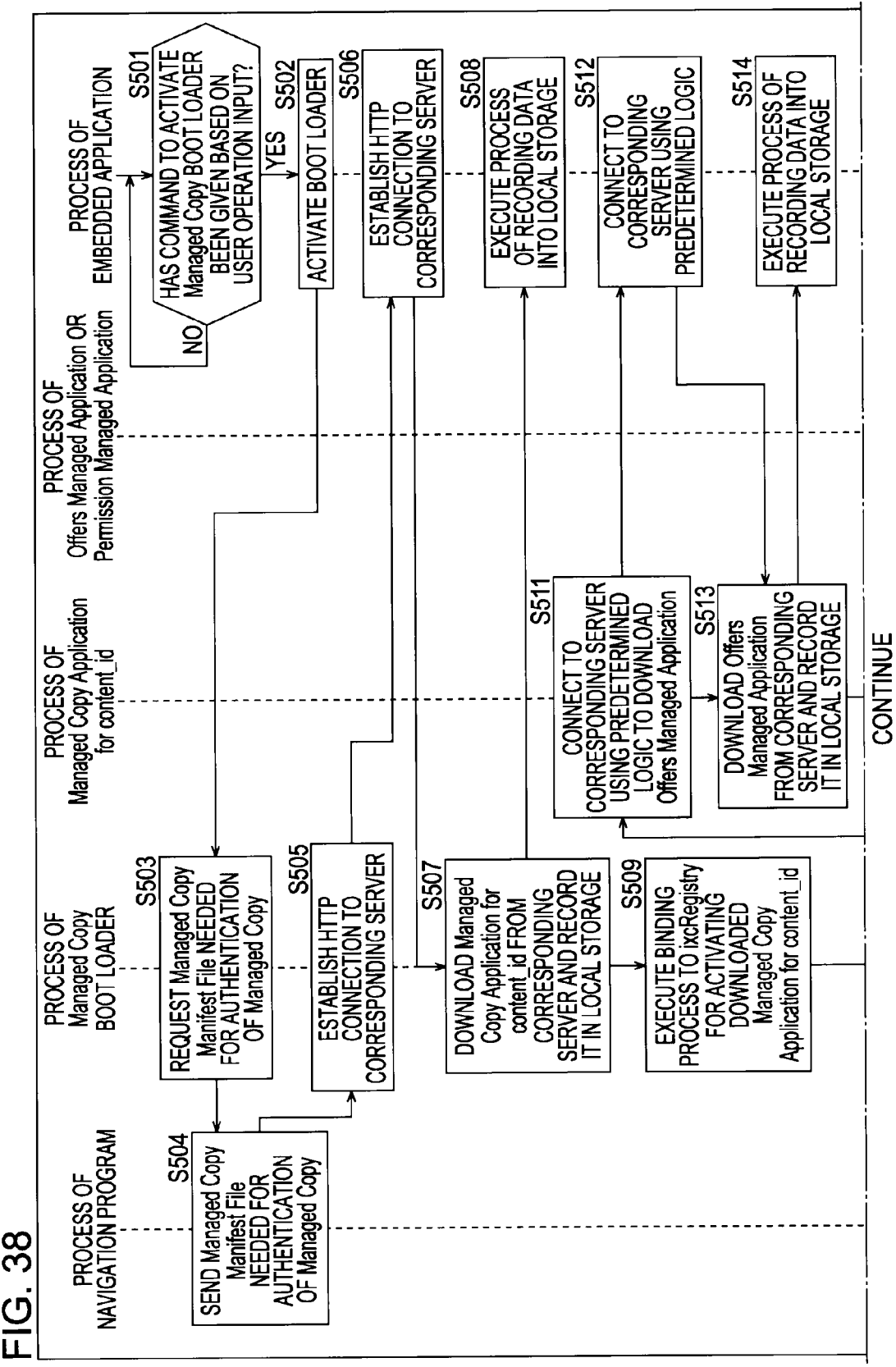
FIG. 38 is a flowchart for describing a process for executing Managed Copy.
Figure 39:
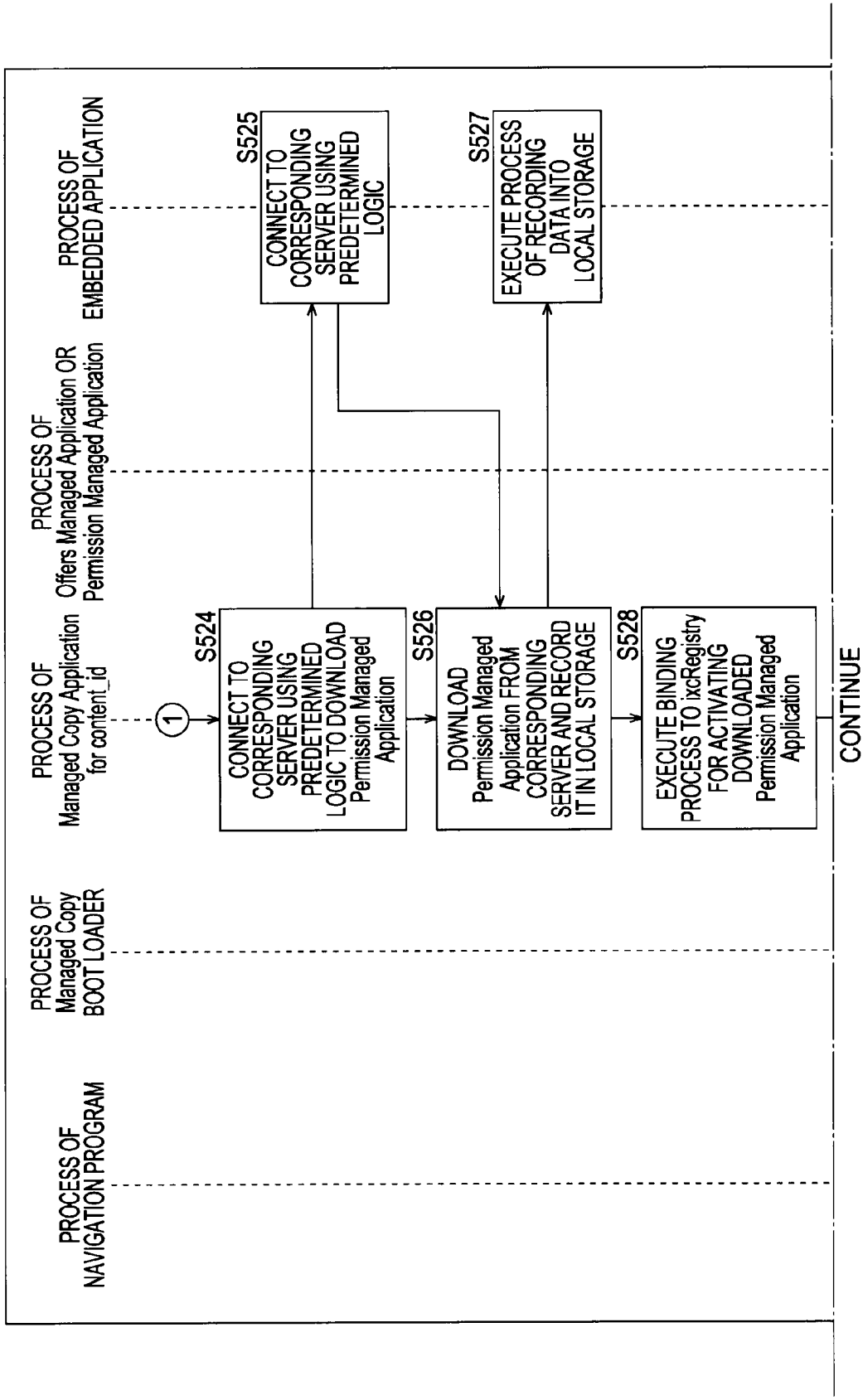
FIG. 39 is a flowchart for describing a process for executing Managed Copy.

Next, referring to the flowcharts in FIG. 38 and FIG. 39, a process for executing Managed Copy described using FIG. 37 will be described.

In step S501, the embedded application 49 which monitors a user operation input determines, on the basis of a user operation input supplied from the operation input unit 29, whether or not a command to activate the Managed Copy boot loader 47-1 has been given. When it is determined in step S501 that no command to activate the Managed Copy boot loader 47-1 has been given, the processing in step S501 is repeated until it is determined that a command to activate the Managed Copy boot loader 47-1 has been given.

When it is determined in step S501 that a command to start the Managed Copy boot loader 47-1 has been given, in step S502, the embedded application 49 activates the Managed Copy boot loader 47-1.

Note that it has been described here that the embedded application 49 monitors a user operation input and activates the Managed Copy boot loader 47-1. Alternatively, for example, the navigation program 45 may have a function of monitoring whether or not an operation input to activate the Managed Copy boot loader 47-1 is received during execution of the navigation program 45. When an operation input to activate the Managed Copy boot loader 47-1 is received, the navigation program 45 may be adapted to be capable of executing, as an interruption process, a process of activating the Managed Copy boot loader 47-1.

In step S503, the Managed Copy boot loader 47-1 uses IXC to request the navigation program 45 for a Managed Copy Manifest File needed for authentication of Managed Copy.

In step S504, the navigation program 45 sends a Managed Copy Manifest File needed for authentication of Managed Copy to the Managed Copy boot loader 47-1.

In step S505, the Managed Copy boot loader 47-1 executes a process for establishing an HTTP connection to a corresponding server (e.g., the authentication server 203 in FIG. 37) for downloading the application program 47 needed to execute Managed Copy.

Specifically, in order to establish an HTTP connection to a corresponding server (e.g., the authentication server 203 in FIG. 37), the Managed Copy boot loader 47-1 activates the embedded application 49-1 which controls the web browsing function (may be an Xlet or software that can perform inter-application communication using JNI other than JAVA (registered trademark)) to perform inter-application communication and controls a process thereof.

In step S506, the embedded application 49-1 which controls the web browsing function is HTTP-connected to the corresponding server.

In step S507, the Managed Copy boot loader 47-1 downloads the Managed Copy Application for content_id 47-2 from the corresponding server and records the Managed Copy Application for content_id 47-2 in the local storage 24.

Specifically, the Managed Copy boot loader 47-1 uses the function of the embedded application 49-1 which controls the web browsing function to download the Managed Copy Application for content_id 47-2 from the corresponding server and, additionally, uses the function of the embedded application 49 which controls recording of data into the local storage 24 to record the downloaded Managed Copy Application for content_id 47-2 into the local storage 24.

In step S508, the embedded application 49-1 which controls the web browsing function executes a process of recording the downloaded data, that is, the Managed Copy Application for content_id 47-2, into the local storage 24.

In step S509, the Managed Copy boot loader 47-1 executes a binding process to ixcRegistry in order to activate the downloaded Managed Copy Application for content_id 47-2.

In step S510, the Managed Copy boot loader 47-1 looks up ixcRegistry and activates the downloaded Managed Copy Application for content_id 47-2.

In step S511, the Managed Copy Application for content_id 47-2 connects to a corresponding server (e.g., the authentication server 203 in FIG. 37) using predetermined logic described in the Managed Copy Application for content_id 47-2 in order to download the Offers Managed Application 47-3.

Specifically, in order to establish a connection to a corresponding server (e.g., the authentication server 203 in FIG.

37), the Managed Copy Application for content_id 47-2 activates the embedded application 49-1 which controls the web browsing function (may be an Xlet or software that can perform inter-application communication using JNI other than JAVA (registered trademark)) to perform inter-application communication and controls a process thereof.

In step S512, the embedded application 49-1 which controls the web browsing function is connected to the corresponding server using the predetermined logic.

In step S513, the Managed Copy Application for content_id 47-2 downloads the Offers Managed Application 47-3 from the corresponding server and records the Offers Managed Application 47-3 in the local storage 24.

Specifically, the Managed Copy Application for content_id 47-2 uses the function of the embedded application 49-1 which controls the web browsing function (so-called web browser) to download the Offers Managed Application 47-3 from the corresponding server and, additionally, uses the function of the embedded application 49 which controls recording of data into the local storage 24 to record the downloaded Offers Managed Application 47-3 into the local storage 24.

In step S514, the embedded application 49 which controls recording of data into the local storage 24 executes a process of recording the downloaded data, that is, the Offers Managed Application 47-3, into the local storage 24.

In step S515, the Managed Copy Application for content_id 47-2 executes a binding process to ixcRegistry in order to activate the downloaded Offers Managed Application 47-3.

In step S516, the Managed Copy Application for content_id 47-2 looks up ixcregistry and activates the downloaded Offers Managed Application 47-3.

Note that the Managed Copy Application for content_id 47-2 executes, after the end of the processing in step S516, the processing in step S524 described later.

In step S517, the Offers Managed Application 47-3 uses IXC to request the navigation program 45 for a Managed Copy Manifest File needed for authentication of Managed Copy.

In step S518, the navigation program 45 sends a Managed Copy Manifest File needed for authentication of Managed Copy to the Offers Managed Application 47-3.

In step S519, the Offers Managed Application 47-3 connects to a predetermined server (e.g., the authentication server 203 in FIG. 37) using predetermined logic in order to perform an authentication process for Managed Copy and downloads a list of functions provided as executable (Offers).

Specifically, the Offers Managed Application 47-3 activates, in order to connect to a corresponding server (e.g., the authentication server 203 in FIG. 37), the embedded application 49-1 which controls the web browsing function (may be an Xlet or software that can perform inter-application communication using JNI other than JAVA (registered trademark)) (or, when the embedded application 49-1 is already in an activated state, with the embedded application 49-1 which controls the web browsing function) to perform inter-application communication, controls a process thereof, and downloads a list of functions provided as executable (Offers).

In step S520, the embedded application 49-1 which controls the web browsing function is connected to the corresponding server using the predetermined logic.

In step S521, the Offers Managed Application 47-3 executes control so that the list of functions provided as executable (e.g., among data such as content recorded on the corresponding first optical disc 202, a list of data of which Managed Copy can be performed) can be displayed as a list.

Specifically, the Offers Managed Application 47-3 activates the embedded application 49-4 which controls a function relating to a GUI display screen (may be an Xlet or software that can perform inter-application communication using JNI other than JAVA (registered trademark)) to perform inter-application communication, and controls a process thereof.

In step S522, the embedded application 49-4 which controls the function relating to the GUI display screen displays on an external display device a list corresponding to the list of functions provided as executable (e.g., among data such as content recorded on the corresponding first optical disc 202, a list of data of which Managed Copy can be performed).

In step S523, the Offers Managed Application 47-3 uses, according to need, the function of the embedded application 49-1 which controls the web browsing function to access a predetermined fee charging server or the like and to exchange necessary information with the predetermined fee charging server, thereby executing a fee charging process for the selected Offer.

In step S524, the Managed Copy Application for content_id 47-2 connects to a corresponding server using predetermined logic in order to download the Permission Managed Application 47-4.

Specifically, the Managed Copy Application for content_id 47-2 activates, in order to connect to a corresponding server (e.g., the authentication server 203 in FIG. 37), the embedded application 49-1 which controls the web browsing function (may be an Xlet or software that can perform inter-application communication using JNI other than JAVA (registered trademark)) (or, when the embedded application 49-1 is already in an activated state, with the embedded application 49-1 which controls the web browsing function) to perform inter-application communication, and controls a process thereof.

In step S525, the embedded application 49-1 which controls the web browsing function is connected to the corresponding server (e.g., the authentication server 203 in FIG. 37) using the predetermined logic.

In step S526, the Managed Copy Application for content_id 47-2 downloads the Permission Managed Application 47-4 from the corresponding server and records the Permission Managed Application 47-4 in the local storage 24.

Specifically, the Managed Copy Application for content_id 47-2 uses the function of the embedded application 49-1 which controls the web browsing function to download the Permission Managed Application 47-4 from the corresponding server and, additionally, uses the function of the embedded application 49 which controls recording of data into the local storage 24 to record the downloaded Permission Managed Application 47-4 into the local storage 24.

In step S527, the embedded application 49-1 which controls the web browsing function executes a process of recording the downloaded data, that is, the Permission Managed Application 47-4, into the local storage 24.

In step S528, the Managed Copy Application for content_id 47-2 executes a binding process to ixcRegistry in order to activate the downloaded Permission Managed Application 47-4.

In step S529, the Managed Copy Application for content_id 47-2 looks up ixcRegistry and activates the downloaded Permission Managed Application 47-4.

In step S530, the Permission Managed Application 47-4 connects to a predetermined server (e.g., the authentication server 203 in FIG. 37) using predetermined logic described in the Permission Managed Application 47-4 and receives a notification that the authentication was correctly performed.

Specifically, the Permission Managed Application 47-4 activates, in order to connect to a corresponding server (e.g., the authentication server 203 in FIG. 37), the embedded application 49-1 which controls the web browsing function (may be an Xlet or software that can perform inter-application communication using JNI other than JAVA (registered trademark)) (or, when the embedded application 49-1 is already in an activated state, with the embedded application 49-1 which controls the web browsing function) to perform inter-application communication, and controls a process thereof.

In step S531, the embedded application 49-1 which controls the web browsing function is connected to the corresponding server using the predetermined logic.

In step S532, the Permission Managed Application 47-4 controls reading of content to copy from the first optical disc 202 and format conversion.

Specifically, the Permission Managed Application 47-4 notifies, using IXC, the navigation program 45 which is recorded on the mounted first optical disc 202 or recorded in the local storage 24 in association with the first optical disc 202 of, among items of data such as content recorded on the first optical disc 202, data of which Managed Copy is permitted and which is to be Managed Copied to the second optical disc 204. Also, the Permission Managed Application 47-4 activates the embedded application 49 which reads out data from the mounted recording medium such as an optical disc and the embedded application 49 which controls a format conversion process performed by the transcoder 26 (may be Xlets or software that can perform inter-application communication using JNI other than JAVA (registered trademark)), and controls processes thereof.

In step S533, the navigation program 45 calls the API defined for updating the virtual file system of content to be copied (e.g., update( )) and executes the binding process described using FIG. 21, thereby constructing the virtual file system of content to be copied and notifying the Permission Managed Application 47-4 of information of the virtual file system using IXC.

In step S534, the navigation program 45 uses a Manifest file to notify, using IXC, the Permission Managed Application 47-4 of information needed to control reading of data that should be included in the content to be copied.

In step S535, the embedded application 49 which reads out data from the mounted recording medium such as an optical disc exchanges information needed for reading out data with the Permission Managed Application 47-4, thereby controlling the optical disc drive 22 to read out predetermined content to be copied from the mounted first optical disc 202 and, when needed, controlling the drive of the local storage 24 to read out data needed to play the predetermined content to be copied.

In step S536, the embedded application 49 which controls the format conversion process performed by the transcoder 26 exchanges information with the Permission Managed Application 47-4 and controls the transcoder 26 to convert the format of the read content into the format for copying to the second optical disc 204.

In step S537, the Permission Managed Application 47-4 controls writing of the format-converted content to the second optical disc 204.

Specifically, the Permission Managed Application 47-4 activates the embedded application 49 which records data to the mounted recording medium such as an optical disc (may be an Xlet or software that can perform inter-application communication using JNI other than JAVA (registered trademark)), and controls processes thereof.

In step S537, the embedded application 49 which records data to the mounted recording medium such as an optical disc exchanges information with the Permission Managed Application 47-4 and controls the optical disc drive 22, thereby executing a process of writing the read content to the second optical disc 204.

By applying such a structure in the case where Managed Copy is executed in accordance with the framework of AACS, the recording/reproducing apparatus 1 (or picture recording/recording/reproducing apparatus 101) can execute Managed Copy without including in advance applications that control execution of Managed Copy.

In addition, since application programs that control execution of Managed Copy (Managed Copy Application for content_id 47-2, Offers Managed Application 47-3, and Permission Managed Application 47-4) can execute processes in cooperation with the navigation program 45 and the embedded application 49 at the time of executing Managed Copy, development of applications for executing Managed Copy is facilitated (functions included in the navigation program 45 and the embedded application 49 can be used), and additionally the updating of versions thereof can be easily handled.

With the above-described processes, for example, as in JAVA (registered trademark) or the like, the application program 47 which can run on a multi-platform due to the mounting of a virtual machine and is installed uniquely in the apparatus and the navigation program 45 which is associated with a recording medium such as an optical disc mounted in the apparatus can be adapted to run in cooperation with each other using inter-application communication such as IXC. The manufacturer of an apparatus that has a function of playing a recording medium such as an optical disc can differentiate the apparatus by installing or making it possible to install, in the apparatus, an application program that can run in cooperation with a navigation program associated with the recording medium such as the optical disc.

In addition, since the application program 47 may be downloaded from a predetermined server and installed, for example, by making it possible to access a server or the like at a downloading destination on the basis of information (e.g., URL information) recorded on the mounted optical disc (e.g., the first optical disc 202), the application program 47 to be downloaded and installed may be determined in accordance with information recorded on the optical disc (e.g., disc_id and content_id). Accordingly, the recording/reproducing apparatus 1 (or picture recording/recording/reproducing apparatus 101) is configured to, by downloading the application program 47 corresponding to the mounted first optical disc 202, execute a process in cooperation with the navigation program corresponding to the mounted first optical disc 202 and a native function prepared in advance in the recording/reproducing apparatus 1 or the embedded application 49 embedded in the recording/reproducing apparatus 1.

Also, for example, by applying such a structure in the case where Managed Copy is executed in accordance with the framework of AACS, the recording/reproducing apparatus 1 (or picture recording/recording/reproducing apparatus 101) need not include in advance applications that control execution of Managed Copy any more.

Accordingly, even when the updating of the versions of applications that control execution of Managed Copy becomes necessary, it is not necessary each time to update the versions to the newest versions in the recording/reproducing apparatus 1. Also, for example, when transactions (e.g., the method of exchanging information for authentication and the method of a fee charging process) in authentication processes are different in a plurality of authentication servers, it is no more necessary to prepare a plurality of embedded applications that can handle the respective transactions in the recording/reproducing apparatus 201.

That is, the provider of the recording/reproducing apparatus 1 (or picture recording/recording/reproducing apparatus 101) need not be conscious of protocols and the like regarding Managed Copy for each content author. Similarly, the content author need not be conscious of distinctions among individual apparatuses having the Managed Copy function, such as the recording/reproducing apparatus 1, regarding the technique of Managed Copy of content and the like, a fee charging process, and the like provided by itself. Therefore, the degree of freedom of services provided to the user is increased for the provider of the recording/reproducing apparatus 1 (or picture recording/recording/reproducing apparatus 101) and for the content author.

Figure 40:
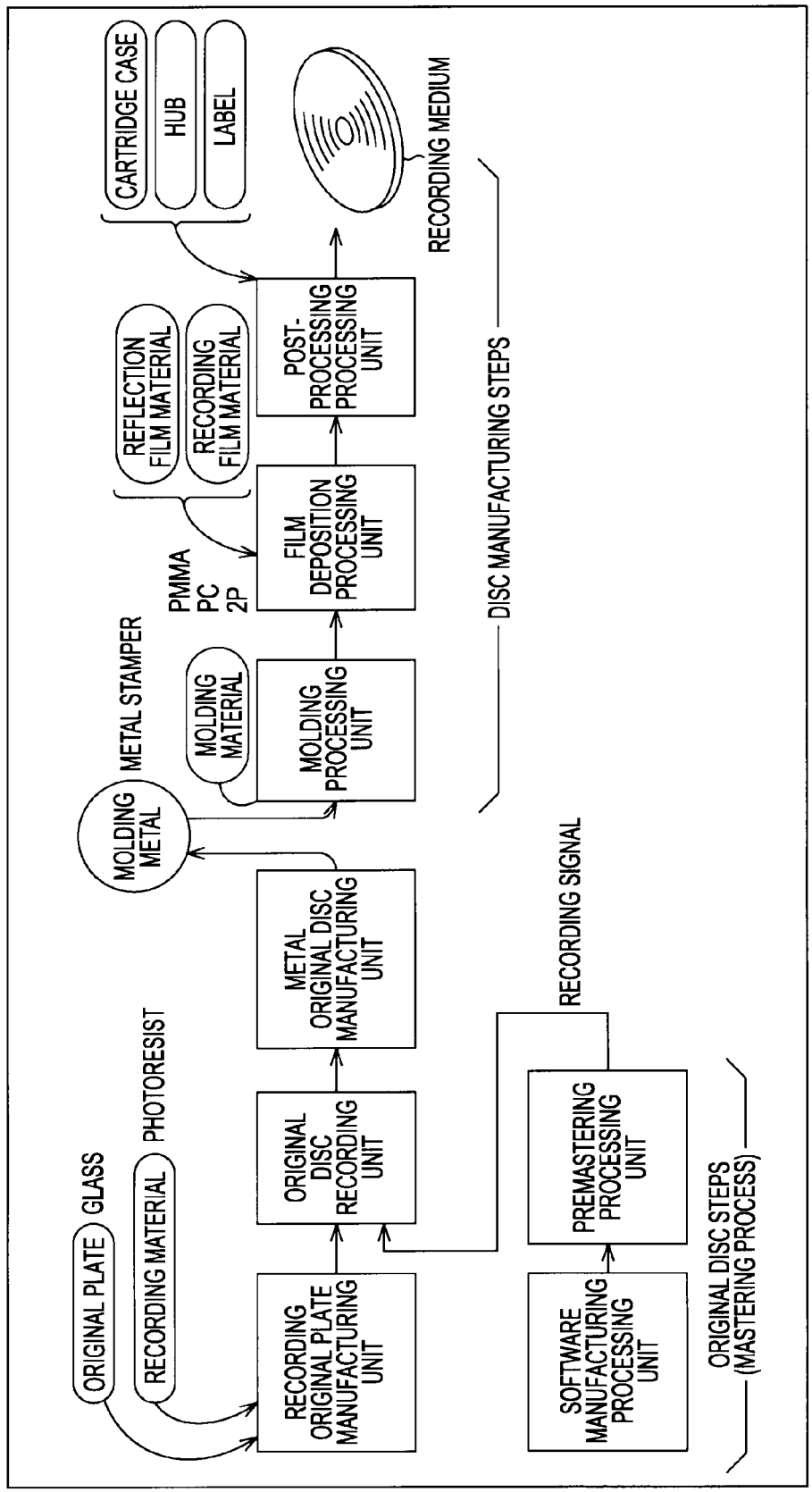
FIG. 40 is a diagram for describing the manufacture of a recording medium having recorded thereon data that can be reproduced by the reproducing apparatus.
Figure 41:
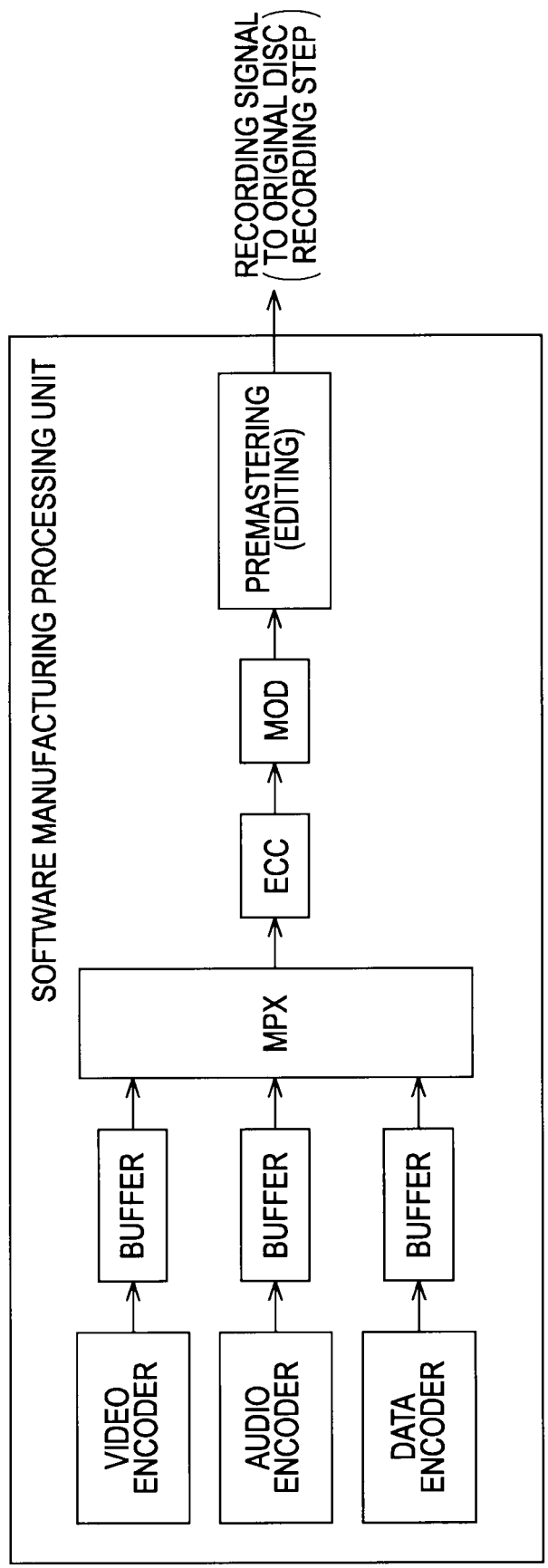
FIG. 41 is a diagram for describing the manufacture of a recording medium having recorded thereon data that can be reproduced by the reproducing apparatus.

Next, referring to FIG. 40 and FIG. 41, a method of manufacturing an optical disc having recorded thereon data that can be reproduced by the recording/reproducing apparatus 1 or the picture recording/recording/reproducing apparatus 101, that is, data with the data structure described using FIG. 15, which is data including a command querying a MovieObject as to whether or not the application program 47 executed in cooperation with the navigation program 45 is installed in the recording/reproducing apparatus 1, a command activating the application program 47 when the application program 47 executed in cooperation with the navigation program 45 is installed in the recording/reproducing apparatus 1, and various commands needed to execute a process in cooperation with the application program 47, will be described. Here, the recording medium is shown as an optical disc by way of example. The recording medium in the drawing corresponds to the optical disc 11 or the removable medium 28 in FIG. 1. Note that, when the removable medium 28 is other than a disc-shaped recording medium, with a known recording medium manufacturing method, data that can be reproduced by the recording/reproducing apparatus 1 or the picture recording/recording/reproducing apparatus 101 is similarly recorded on the recording medium.

That is, as shown in FIG. 40, an original disc made of, for example, glass or the like is prepared, and a recording material made of, for example, photoresist or the like is applied onto the original disc. Accordingly, a recording original disc is manufactured.

Then, as shown in FIG. 41, in a software manufacturing processing unit, video data in a format that can be reproduced by the recording/reproducing apparatus 1 or the picture recording/recording/reproducing apparatus 101, which has been encoded by an encoding apparatus (video encoder), is temporarily stored in a buffer; audio data encoded by an audio encoder is temporarily stored in a buffer; and further, data other than streams (e.g., Indexes, Playlist, and PlayItem), which is encoded by a data encoder, is temporarily stored in a buffer. The video data, the audio data, and the data other than streams stored in the respective buffers are multiplexed with a synchronization signal using a multiplexer (MPX), and an error-correcting code is added to the data using an error-correcting code circuit (ECC). Then, predetermined modulation is applied to the data using a modulation circuit (MOD), and the modulated data is recorded once in accordance with a predetermined format on, for example, a magnetic tape or the like, thereby manufacturing software to be recorded on the optical disc 11 or the removable medium 28 which can be played by the recording/reproducing apparatus 1 or the picture recording/recording/reproducing apparatus 101.

This software is edited (premastered) according to need, thereby generating a signal in a format to be recorded on an optical disc. Then, a laser beam is modulated in accordance with this recording signal, and this laser beam is emitted onto the photoresist on the original disc. Accordingly, the photoresist on the original disc is exposed to light in accordance with the recording signal.

Thereafter, this original disc is developed, whereby pits appear on the original disc. Processing, such as electroforming, is applied to the original disc prepared in this manner, thereby manufacturing a metal original disc onto which the pits on the glass original disc are transferred. From this metal original disc, a metal stamper is further manufactured, which serves as a molding die.

A material such as PMMA (acrylic) or PC (polycarbonate) is injected into this molding die using, for example, injection or the like, and is fixed. Alternatively, after 2P (ultra violet (UV) curable resin) or the like is applied onto the metal stamper, the UV curable resin is irradiated with UV rays and cured. Accordingly, the pits on the metal stamper can be transferred onto a replica made of resin.

A reflection film is formed on the replica, which is generated in this manner, using vapor deposition, sputtering, or the like. Alternatively, a reflection film is formed on the generated replica using spin coating.

Thereafter, inside and outside diameter processing is applied to this disc, and a necessary action such as pasting two discs together is taken. Further, a label is affixed and a hub is attached to the disc, and the disc is inserted into a cartridge. In this manner, the optical disc 11 or the removable medium 28 having recorded thereon data that can be reproduced by the recording/reproducing apparatus 1 or the recording medium 10 is completed.

In addition, the above-described series of processes can also be executed by software. Regarding the software, a program configuring the software is installed from a program storage medium into a computer embedded in dedicated hardware, a general personal computer, for example, which can execute various functions using various programs being installed therein, or the like.

This program storage medium is configured with, for example, as shown in FIG. 1 or FIG. 29, not only the removable medium 28 which has stored thereon the program and is distributed, separately from a computer, to distribute the program to a user, such as a magnetic disk (including a flexible disk), an optical disc (including CD-ROM (Compact Disk-Read Only Memory) and DVD (Digital Versatile Disk)), a magneto-optical disk (including MD (Mini-Disk) (registered trademark)) or a semiconductor memory, but also the memory 23 such as a ROM or a RAM, the local storage 24 such as a hard disk, and the like, which are distributed to the user in a state where they are embedded in advance in the main body of the apparatus and which store the program.

Also, the steps describing the program recorded on the program storage medium in the present specification may of course include processes performed time sequentially in accordance with the described order, but also include processes executed not necessarily time sequentially but in parallel or individually.

Note that the system in the present specification represents the entirety of an apparatus constituted of a plurality of apparatuses.

Note that the embodiments of the present invention are not limited to the above-described embodiments, and various changes can be made without departing from the gist of the present invention.

The invention claimed is:

1. An information processing apparatus that reproduces data recorded on a mounted first recording medium, comprising:
one or a plurality of storage means for storing information; and
execution means for executing a first application that is an essential application for reproducing data recorded on the first recording medium, the first application being an application stored on the mounted first recording medium or any of the storage means in association with the mounted recording medium and realizing a first function of processing the data recorded on the first recording medium, and a second application that is stored in any of the storage means and realizes a second function different from the first function,
wherein the execution means executes the first application and the second application in cooperation with each other by mutually exchanging information using inter-first-application communication, and executes a third application independently of the first application.

2. The information processing apparatus according to claim 1,
wherein the second application is associated with at least one predetermined first recording medium, and
wherein the execution means detects, when executing the first application, the second application associated with the first recording medium having recorded thereon the first application or being associated with the first application and activates the detected second application.

3. The information processing apparatus according to claim 2,
wherein the second application is associated with identification information for identifying the at least one predetermined first recording medium.

4. The information processing apparatus according to claim 1,
wherein the execution means treats, when the first recording medium is mounted, a region that is included in a storage region of the storage means and stores information associated with the mounted first recording medium and a recording region of the mounted first recording medium as one data storage region, and activates the first application stored in any portion of the data storage region.

5. The information processing apparatus according to claim 4,
wherein the second application is associated with the at least one predetermined first recording medium, and
wherein the execution means detects, using the first application activated by mounting the first recording medium, the second application associated with the first recording medium and activates the detected second application.

6. The information processing apparatus according to claim 5,
wherein the second application is associated with identification information for identifying the at least one predetermined first recording medium.

7. The information processing apparatus according to claim 1,
wherein a storage region including a first region storing information associated with the at least one first recording medium and a second region storing the second application, the second region being different from the first region, is set in any of the plurality of storage means.

8. The information processing apparatus according to claim 7,
wherein the execution means treats, by executing the first application, the first region storing the information associated with the mounted first recording medium and a recording region of the mounted first recording medium as one data storage region.

9. The information processing apparatus according to claim 1, further comprising:
obtaining means for obtaining program content data,
wherein the storage means stores the second application included in the program content data obtained by the obtaining means.

10. The information processing apparatus according to claim 1,
wherein the execution means includes a virtual machine environment, executes the first application and the second application on the virtual machine, and further executes the third application not on the virtual machine, and
wherein the second application exchanges information with the third application using inter-second-application communication.

11. The information processing apparatus according to claim 10,
wherein the third application is an application that can be executed independently of the first application.

12. The information processing apparatus according to claim 10,
wherein the execution means executes the first application and the second application on a JAVA (registered trademark) Virtual Machine which is the virtual machine.

13. The information processing apparatus according to claim 12,
wherein the first application and the second application are executed in cooperation with each other by mutually exchanging information using Inter-Xlet communication as the inter-first-application communication.

14. The information processing apparatus according to claim 12,
wherein the second application exchanges information with the third application using JAVA (registered trademark) Native Interface.

15. The information processing apparatus according to claim 1,
wherein the second application is only executable with the first application.

16. The information processing apparatus according to claim 15,
wherein the second application exchanges information with the third application using inter-second-application communication.

17. The information processing apparatus according to claim 1,
wherein the execution means can execute a plurality of the second applications, and, by executing the predetermined second application, controls obtaining of the different second application based on information recorded on the mounted first recording medium.

18. The information processing apparatus according to claim 17,
wherein the execution means controls, by executing the predetermined second application, obtaining of the different second application from another apparatus via a network, and wherein the information recorded on the mounted first recording medium includes address information of the other apparatus in the network.

19. The information processing apparatus according to claim 18,
wherein the execution means which executes the second application obtained via the network executes a predetermined authentication process by exchanging information with the other apparatus.

20. The information processing apparatus according to claim 18,
wherein the execution means which executes the second application obtained via the network executes a process of copying at least a portion of the data recorded on the first recording medium to the second recording medium which is different from the first recording medium based on a predetermined copyright protection framework.

21. An information processing method for an information processing apparatus that reproduces data recorded on a mounted recording medium,
wherein the information processing apparatus can execute a plurality of applications,
wherein a first application that is an essential application for reproducing data recorded on the recording medium, the first application being an application stored on the mounted recording medium or any of one or a plurality of storage units in association with the mounted recording medium and realizing a first function of processing the data recorded on the recording medium, and a second application that is stored in any of the storage units and realizes a second function different from the first function are executed in cooperation with each other by mutually exchanging information using predetermined inter-application communication on the virtual machine, and executes a third application independently of the first application.

22. A non-transitory computer readable medium including computer executable code for causing a computer to execute a process of reproducing information recorded on a recording medium, the process comprising:
realizing a first function of processing data recorded on the recording medium;
detecting, among other programs that are stored in any of one or a plurality of predetermined storage units and realize a second function different from the first function, the other program associated with itself;
activating the detected other program;
exchanging information with the detected other program using predetermined inter-application communication and executing a predetermined operation; and
realizing, among the other programs, another program other than the detected other program that is activated independently of the first application.

23. The non-transitory computer readable medium according to claim 22,
wherein the first function includes a function of treating, when the recording medium is mounted, a region that is included in storage regions of the storage units and stores information associated with the mounted recording medium and a recording region of the mounted recording medium as one data storage region.

24. The non-transitory computer readable medium according to claim 22,
wherein the computer includes a virtual machine environment, and
wherein the program is executed together with the other program on the virtual machine.

* * * * *